US008735572B2

(12) United States Patent
Shelby et al.

(10) Patent No.: US 8,735,572 B2
(45) Date of Patent: *May 27, 2014

(54) CELLULOSE ESTER COMPOSITIONS HAVING LOW BIREFRINGENCE AND FILMS MADE THEREFROM COMPRISING A PLASTICIZER

(75) Inventors: Marcus David Shelby, Fall Branch, TN (US); Michael Eugene Donelson, Kingsport, TN (US); Bradley Howard Dayvolt, Kingsport, TN (US); Alan Kent Wilson, Kingsport, TN (US); Bryan Kirkman, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/634,736

(22) Filed: Dec. 10, 2009

(65) Prior Publication Data

US 2010/0089288 A1  Apr. 15, 2010

Related U.S. Application Data

(62) Division of application No. 12/196,331, filed on Aug. 22, 2008, now Pat. No. 8,344,134.

(60) Provisional application No. 60/957,858, filed on Aug. 24, 2007, provisional application No. 60/978,928, filed on Oct. 10, 2007, provisional application No. 60/957,856, filed on Aug. 24, 2007, provisional application No. 60/978,926, filed on Oct. 10, 2007.

(51) Int. Cl.
*C08B 3/16* (2006.01)
*C08B 3/00* (2006.01)
*C08B 3/08* (2006.01)
*C08B 3/06* (2006.01)

(52) U.S. Cl.
USPC ............. 536/65; 536/58; 536/68; 536/69

(58) Field of Classification Search
USPC ........... 524/51, 37, 38, 39; 428/352, 41.8; 424/61; 430/200, 253, 271.1; 536/58, 536/84, 98
See application file for complete search history.

(56) References Cited

U.S. PATENT DOCUMENTS

| | | | |
|---|---|---|---|
| 5,138,474 A | | 8/1992 | Arakawa |
| 5,643,666 A | | 7/1997 | Eckart et al. |
| 5,894,048 A | | 4/1999 | Eckart et al. |
| 5,945,468 A | * | 8/1999 | Atkinson et al. ............ 524/51 |
| 5,958,539 A | | 9/1999 | Eckart et al. |
| 5,998,028 A | | 12/1999 | Eckart et al. |
| 6,025,069 A | | 2/2000 | Eckart et al. |
| 6,140,008 A | * | 10/2000 | Hsieh et al. .................. 430/200 |
| 6,559,912 B2 | | 5/2003 | Aminaka |
| 6,740,370 B2 | | 5/2004 | Shibue et al. |
| 6,937,310 B2 | | 8/2005 | Elman et al. |
| 6,977,275 B2 | * | 12/2005 | Buchanan et al. ............ 524/37 |
| 7,276,546 B2 | | 10/2007 | Buchanan et al. |
| 8,329,893 B2 | | 12/2012 | Shelby et al. |
| 8,344,134 B2 | | 1/2013 | Shelby et al. |
| 8,349,921 B2 | | 1/2013 | Wang et al. |
| 2003/0020208 A1 | | 1/2003 | Tasaka et al. |
| 2003/0156235 A1 | | 8/2003 | Kuzuhara et al. |
| 2003/0171458 A1 | | 9/2003 | Buchanan et al. |
| 2003/0185774 A1 | * | 10/2003 | Dobbs et al. ................. 424/61 |
| 2004/0180993 A1 | * | 9/2004 | Shelton et al. ............... 524/38 |
| 2005/0142304 A1 | | 6/2005 | Kawanishi et al. |
| 2005/0150426 A1 | | 7/2005 | Hashimoto et al. |
| 2005/0271834 A1 | | 12/2005 | Michihata |
| 2006/0093759 A1 | | 5/2006 | Fukagawa |
| 2006/0222786 A1 | * | 10/2006 | Oya et al. ................. 428/1.31 |
| 2006/0270806 A1 | | 11/2006 | Hale |
| 2007/0088105 A1 | | 4/2007 | Shelton et al. |
| 2007/0092663 A1 | | 4/2007 | Murakami |

FOREIGN PATENT DOCUMENTS

| | | |
|---|---|---|
| EP | 1072657 A1 | 1/2001 |
| EP | 1619209 | 1/2006 |
| EP | 1 792 918 A1 | 6/2007 |
| JP | 05-005047 A | 1/1993 |
| JP | 2007-138120 | 6/2007 |
| JP | 2007-138120 A | 6/2007 |

(Continued)

OTHER PUBLICATIONS

Yang, D.K. and Wu, S.T., "Fundamentals of Liquid Crystal Displays," 2006, pp. 208-237, Wiley, New Jersey.
Copending U.S. Appl. No. 12/196,331, filed Aug. 22, 2008, Marcus David Shelby et al.
Copending U.S. Appl. No. 12/196,333, filed Aug. 22, 2008, Marcus David Shelby et al.
Notification of Transmittal of the International Search Report and The Written Opinion of the International Searching Authority, Or the Declaration, filed Aug. 22, 2008 for PCT/US2008/009999.
Notification of Transmittal of the International Search Report and The Written Opinion of the International Searching Authority, Or the Declaration, filed Aug. 22, 2008 for PCT/US2008/009994.

(Continued)

*Primary Examiner* — Monique Peets
(74) *Attorney, Agent, or Firm* — Betty J. Boshears; Louis N. Moreno

(57) ABSTRACT

The present inventions relate to cellulose esters having low hydroxyl content for use in optical applications, such as liquid crystal display (LCD) films. Films with low hydroxyl levels and a given ratio of non-acetyl ester to hydroxyl level have low intrinsic birefringence. These films can be cast, molded, or otherwise oriented without an appreciable birefringence or optical distortion (i.e. retardation). These films are useful in polarizer, protective, and compensator films and in molded optical parts, such as lenses. The resins of the present inventions can also be made to have "+C plate" behavior either by melt or solvent based processing, which is uncharacteristic of cellulose esters. Such +C behavior allows films having unique compensatory behavior. Other embodiments of the invention relate to methods of melt casting films while minimizing birefringence. Another embodiment of the invention is directed to films made from the cellulose esters described herein further comprising a plasticizer.

18 Claims, 4 Drawing Sheets

(56) References Cited

FOREIGN PATENT DOCUMENTS

| | | | |
|---|---|---|---|
| JP | 2007-169592 | | 7/2007 |
| JP | 2007-169592 | A | 7/2007 |
| WO | WO 2004/083253 | A1 | 9/2004 |
| WO | WO 2006/116367 | A1 | 11/2006 |
| WO | WO2006/127834 | * | 11/2006 |
| WO | WO 2006/127834 | A2 | 11/2006 |
| WO | WO2006127834 | * | 11/2006 |

OTHER PUBLICATIONS

USPTO Office Action dated Sep. 24, 2009 for copending U.S. Appl. No. 12/393,922.
Copending U.S. Appl. No. 12/393,922, filed Feb. 26, 2009, Bin Wang et al.
USPTO Office Action dated Oct. 29, 2009 for copending U.S. Appl. No. 12/196,331.
USPTO Office Action dated Oct. 29, 2009 for copending U.S. Appl. No. 12/196,333.
USPTO Office Action dated Jun. 17, 2010 for copending U.S. Appl. No. 12/196,331.
USPTO Office Action dated May 11, 2010 for copending U.S. Appl. No. 12/634,731.
USPTO Office Action dated Jun. 18, 2010 for copending U.S. Appl. No. 12/393,922.
USPTO Office Action dated Jun. 17, 2010 for copending U.S. Appl. No. 12/196,333.
Notification of Transmittal of the International Search Report and The Written Opinion of the International Searching Authority, or the Declaration, with Date of Mailing Jun. 23, 2010, for International Application No. PCT/US2010/000372 filed Feb. 11, 2010.
USPTO Office Action dated Jan. 14, 2011 for copending U.S. Appl. No. 12/196,333.
USPTO Office Action dated Jan. 18, 2011 for copending U.S. Appl. No. 12/196,331.
USPTO Office Action dated Jan. 21, 2011 for copending U.S. Appl. No. 12/393,922.
USPTO Office Action dated Jan. 21, 2011 for copending U.S. Appl. No. 12/634,731.
USPTO Office Action dated Jun. 23, 2011 for copending U.S. Appl. No. 12/196,331.
USPTO Office Action dated Jun. 23, 2011 for copending U.S. Appl. No. 12/196,333.
USPTO Office Action dated Jun. 24, 2011 for copending U.S. Appl. No. 12/634,922.
USPTO Office Action dated Jun. 28, 2011 for copending U.S. Appl. No. 12/634,731.
USPTO Office Action dated Feb. 29, 2012 for copending U.S. Appl. No. 12/196,333.
USPTO Office Action dated Jun. 14, 2012 for copending U.S. Appl. No. 12/196,331.
USPTO Office Action dated Jun. 15, 2012 for copending U.S. Appl. No. 12/393,922.
USPTO Office Action dated Jun. 21, 2012 for copending U.S. Appl. No. 12/634,731.
USPTO Notice of Allowance dated Aug. 17, 2012 for copending U.S. Appl. No. 12/196,333.
USPTO Notice of Allowance dated Oct. 1, 2012 for copending U.S. Appl. No. 12/196,331.
USPTO Notice of Allowance dated Oct. 5, 2012 for copending U.S. Appl. No. 12/393,922.
USPTO Office Action dated Jan. 31, 2013 for copending U.S. Appl. No. 12/634,731.
USPTO Office Action dated Aug. 21, 2013 for copending U.S. Appl. No. 12/634,731.

* cited by examiner

CELLULOSE ESTER COMPOSITIONS HAVING LOW BIREFRINGENCE AND FILMS MADE THEREFROM COMPRISING A PLASTICIZER

CROSS-REFERENCES TO RELATED APPLICATIONS

This application is a divisional application of application Ser. No. 12/196,331, filed Aug. 22, 2008, and claims priority under 35 U.S.C. §119(e) to: U.S. Provisional Application Ser. No. 60/957,858 filed on Aug. 24, 2007; U.S. Provisional Application Ser. No. 60/978,928, filed on Oct. 10, 2007; U.S. Provisional Application Ser. No. 60/957,856, filed on Aug. 24, 2007; and U.S. Provisional Application Ser. No. 60/978,926, filed on Oct. 10, 2007, all of which are hereby incorporated by this reference in their entireties.

BACKGROUND OF THE INVENTION

Cellulose esters such as cellulose triacetate (CTA), cellulose acetate propionate (CAP), and cellulose acetate butyrate (CAB), are used in a wide variety of films in the liquid crystal display (LCD) industry. For example, they can be used as protective and compensator films in conjunction with polarizer sheets. These films are typically made by solvent casting, and then are laminated to either side of an oriented, iodinated polyvinyl alcohol (PVOH) polarizing film to protect the PVOH layer with regards to scratching and moisture ingress, while also increasing structural rigidity. Alternately, as is the case of compensator films, they can be laminated with the polarizer stack or otherwise included between the polarizer and liquid crystal layers. Cellulose esters have many performance advantages over other materials such as cycloolefins, polycarbonates, polyimides, etc. that are also used in display films. However, optical birefringence requirements currently often dictate that the latter be used instead.

Besides serving a protective role, these films can also improve the contrast ratio, wide viewing angle, and color shift performance of the LCD. For a typical set of crossed polarizers used in an LCD, there is significant light leakage along the diagonals (leading to poor contrast ratio), particularly as the viewing angle is increased. It is known that various combinations of optical films can be used to correct or "compensate" for this light leakage. These films must have certain well-defined birefringence (or retardation) values, which vary depending on the type of liquid crystal cell used because the liquid crystal cell itself will also impart a certain degree of undesirable optical retardation that must be corrected. Some of these compensator films are easier to make than others, providing manufacturing savings, so compromises are often made between performance and cost. Also, while most of the compensator and protective films are made by solvent casting, there is a push to make more films by melt extrusion so as to eliminate the need to handle environmentally unfriendly solvents. Having a material with more controllable optical retardation, that can be made by both solvent and melt casting, such as the material in the present invention, allows for greater flexibility in creating these films.

Compensator and optical films are commonly quantified in terms of birefringence, which is, in turn, related to the refractive index n. The refractive index is typically in the range of 1.4 to 1.8 for polymers in general, and approximately 1.46 to 1.50 for cellulose esters. The higher the refractive index, the slower the speed the light wave propagates through that given material.

For an unoriented isotropic material, the refractive index will be the same regardless of the polarization state of the entering light wave. As the material becomes oriented, or otherwise anisotropic, the refractive index becomes dependent on material direction. For purposes of the present invention, there are three refractive indices of importance denoted $n_x$, $n_y$, and $n_z$, which correspond to the machine direction (MD), the transverse direction (TD), and the thickness direction respectively. As the material becomes more anisotropic (e.g. by stretching), the difference between any two refractive indices will increase. This difference in refractive index is referred to as the birefringence of the material for that particular combination of refractive indices. Because there are many combinations of material directions to choose from, there are correspondingly different values of birefringence. The two most common birefringence parameters are the planar birefringence ($\Delta_e$) and the thickness birefringence ($\Delta_{th}$), and are defined as:

$$\Delta_e = n_x - n_y \tag{1a}$$

$$\Delta_{th} = n_z - (n_x + n_y)/2 \tag{1b}$$

The birefringence $\Delta_e$ is a measure of the relative in-plane orientation between the MD and TD and is dimensionless. In contrast, $\Delta_{th}$ gives a measure of the orientation of the thickness direction, relative to the average planar orientation.

Another parameter often used to characterize optical films is the optical retardation R. R is simply the birefringence times the thickness (d) of the film in question. Thus, $$R_e = \Delta_e d = (n_x - n_y)d \tag{2a}$$

$$R_{th} = \Delta_{th} d = [n_z - (n_x + n_y)/2]d \tag{2b}$$

Retardation is a direct measure of the relative phase shift between the two orthogonal optical waves and is typically reported in units of nanometers (nm). Note that the definition of $R_{th}$ varies with some authors, particularly with regards to the sign (+/−).

Materials are also known to vary with respect to their birefringence/retardation behavior. For example, most materials when stretched will exhibit a higher refractive index along the stretch direction and a lower refractive index perpendicular to the stretch. This follows because, on a molecular level, the refractive index is typically higher along the polymer chain's axis and lower perpendicular to the chain. These materials are commonly termed "positively birefringent" and represent most standard polymers, including commercial cellulose esters. In contrast, polymers that have a larger refractive index in the transverse direction (relative to the stretch direction) are termed "negative birefringent." It is important to note that there could be some confusion in the use of the terms "positive" and "negative" birefringence between the fields of polymer science and optical physics. From a polymer science standpoint, positive and negative birefringence refer specifically to the refractive indices along the chain as described above (i.e., essentially a material property). In contrast, in optical physics and many LCD related discussions, positive and negative birefringence refer specifically to the overall film or plate's birefringence behavior. As will be described later, a positively birefringent polymer can be used to make either positive or negative birefringent films or "plates" simply by changing the film orientation. Thus it is important to understand the context of "birefringence" and whether it relates to material behavior or overall structure, when assessing the meaning of "positive" or "negative." Unless otherwise stated, the terms $\Delta_e$, $\Delta_{th}$, $R_e$, and $R_{th}$ in this application, including the claims, are calculated as indicated in equations (1a), (1b), (2a), and (2b) above, respectively.

Another useful parameter is the "intrinsic birefringence," which is a property of the material and is a measure of the birefringence that would occur if the material was fully stretched with all chains perfectly aligned in one direction. For purposes of the present invention, intrinsic birefringence provides a measure of the sensitivity of a given polymer to a given amount of chain orientation. For example, a sample with high intrinsic birefringence tends to exhibit more birefringence during film formation than a sample with low intrinsic birefringence, even though the relative stress levels in the film are the same. Throughout this application, unless otherwise noted, we will refer to positive and negative intrinsic birefringence to clearly denote material behavior as opposed to the overall film or plate birefringence.

One additional parameter useful in the assessment of the overall optical properties of a film is the stress optical coefficient (SOC). The SOC gives the amount of birefringence that forms for a given amount of stress applied to the film. It is the stress that causes the chains to orient and thus be birefringent. Note that there are two distinct values of the SOC depending to whether the material is above or below the glass transition temperature Tg. If below Tg, the birefringence that forms is due to van der Waal bond deformation and is referred to as the "glassy" SOC. In the case of melt extrusion, the more useful parameter is the birefringence that forms from stress applied above Tg (i.e. the "rubbery" SOC) as this causes the chain alignment and birefringence more commonly associated with flow. Unless otherwise noted, "SOC" in this application refers to the rubber SOC value. The SOC is typically measured by applying a given stress to a film at a temperature above Tg, and then measuring the resulting birefringence. This is a parameter that is sensitive to the chain chemistry of the material.

To understand birefringence and SOC, it helps to visualize what happened on a molecular level. A propagating light wave "slows down" (i.e. the refractive index increases) every time it interacts with electrons in a material. For a given atomic bond (e.g. a carbon-carbon or carbon-oxygen bond), this interaction will be greater if the light wave is polarized along the bond direction and weaker if aligned perpendicular to it. Thus, the atomic level refractive index or "bond polarizability" is higher along a bond direction as opposed to perpendicular to the bond. To obtain the macroscopic refractive index, one must average over all of the bonds and bond angles in the material. If, on average, the bonds tend to align more preferentially in one direction than another, then the material will be birefringent. In contrast, if the bond angles are randomly distributed in all directions, as for example with an unoriented material, then the refractive index will be constant in all directions and the birefringence will be zero.

As a polymer is stretched (for example, in the x direction), the polymer chains will align in the stretch direction. For most (but not all) materials, this means that more atomic bonds are also going to be preferentially aligned in the stretch direction. Consequently, the refractive index $n_x$ will be greater than $n_y$ and $n_z$ and they are referred to as "positively birefringent". In other words, the refractive index for a positive birefringent material is highest in the orientation direction. For these materials, the SOC is positive.

In contrast there are some materials that are negatively birefringent and have a negative SOC. For these materials, there are more atomic bonds aligned perpendicular to the chain axis rather than parallel. Thus, when the material is stretched in the x direction, there is a preferential alignment of atomic bonds in the y and z directions. As a result, the refractive index refractive index $n_x$ will be less than $n_y$ and $n_z$ after stretching. Examples of this type of negatively birefringent material include PMMA and polystyrene.

Negative birefringent polymers exhibit a higher refractive index perpendicular to the stretch direction (relative to the parallel direction), and consequently also have a negative intrinsic birefringence. Certain styrenics and acrylics are known to have negative birefringent behavior due to their rather bulky side groups. Zero birefringence, in contrast, is a special case and represents materials that show no birefringence with stretching and thus have a zero intrinsic birefringence. Such materials are ideal for optical applications as they can be molded, stretched, or otherwise stressed during processing without showing optical retardation or distortion. Such materials are extremely rare.

The actual compensation films that are used in an LCD can take on a variety of forms. These include biaxial films, where all three refractive indices differ and two optical axes exist, and uniaxial films, where two of the three refractive indices are the same and have only one optical axis. There are also other classes of compensation films, where the optical axes twist or tilt through the thickness of the film (e.g. dischotic films). In general, the type of compensator film that can be made from a given material is a function of the intrinsic birefringence characteristics of the polymer (positive or negative).

In the case of uniaxial films, a film having refractive indices such that $$n_x > n_y;\ n_x > n_z;\ \text{and}\ n_y \sim n_z \qquad (3a)$$

is denoted as a "+A" plate film. In these films, the x direction of the film has a high refractive index, whereas the y and thickness directions are approximately equal in magnitude, and each lower than $n_x$. This type of film is also referred to as a positive uniaxial crystal structure with the optic axis along the x-direction. Such films are easy to make by uniaxially stretching a positively birefringent material, using for example, a film drafter.

In contrast, a "−A" uniaxial film is defined as $$n_x < n_y;\ n_x < n_z;\ \text{and}\ n_y \sim n_z \qquad (3b)$$

where the x-axis refractive index is lower than each of the other directions, which are approximately equal to each other. The most common method for making a −A plate firm is to stretch a negative birefringent polymer, or alternately, to coat a negatively birefringent liquid crystal polymer onto a surface such that the molecules are lined up in a preferred direction (for example, by using an underlying etched orientation layer.)

Another class of uniaxial optical film is the C plate which can also be "+C" or "−C". The difference between a C and A plate is that in a C plate, the unique refractive index (or optical axis) is in the thickness direction as opposed to in the plane of the film. Thus, $$n_z > n_y = n_x\ \text{"+C" plate} \qquad (4a)$$

$$n_z < n_y = n_x\ \text{"−C" plate} \qquad (4b)$$

C plates can be made by biaxial stretching, holding the relative stretch in the x and y directions constant. Alternately, they can be made by compression forming. Compressing or equibiaxially-stretching an initially isotropic, positive intrinsic birefringent material will result in a −C plate, since the effective orientation direction is in the plane of the film. Conversely, a +C plate is made by compressing or equibiaxially stretching an initially isotropic film made with negative intrinsic birefringent material. In the case of biaxial stretching, if the orientation level is not kept the same in the machine and transverse directions, then the material is no longer a true C plate, but instead is a biaxial film with 2 optical axes.

A third, and more common option for producing C plates takes advantage of the stresses that form during solvent casting of a film. Tensile stresses are created in the plane of the film due to the restraint imposed by the casting belt, which are also equi-biaxial in nature. These stresses tend to align the chains in the plane of the film resulting in −C or +C films, for positive and negative intrinsic birefringent materials respectively. As most cellulose ester films used in displays are solvent cast, and all are essentially positive birefringent, then it is apparent that solvent cast cellulose esters normally produce −C plates. These films can also be uniaxially stretched to produce +A plates (assuming the initial as-cast retardation is very low), but the ability to make +C or −A plates with cellulose esters is extremely limited.

Besides uniaxial plates, it is also possible to use biaxial oriented films to produce C plates. Biaxial films are quantified in a variety of ways including simply listing the 3 refractive indices in the principal directions (along with the direction of these principal axes). Alternately, biaxial films are often quantified in terms of the parameter Nz, where Nz is defined as $$Nz=(n_x-n_z)/(n_x-n_y) \quad (5)$$

Nz is a measure of the effective out-of-plane birefringence relative to the in-plane birefringence and is typically chosen to be about 0.5 when the film is used as a compensator film for a pair of crossed polarizers.

In order for compensator films to properly eliminate light leakage, they must be combined in certain ways depending on the type of liquid crystal cell in use. For example, *Fundamentals of Liquid Crystal Displays* (D. K. Yang and S. T. Wu, Wiley, N.J., 2006, pp 208-237), describes various ways to compensate for IPS (in-plane switching), twisted nematic (TN) and VA (vertical alignment) type cells using combinations of uniaxial plates (biaxial plates are also effective but more complicated mathematically). In the case of an IPS cell, a +C plate followed by a +A plate is described (also described is +A followed by +C). When sandwiched between the crossed polars, these films effectively correct for light leakage. Another type of structure is one where an +A plate is used with an −A plate, which gives a more symmetric viewing angle performance than the +A/+C combination.

VA compensated films are similar, although the liquid crystal layer itself acts as a +C structure that has to be figured into the calculation (unlike IPS systems where the cell is typically more "neutral"). The end result is that a +A film in conjunction with a −C film is required. This structure can be made solely with positive birefringent materials. However, improved performance is shown if a 3 layer compensator composed of a +A, −A and −C film, which once again requires a negative birefringence for the −A layer. Note that the structures described above are just a few of many combinations available and are only meant to illustrate the importance of positive and negative birefringence. Other compensators (e.g. biax films and twisted films) are also possibilities that can benefit from having negative intrinsic birefringence.

Although the discussion above identifies benefits of negative intrinsic birefringence, there is also benefit to having a material with a very low or zero intrinsic birefringence. These zero or near zero retardation films have particular importance in IPS type structures as protective layers, such as the above example of an IPS compensator with a +A and a −A film with no C type structures involved. Unfortunately, a typical protective cellulose triacetate (TAO) film that is made by solvent casting and laminated to the polarizer, will have a nominal Rth of from −20 nm to about −70 nm at 633 nm wavelength. Because this film is also in the "optical train" between polarizers, its retardation contributes to the light leakage. Thus, these protective films have effectively added two −C plates to the overall structure (i.e., one for the top polarizer and a second for the bottom polarizer/analyzer) which negates the benefits of the +A/−A compensation strategy. Therefore, in order to alleviate this, protective TAO films having zero Rth (i.e. "Zero-TAC" films) are desirable. Zero-TAC films are also useful as substrates for various coatings including negatively birefringent coatings, and liquid crystal coatings. In these applications, the coating is meant to serve as the compensator and the TAO substrate should be neutral. Such Zero-TAC films are often made by taking cellulose triacetate and incorporating additives that reduce the retardation, but such additives are expensive and alter other performance properties of the film. Having a cellulose ester that has a very low, or zero intrinsic birefringence will allow for the production of Zero-TAC films without the use of significant retardation inhibitors/additives and is one embodiment of the present invention.

As mentioned above, Rth values for solvent cast cellulose triacetate range from about −20 to −70 nm but with mixed ester systems we have observed ranges from about −20 to −300 nm depending on the type of cellulose ester involved (which determines its intrinsic birefringence), the time left on the casting belt (which controls the residual stress in the film), and the type of plasticizers and additives used. Note that by "mixed ester" we are referring to cellulose esters having more than one ester type such as, for example, cellulose acetate propionate (CAP) or cellulose acetate butyrate (CAB). As already described, it is fairly common to add retardation additives or inhibitors to the solvent dope to help raise or lower the as-cast retardation. The amount of retardation in the −C plate can also be enhanced by biaxial stretching or compression or a other films such as a +A plate can be made by subsequent uniaxial stretching (assuming the retardation of the −C film is low initially). Of note, however, is that −A and +C compensator plates cannot be easily made with cellulose esters because of their positive birefringent nature. Thus other more costly (or poorer performing) materials have been used instead.

Melt extruded films also have certain ranges of retardation although the stress profile is different from solvent casting. With melt extrusion, tensile stresses in the MD direction due to drawdown between roll and die coupled with transverse stresses due to the near constant width casting process, result in a film with a biaxial birefringence profile. Nevertheless, the Rth values of these films will always be negative when casting a positive birefringent material. Having a melt processable cellulose ester with negative intrinsic birefringence provides a way to make melt extruded films with positive Rth values (i.e., +C plate behavior). Furthermore, having a zero or negative intrinsic birefringent resin that is both melt and solvent castable provides a very versatile material that can be used on a wider range of film processing equipment.

In summary, there is a need in the art for cellulose esters having very low or negative intrinsic birefringence that are preferably both solvent and melt castable, and maintain good solubility for ease of manufacture. This would allow for greater versatility and performance in the preparation of such as liquid crystal display (LCD) films, such as compensator structures. Such a resin is the basis of the present invention. An LCD film or sheet, as used herein, refers to an optical film or sheet in an LCD assembly, capable, for example, of directing, diffusing, or polarizing light.

SUMMARY OF THE INVENTION

This invention relates to mixed cellulose esters and mixed cellulose ester composition [comprising plasticizer(s)]. It further relates to articles made therefrom. In addition, it relates to films made therefrom. Furthermore, it relates to LCD films made therefrom.

In one embodiment, there is provided a mixed cellulose ester comprising at least one acetyl group wherein the ratio of the degree of substitution of non-acetyl groups ($DS_{NAC}$) to degree of substitution of hydroxyl groups ($DS_{OH}$) is 10 or greater and the non-acetyl degree of substitution is from 1.1 to 1.75.

In one embodiment, there is provided a mixed cellulose ester comprising at least one acetyl group wherein the ratio of the degree of substitution of non-acetyl groups ($DS_{NAC}$) to degree of substitution of hydroxyl groups (DSOH) is from 10 to 200 and the non-acetyl degree of substitution is from 1.1 to 1.75. In other embodiments, the ratio of the degree of substitution of non-acetyl groups (DSNAC) to degree of substitution of hydroxyl groups (DSOH) can also be at least one of the following: 10 to 100; 10 to 80; 15 or greater; 15 to 200; and 15 to 100.

In one embodiment, there is provided a mixed cellulose ester comprising at least one acetyl group wherein the ratio of the degree of substitution of non-acetyl groups ($DS_{NAC}$) to degree of substitution of hydroxyl groups ($DS_{OH}$) is 10 or greater and the non-acetyl degree of substitution is from 1.1 to 1.6.

In one embodiment, the non acetyl groups of the mixed cellulose esters of the invention can comprise propionyl and/or butyryl groups, and the degree of substitution of propionyl groups plus butyryl groups can be from about 1.1 to 1.6.

In one embodiment, the non acetyl groups of the mixed cellulose esters of the invention can comprise propionyl wherein the degree of substitution of propionyl is from 1.2 to 1.6.

In one embodiment, the mixed cellulose esters of the invention can comprise at least one acetyl group wherein the glass transition temperature of said mixed cellulose ester is from 100° to 200° C.; and wherein the ratio of the degree of substitution of non-acetyl groups (DSNAC) to degree of substitution of hydroxyl groups (DSOH) is 10 or greater and the non-acetyl degree of substitution is from 1.1 to 1.6.

In all embodiments of the invention, the mixed cellulose esters of the invention can have an inherent viscosity of from 0.8 to 1.9 dL/g.

In all embodiments of the invention, the mixed cellulose esters of the invention can have a Tg of from 100° to 200° C.

In one embodiment, of the invention a mixed cellulose ester composition is provided at least one of the mixed cellulose esters of the invention and at least one plasticizer.

In one embodiment, the mixed cellulose ester composition can comprise one or more plasticizers which can be selected from at least one of the following: a phosphate plasticizer, a phthalate plasticizer, a glycolic acid ester, a citric acid ester plasticizer and a hydroxyl-functional plasticizer.

In one embodiment, the mixed cellulose ester composition can comprise one or more plasticizers which can be selected from at least one of the following: triphenyl phosphate, tricresyl phosphate, cresyldiphenyl phosphate, octyldiphenyl phosphate, diphenylbiphenyl phosphate, trioctyl phosphate, and tributyl phosphate; diethyl phthalate, dimethoxyethyl phthalate, dimethyl phthalate, dioctyl phthalate, dibutyl phthalate, di-2-ethylhexyl phthalate, butylbenzyl phthalate and dibenzyl phthalate; butyl phthalyl butyl glycolate, ethyl phthalyl ethyl glycolate or methyl phthalyl ethyl glycolate; and triethyl citrate, tri-n-butyl citrate, acetyltriethyl citrate, acetyl-tri-n-butyl citrate, and acetyl-tri-n-(2-ethylhexyl) citrate.

In one embodiment, the mixed cellulose ester composition can comprise one or more plasticizers which can be selected from at least one of the following: esters comprising: (i) acid residues comprising one or more residues of: phthalic acid, adipic acid, trimellitic acid, succinic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms.

In one embodiment, the mixed cellulose ester composition can comprise one or more plasticizers comprising alcohol residues where the alcohol residues can be selected from at least one of the following: methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In one embodiment, the mixed cellulose ester composition can comprise one or more plasticizers which can be selected from at least one of the following: benzoates, phthalates, phosphates, arylene-bis(diaryl phosphate), and isophthalates. In another embodiment, the plasticizer comprises diethylene glycol dibenzoate, abbreviated herein as "DEGDB".

In one embodiment, the mixed cellulose ester composition can comprise one or more plasticizers which can be selected from at least one of the following: aliphatic polyesters comprising $C_{2-10}$ diacid residues and $C_{2-10}$ diol residues, for example, malonic acid, succinic acid, glutaric acid, adipic acid, pimelic acid, suberic acid, azelaic acid, and sebacic acid.

In one embodiment, the mixed cellulose ester composition can comprise one or more plasticizers comprising diol residues which can be residues of one of the following C2-10 diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

In one embodiment, the mixed cellulose ester composition wherein the plasticizer comprises at least one of the following: Resoflex R296, Resoflex 804, SHP (sorbitol hexapropionate), XPP (xylitol pentapropionate), XPA (xylitol pentaacetate), GPP (glucose pentaacetate), GPA (glucose pentapropionate) and APP (arabitol pentapropionate) (as referred to herein).

In one embodiment, the mixed cellulose ester composition can comprise one or more plasticizers which can be an aliphatic polyester comprising adipic acid residues and diethylene glycol residues.

In one embodiment, the mixed cellulose ester composition can comprise one or more plasticizers which can be an aliphatic polyester comprising succinic acid residues and diethylene glycol residues.

In one embodiment, the mixed cellulose ester composition can comprise one or more plasticizers wherein the plasticizer comprises one or more of: A) from about 5 to about 95 weight % of a C2-C12 carbohydrate organic ester, wherein the carbohydrate comprises from about 1 to about 3 monosaccharide units; and B) from about 5 to about 95 weight % of a $C_2$-$C_{12}$ polyol ester, wherein the polyol is derived from a $C_5$ or $C_6$ carbohydrate; and b) from about 5 to about 95 weight % of a $C_2$-$C_{10}$ ester of cellulose having a DS of from about 0.7 to about 3.0; wherein the percentages are based on the total weight of component (A) plus component (B). In one embodiment, the polyol ester does not comprise or contain a polyol acetate or polyol acetates.

In one embodiment, the mixed cellulose ester composition comprises a plasticizer wherein the plasticizer comprises at least one carbohydrate ester and the carbohydrate portion of the carbohydrate ester is derived from one or more of glucose, galactose, mannose, xylose, arabinose, lactose, fructose, sorbose, sucrose, cellobiose, cellotriose and raffinose.

In one embodiment, the mixed cellulose ester composition comprises a plasticizer wherein the plasticizer comprises at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate and β-glucose pentabutyrate.

In one embodiment, the mixed cellulose ester composition comprises a plasticizer wherein the plasticizer comprises at least one carbohydrate ester and the carbohydrate portion of the carbohydrate ester comprises an α-anomer, a β-anomer or a mixture thereof.

In all embodiments of the invention, at least one film is provided which comprises any of the mixed cellulose esters or mixed cellulose ester compositions (plasticizer added) of the invention. In one embodiment of the invention, at least one LCD film is provided which comprises any of the mixed cellulose esters or mixed cellulose ester compositions of the invention. In all embodiments of the invention, the film(s) of the invention can be either solution casted or melt extruded.

BRIEF DESCRIPTION OF THE INVENTION

The present invention relates to cellulose mixed ester compositions having low hydroxyl content that are both solvent castable and melt extrudable. The cellulose esters contain at least two ester types, for example, acetyl, propionyl, and butyryl and the ratio of the non-acetyl degree of substitution (for example propionyl and/or butyryl) to the ratio of hydroxyl degree of substitution is 10 or greater and the degree of non-acetyl ester substitution (e.g., propionyl (Pr) plus butyryl (Bu) groups) is greater than 0.5, for example greater than 1.1. Such films are useful in liquid crystal display applications as compensator films as well as polarizer protective films. Furthermore such resins can be used in, for example, molded optical parts, lenses, optical connectors, and so forth, where molded in residual stress needs to be kept to a minimum. Throughout this application, the non acetyl degree of substitution is referred to as ($DS_{NAC}$) and the hydroxyl degree of substitution is sometimes referred to as ($DS_{OH}$)

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the present specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

ABBREVIATIONS

| Bu | butyryl residues |
|---|---|
| CAB | cellulose acetate butyrate |
| CAP | cellulose acetate propionate |
| CAPB | cellulose acetate propionate butyrate |
| CTA | cellulose triacetate |
| DS | degree of substitution |
| LCD | liquid crystal display |
| MD | machine direction |
| OH | hydroxyl residues |
| Pr | propionyl residues |
| PVOH | polyvinyl alcohol |
| SOC | stress optical coefficient |
| TD | transverse direction |
| TPP | triphenyl phosphate |
| $\Delta_e$ | planar birefringence |
| $\Delta_{th}$ | thickness birefringence |
| Re | planar retardation |
| Rth | thickness retardation |
| $DS_{NAC}$ | non acetyl degree of substitution |
| $DS_{OH}$ | hydroxyl degree of substitution |
| $DS_{(Pr+Bu)}$ | non acetyl degree of substitution wherein the non acetyl groups are propionyl and/or butyryl groups |

DETAILED DESCRIPTION OF THE INVENTION

Figure 1:
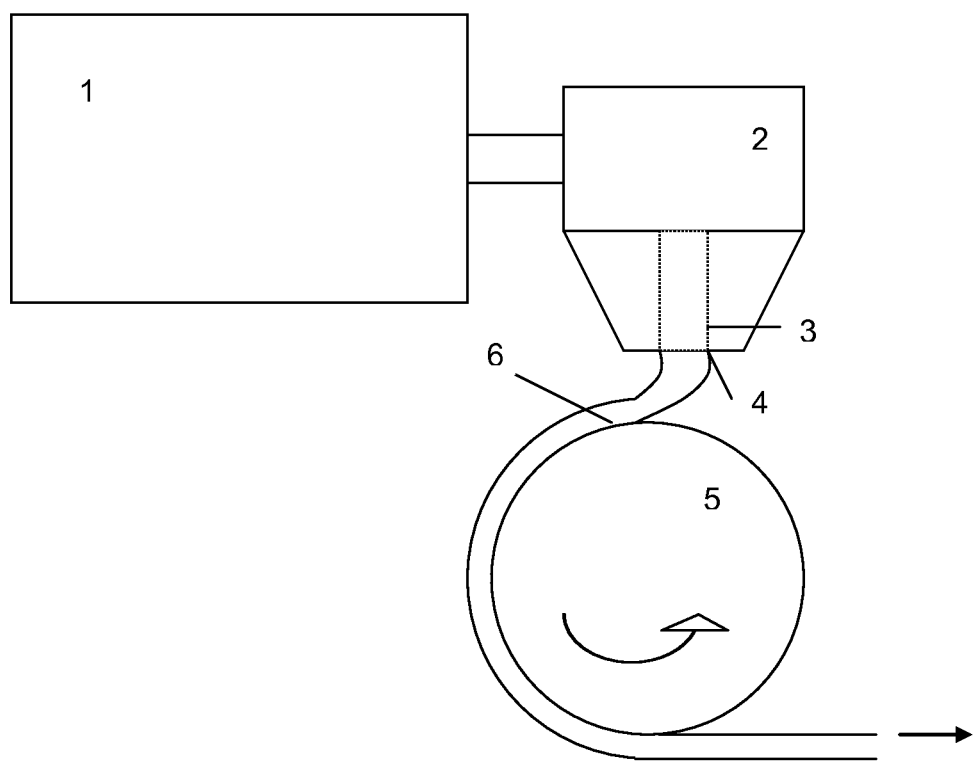
FIG. 1. A schematic diagram of a melt extrusion casting process.

The resins of the present invention involve cellulose esters having low hydroxyl content and prescribed ratios of the non acetyl ester DS to the hydroxyl DS. These resins are both solvent castable and melt extrudable. It has been found that such resins exhibit very low intrinsic birefringence as compared with traditional cellulose esters, and can be processed on a wider variety of equipment. Furthermore, if the hydroxyl level is made low enough and the non-acetyl ester DS is properly controlled, then the intrinsic birefringence will cross over from positive to zero, and then eventually will become negative in magnitude, thus allowing for the ability to make +C and −A type retardation plates.

As mentioned above, the relative magnitude of the birefringence of a film depends on the stereochemistry of the monomer unit used to prepare the film. As more side groups are attached to the monomer, there are typically more bonds that are transversely aligned with the chain axis resulting in a reduction in the SOC. As larger and/or more side groups are attached, the SOC will continue to decrease towards 0, eventually crossing over and become negative (e.g. the benzene side group in polystyrene gives it a negative SOC). For the case of an SOC=0, this is referred to as "zero birefringent" or "zero intrinsic birefringent." Such a material is actually ideal for many optical applications as it can be can be stretched to any degree without any birefringence forming. Unfortunately, zero birefringent materials are rare.

By tailoring the type and amount of these side groups, it is therefore possible to vary the SOC for a given material. In the case of cellulose esters and ethers, there are three reactive hydroxyl sites per anhydroglucose unit to which different side groups can be attached (e.g. acetyl, propionyl, butyryl, etc.). Varying the number and type of these groups can thus allow one to modify the SOC to fit a given need. As an example, pure cellulose (3 hydroxyls per anhydroglucose) has a relatively large positive SOC, but as these hydroxyls are replaced with acetyl groups, the SOC decreases significantly. In the case of pure cellulose triacetate (DS=3), the SOC is very close to 0 (and slightly negative).

Varying these side groups does have its drawbacks however. As the chemistry of the molecule is changed, so too is the thermal, solubility and mechanical performance. For example, adding too many large side groups onto a cellulose molecule reduces the glass transition temperature Tg, as well as the modulus of the film. Both are important display related performance criteria as they affect the long term dimensional stability. Similarly a zero birefringent cellulose acetate can be made if the degree of substitution (DS) is close to 2.95, but such a material is insoluble compared to conventional cellulose triacetate (DS=2.8 to 2.9) and thus not practical from a manufacturing standpoint. Thus, any chemical changes for optical enhancement and SOC reduction must be properly balanced with the tradeoffs that may occur in other properties. As a result, it becomes more desirable to control the orientation actually introduced during melt processing rather than trying to make extreme changes to the material. Nevertheless, maintaining the SOC within a certain range is a key aspect of achieving a quality display film.

Sources of Melt Orientation

The SOC value gives the correlation between stress and birefringence, but it still remains to be determined just how much stress is present. In the case of melt extrusion, there are two main sources of stress: the shear stress from flow in the die and the extensional stress between the die and casting roll. These are depicted in FIG. 1. Polymer flows from the extruder (1), into the die (2), where it exits out through the die lips (3). The gap between the die lips is typically very small (i.e. between 2 and 50 mils (0.08 to 2 mm)) in order to provide enough back pressure to evenly fill out the full width of the die. Such flow distribution is normally handled via a coat hanger or T shaped channel followed by the thin die lip region. It is this narrow die lip region where shear stresses are most likely to occur within the die and this will be addressed in more detail shortly. The extensional stresses occur between where the polymer exits the die (4) and where it first contacts the casting roll (5) at point (6). The gap spacing between die and roll is usually very small (a few centimeters), but there are significant elongational stresses occurring. The polymer exiting the die has a thickness just slightly greater than the die gap (due to die swell) and this is typically quite a bit thicker than the final desired thickness. Thus, the film is "pulled down" to its final thickness in the small gap between die and roll. This pulling creates the second source of stressing. In one embodiment of the invention, the die gap L is between 0.1 and 5 cm to minimize web instabilities and drawdown.

There are many die/roll arrangements but the general flow mechanics are the same for almost all. Often, the casting is aided by an electrostatic pinning wire, a vacuum box or an "air knife", all of which help to force the film against the roll to ensure good contact with no air entrapment. The effects of these on the actual drawdown velocity are small and can be neglected. In contrast film that is extruded and polished between a set of nip rolls will have much higher stresses and birefringence than any of the previous methods cited. Polishing or calendering involves squeezing the film between the casting roll and a second nip roll to help force the film flat against the casting roll and ensure very precise thickness control. Unless the nip force is kept very low, this polishing process will introduce an additional third set of stresses that are much higher than the elongational and die flow stresses already mentioned. Thus, polishing is a special case of melt extrusion that must be considered separately.

Shear Stresses

In general, lower viscosity fluids have lower residual orientation and less birefringence since the shear stresses are lower in the die. While this is true in a general sense, it still does not fully address all sources of orientation. Furthermore, simply lowering the viscosity of the material by, for example, increasing the plasticizer level, usually will adversely affect other properties such as stiffness and glass transition temperature thereby rendering the film unacceptable. In a similar manner, reducing the viscosity by raising the melt temperature will typically lead to excessive thermal degradation and yellowing which is also unacceptable. To complicate matters further, cellulosics tend to be highly shear thinning fluids making the flow mechanics and orientation distributions coming out of the die very complicated. The viscosity of the fluid can be a few orders of magnitude higher at the center of the die as opposed to near the die wall due to the shear rate difference. The use of plasticizers also tends to complicate flow behavior as they can cause a "lubrication" effect at the die surface (which can change over time) so quantifying a maximum viscosity for optical performance tends to become a guess at best. Fortunately, these stresses that form are rapidly dissipating away due to molecular level relaxation, and it is this relaxation, as well as extensional stresses that form outside the die, which play a bigger role in the final film birefringence.

The stresses induced in the die are related to standard shear flow as described in, for example, *Dynamics of Polymeric Liquids*, Vol 1, (Bird, Armstrong and Hassager John Wiley and Sons, 1987). The velocity profile is approximately parabolic in shape, with the deviation due to the non-Newtonian shear thinning flow behavior of the polymer fluid. The shear stress is zero at the centerline and a maximum next to the wall. This wall shear stress is equal to the shear rate (at the wall) times the viscosity of the fluid (at the wall shear rate). Wall shear rates are typically of the order of $1000\ s^{-1}$ but can vary depending on flow rate, die gap, shear thinning and die width. For most polymers of interest the shear stress at the wall will be of the order of 1 to 100 MPa depending on viscosity, flow rate, etc. This is considerable and would cause significant birefringence for most polymers if it were not for the fact that this stress rapidly decays due to thermal relaxation.

Upon exiting the die, the fluid will no longer be under shear and the high chain mobility will allow the molecules to rapidly uncoil thereby reducing the stress. How fast this relaxation occurs depends on the relaxation time λ, which in turn, is a function of the polymer and the processing temperature.

Extensional Stresses

While the previously-described shear stresses contribute to birefringence, their effect is less than that of the extensional stresses. While the shear stresses tend to be much higher in magnitude than the extensional stresses, they also have much longer time to relax away. The extensional stresses, in contrast, are frozen in almost immediately after they are created.

These stresses are caused by the drawing down that occurs between the die and the cast roll. The film exits the die at a thickness approximately equal to the die gap $h_o$, and then has to be stretched down to the final desired thickness $h_f$. The value $h_f$ is typically 40 to 200 microns (0.004 to 0.02 cm) for most commercial display films although we are not restricted to such. Because of conservation of mass, as the film thins down, it has to simultaneously speed up. This acceleration in velocity corresponds to a tensile strain rate in the film which creates the extensional stresses.

Composition of the Cellulose Esters of the Invention

The cellulose esters of the present invention are mixed esters, based for example, on acetyl, propionyl, and/or butyryl, but longer chain acids can also be used. Mixed esters provide adequate solubility for processing and reduce gel formation. The non acetyl degree of substitution is termed as $DS_{NAC}$ throughout this application. The propionyl/butyryl degree of substitution ($DS_{(Pr+Bu)}$) is a subgenus of $DS_{NAC}$, and refers to the non acetyl degree of substitution wherein the non acetyl groups are propionyl and/or butyryl groups. In one embodiment of the invention, acetyl is the primary ester forming group. In another embodiment, the cellulose ester is a cellulose acetate propionate (CAP) ester. In another embodiment, the cellulose ester is a cellulose acetate butyrate (CAB) ester. In another embodiment, the cellulose ester is a cellulose acetate propionate butyrate (CAPB) ester. In another embodiment, the cellulose ester is a blend of two or more esters. In another embodiment, the cellulose ester is a blend of two or more esters chosen from CAP, CAB, and CAPB esters. In another embodiment, the cellulose ester is a mixed cellulose ester of acetate and comprises at least one ester residue of an acid chain having more than 4 carbon atoms, such as, for example, pentonoyl or hexanoyl. Such higher acid chain ester residues may include, but are not limited to, for example acid chains esters with 5, 6, 7, 8, 9, 10, 11, and 12, carbon atoms. They may also include acid chains esters with more than 12 carbon atoms. In another embodiment of the invention, the mixed cellulose acetate ester that comprises at least one ester residue of an acid chain having more than 4 carbon atoms may also comprise propionyl and/or butyryl groups.

In one embodiment, the mixed ester system of the present invention has a total degree of substitution of from 2.8 to 3 (i.e. the hydroxyl DS is between 0 and 0.2). In another embodiment, the total degree of substitution is from 2.83 to 2.98, and in yet another embodiment, the total degree of substitution is from 2.85 to 2.95. In another embodiment of the invention, the total degree of substitution is such that the total hydroxyl level is low enough to produce desired retardation behavior, such as that disclosed in the examples below.

In another embodiment, the mixed ester system of the present invention is defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 10 or greater, for example 10 to 200; and
(b) the degree of non-acetyl ester substitution (e.g., propionyl (Pr) plus butyryl (Bu) groups) is greater than 0.5, for example greater than 1.1.

In another embodiment, the mixed ester system of the present invention is defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 10 or greater, for example 10 to 200; and
(b) the degree of non-acetyl ester substitution (e.g., propionyl (Pr) plus butyryl (Bu) groups) is from 0.5 to 1.75, or from 1.1 to 1.75.

In another embodiment, the mixed ester system of the present invention is defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 10 or greater, for example 10 to 200; and
(b) the degree of non-acetyl ester substitution (e.g., propionyl (Pr) plus butyryl (Bu) groups) is from 1.0 to 1.6, or from 1.1 to 1.6.

In another embodiment, the mixed ester system of the present invention is defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is greater than 10, for example greater than 10 to 200; and
(b) the degree of non-acetyl ester substitution (e.g., propionyl (Pr) plus butyryl (Bu) groups) is greater than 0.5, for example greater than 1.1.

In another embodiment, the mixed ester system of the present invention is defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is greater than 10, for example greater than 10 to 200; and
(b) the degree of non-acetyl ester substitution (e.g., propionyl (Pr) plus butyryl (Bu) groups) is from 0.5 to 1.75, or from 1.1 to 1.75.

In another embodiment, the mixed ester system of the present invention is defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is greater than 10, for example greater than 10 to 200; and
(b) the degree of non-acetyl ester substitution (e.g., propionyl (Pr) plus butyryl (Bu) groups) is from 1.0 to 1.6, or from 1.1 to 1.6.

In another embodiment, the mixed ester system of the present invention is defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 15 or greater, for example 15 to 200, for example greater than 15, or for example greater than 15 to 200; and
(b) the degree of non-acetyl ester substitution (e.g., propionyl (Pr) plus butyryl (Bu) groups) is greater than 0.5, for example greater than 1.1.

In another embodiment, the mixed ester system of the present invention is defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 15 or greater, for example 15 to 200, for example greater than 15, or for example greater than 15 to 200; and (b) the degree of non-acetyl ester substitution (e.g., propionyl (Pr) plus butyryl (Bu) groups) is from 0.5 to 1.75, or from 1.1 to 1.75.

In another embodiment, the mixed ester system of the present invention is defined by the following parameters:

(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 15 or greater, for example 15 to 200, for example greater than 15, or for example greater than 15 to 200; and (b) the degree of non-acetyl ester substitution (e.g., propionyl (Pr) plus butyryl (Bu) groups) is from 1.0 to 1.6, or from 1.1 to 1.6.

Another embodiment of the invention is directed to a solvent-cast or melt-extruded film made from a mixed ester defined by the following parameters:

(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 10 or greater, for example 10 to 200; and (b) the degree of non-acetyl ester substitution (e.g., propionyl (Pr) plus butyryl (Bu) groups) is greater than 0.5, for example greater than 1.1.

wherein the film is prepared using a plasticizer, and wherein optionally the plasticizer comprises an aliphatic polyester comprising $C_{2-10}$ diacid residues and $C_{2-10}$ diol residues.

Another embodiment of the invention is directed to a solvent-cast or melt-extruded film made from a mixed ester defined by the following parameters:

(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 10 or greater, for example 10 to 200; and (b) the degree of non-acetyl ester substitution (e.g., propionyl (Pr) plus butyryl (Bu) groups) is from 0.5 to 1.75, or from 1.1 to 1.75;

wherein the film is prepared using a plasticizer, and wherein optionally the plasticizer comprises an aliphatic polyester comprising $C_{2-10}$ diacid residues and $C_{2-10}$ diol residues.

Another embodiment of the invention is directed to a solvent-cast or melt-extruded film made from a mixed ester defined by the following parameters:

(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 10 or greater, for example 10 to 200; and (b) the degree of non-acetyl ester substitution (e.g., propionyl (Pr) plus butyryl (Bu) groups) is from 1.0 to 1.6, or from 1.1 to 1.6;

wherein the film is prepared using a plasticizer, and wherein optionally the plasticizer comprises an aliphatic polyester comprising $C_{2-10}$ diacid residues and $C_{2-10}$ diol residues.

Another embodiment of the invention is directed to a solvent-cast or melt-extruded film made from a mixed ester defined by the following parameters:

(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is greater than 10, for example greater than 10 to 200; and (b) the degree of non-acetyl ester substitution (e.g., propionyl (Pr) plus butyryl (Bu) groups) is greater than 0.5, for example greater than 1.1;

wherein the film is prepared using a plasticizer, and wherein optionally the plasticizer comprises an aliphatic polyester comprising $C_{2-10}$ diacid residues and $C_{2-10}$ diol residues.

Another embodiment of the invention is directed to a solvent-cast or melt-extruded film made from a mixed ester defined by the following parameters:

(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is greater than 10, for example greater than 10 to 200; and (b) the degree of non-acetyl ester substitution (e.g., propionyl (Pr) plus butyryl (Bu) groups) is from 0.5 to 1.75, or from 1.1 to 1.75;

wherein the film is prepared using a plasticizer, and wherein optionally the plasticizer comprises an aliphatic polyester comprising $C_{2-10}$ diacid residues and $C_{2-10}$ diol residues.

Another embodiment of the invention is directed to a solvent-cast or melt-extruded film made from a mixed ester defined by the following parameters:

(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is greater than 10, for example greater than 10 to 200; and (b) the degree of non-acetyl ester substitution (e.g., propionyl (Pr) plus butyryl (Bu) groups) is from 1.0 to 1.6, or from 1.1 to 1.6;

wherein the film is prepared using a plasticizer, and wherein optionally the plasticizer comprises an aliphatic polyester comprising $C_{2-10}$ diacid residues and $C_{2-10}$ diol residues.

Another embodiment of the invention is directed to a solvent-cast or melt-extruded film made from a mixed ester defined by the following parameters:

(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 15 or greater, for example 15 to 200, for example greater than 15, or for example greater than 15 to 200; and (b) the degree of non-acetyl ester substitution (e.g., propionyl (Pr) plus butyryl (Bu) groups) is greater than 0.5, for example greater than 1.1;

wherein the film is prepared using a plasticizer, and wherein optionally the plasticizer comprises an aliphatic polyester comprising $C_{2-10}$ diacid residues and $C_{2-10}$ diol residues.

Another embodiment of the invention is directed to a solvent-cast or melt-extruded film made from a mixed ester defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 15 or greater, for example 15 to 200, for example greater than 15, or for example greater than 15 to 200; and
(b) the degree of non-acetyl ester substitution (e.g., propionyl (Pr) plus butyryl (Bu) groups) is from 0.5 to 1.75, or from 1.1 to 1.75;
wherein the film is prepared using a plasticizer, and wherein optionally the plasticizer comprises an aliphatic polyester comprising $C_{2-10}$ diacid residues and $C_{2-10}$ diol residues.

Another embodiment of the invention is directed to a solvent-cast or melt-extruded film made from a mixed ester defined by the following parameters:
(a) the ratio of the non-acetyl ester degree of substitution (e.g. the DS of propionyl plus butyryl groups, although it could also include higher carbon atom groups, such as pentanoyl, hexanoyl, etc.) to the hydroxyl degree of substitution (referred to as the "hydroxyl ratio") is 15 or greater, for example 15 to 200, for example greater than 15, or for example greater than 15 to 200; and
(b) the degree of non-acetyl ester substitution (e.g., propionyl (Pr) plus butyryl (Bu) groups) is from 1.0 to 1.6, or from 1.1 to 1.6;
wherein the film is prepared using a plasticizer, and wherein optionally the plasticizer comprises an aliphatic polyester comprising $C_{2-10}$ diacid residues and $C_{2-10}$ diol residues.

In one embodiment, the mixed ester system of the present invention has a total degree of substitution chosen from one of the following ranges: 2.75 to 3.00, 2.76 to 3.00, 2.77 to 3.00, 2.78 to 3.00, 2.79 to 3.00, 2.80 to 3.00, 2.81 to 3.00, 2.82 to 3.00, 2.83 to 3.00, 2.84 to 3.00, 2.85 to 3.00, 2.86 to 3.00, 2.87 to 3.00, 2.88 to 3.00, 2.89 to 3.00, 2.90 to 3.00, 2.91 to 3.00, 2.92 to 3.00, 2.93 to 3.00, 2.94 to 3.00, 2.95 to 3.00, 2.96 to 3.00, 2.97 to 3.00, 2.98 to 3.00, 2.99 to 3.00, 2.75 to 2.99, 2.76 to 2.99, 2.77 to 2.99, 2.78 to 2.99, 2.79 to 2.99, 2.80 to 2.99, 2.81 to 2.99, 2.82 to 2.99, 2.83 to 2.99, 2.84 to 2.99, 2.85 to 2.99, 2.86 to 2.99, 2.87 to 2.99, 2.88 to 2.99, 2.89 to 2.99, 2.90 to 2.99, 2.91 to 2.99, 2.92 to 2.99, 2.93 to 2.99, 2.94 to 2.99, 2.95 to 2.99, 2.96 to 2.99, 2.97 to 2.99, 2.98 to 2.99, 2.75 to 2.98, 2.76 to 2.98, 2.77 to 2.98, 2.78 to 2.98, 2.79 to 2.98, 2.80 to 2.98, 2.81 to 2.98, 2.82 to 2.98, 2.83 to 2.98, 2.84 to 2.98, 2.85 to 2.98, 2.86 to 2.98, 2.87 to 2.98, 2.88 to 2.98, 2.89 to 2.98, 2.90 to 2.98, 2.91 to 2.98, 2.92 to 2.98, 2.93 to 2.98, 2.94 to 2.98, 2.95 to 2.98, 2.96 to 2.98, 2.97 to and 2.98.

In another embodiment, the mixed ester system of the present invention has a total degree of substitution chosen from one of the following ranges: 2.75 to 2.97, 2.76 to 2.97, 2.77 to 2.97, 2.78 to 2.97, 2.79 to 2.97, 2.80 to 2.97, 2.81 to 2.97, 2.82 to 2.97, 2.83 to 2.97, 2.84 to 2.97, 2.85 to 2.97, 2.86 to 2.97, 2.87 to 2.97, 2.88 to 2.97, 2.89 to 2.97, 2.90 to 2.97, 2.91 to 2.97, 2.92 to 2.97, 2.93 to 2.97, 2.94 to 2.97, 2.95 to 2.97, 2.96 to 2.97, 2.75 to 2.96, 2.76 to 2.96, 2.77 to 2.96, 2.78 to 2.96, 2.79 to 2.96, 2.80 to 2.96, 2.81 to 2.96, 2.82 to 2.96, 2.83 to 2.96, 2.84 to 2.96, 2.85 to 2.96, 2.86 to 2.96, 2.87 to 2.96, 2.88 to 2.96, 2.89 to 2.96, 2.90 to 2.96, 2.91 to 2.96, 2.92 to 2.96, 2.93 to 2.96, 2.94 to 2.96, 2.95 to 2.96, 2.75 to 2.95, 2.76 to 2.95, 2.77 to 2.95, 2.78 to 2.95, 2.79 to 2.95, 2.80 to 2.95, 2.81 to 2.95, 2.82 to 2.95, 2.83 to 2.95, 2.84 to 2.95, 2.85 to 2.95, 2.86 to 2.95, 2.87 to 2.95, 2.88 to 2.95, 2.89 to 2.95, 2.90 to 2.95, 2.91 to 2.95, 2.92 to 2.95, 2.93 to 2.95, 2.94 to 2.95, 2.75 to 2.94, 2.76 to 2.94, 2.77 to 2.94, 2.78 to 2.94, 2.79 to 2.94, 2.80 to 2.94, 2.81 to 2.94, 2.82 to 2.94, 2.83 to 2.94, 2.84 to 2.94, 2.85 to 2.94, 2.86 to 2.94, 2.87 to 2.94, 2.88 to 2.94, 2.89 to 2.94, 2.90 to 2.94, 2.91 to 2.94, 2.92 to 2.94, 2.93 to 2.94, 2.75 to 2.93, 2.76 to 2.93, 2.77 to 2.93, 2.78 to 2.93, 2.79 to 2.93, 2.80 to 2.93, 2.81 to 2.93, 2.82 to 2.93, 2.83 to 2.93, 2.84 to 2.93, 2.85 to 2.93, 2.86 to 2.93, 2.87 to 2.93, 2.88 to 2.93, 2.89 to 2.93, 2.90 to 2.93, 2.91 to 2.93, and 2.92 to 2.93.

In another embodiment, the mixed ester system of the present invention has a total degree of substitution chosen from one of the following ranges: 2.75 to 2.92, 2.76 to 2.92, 2.77 to 2.92, 2.78 to 2.92, 2.79 to 2.92, 2.80 to 2.92, 2.81 to 2.92, 2.82 to 2.92, 2.83 to 2.92, 2.84 to 2.92, 2.85 to 2.92, 2.86 to 2.92, 2.87 to 2.92, 2.88 to 2.92, 2.89 to 2.92, 2.90 to 2.92, 2.91 to 2.92, 2.75 to 2.91, 2.76 to 2.91, 2.77 to 2.91, 2.78 to 2.91, 2.79 to 2.91, 2.80 to 2.91, 2.81 to 2.91, 2.82 to 2.91, 2.83 to 2.91, 2.84 to 2.91, 2.85 to 2.91, 2.86 to 2.91, 2.87 to 2.91, 2.88 to 2.91, 2.89 to 2.91, 2.90 to 2.91, 2.75 to 2.90, 2.76 to 2.90, 2.77 to 2.90, 2.78 to 2.90, 2.79 to 2.90, 2.80 to 2.90, 2.81 to 2.90, 2.82 to 2.90, 2.83 to 2.90, 2.84 to 2.90, 2.85 to 2.90, 2.86 to 2.90, 2.87 to 2.90, 2.88 to 2.90, 2.89 to 2.90, 2.75 to 2.89, 2.76 to 2.89, 2.77 to 2.89, 2.78 to 2.89, 2.79 to 2.89, 2.80 to 2.89, 2.81 to 2.89, 2.82 to 2.89, 2.83 to 2.89, 2.84 to 2.89, 2.85 to 2.89, 2.86 to 2.89, 2.87 to 2.89, 2.88 to 2.89, 2.75 to 2.88, 2.76 to 2.88, 2.77 to 2.88, 2.78 to 2.88, 2.79 to 2.88, 2.80 to 2.88, 2.81 to 2.88, 2.82 to 2.88, 2.83 to 2.88, 2.84 to 2.88, 2.85 to 2.88, 2.86 to 2.88, 2.87 to 2.88, 2.75 to 2.87, 2.76 to 2.87, 2.77 to 2.87, 2.78 to 2.87, 2.79 to 2.87, 2.80 to 2.87, 2.81 to 2.87, 2.82 to 2.87, 2.83 to 2.87, 2.84 to 2.87, 2.85 to 2.87, 2.86 to 2.87, 2.75 to 2.86, 2.76 to 2.86, 2.77 to 2.86, 2.78 to 2.86, 2.79 to 2.86, 2.80 to 2.86, 2.81 to 2.86, 2.82 to 2.86, 2.83 to 2.86, 2.84 to 2.86, 2.85 to 2.86, 2.75 to 2.85, 2.76 to 2.85, 2.77 to 2.85, 2.78 to 2.85, 2.79 to 2.85, 2.80 to 2.85, 2.81 to 2.85, 2.82 to 2.85, 2.83 to 2.85, and 2.84 to 2.85.

In one embodiment, the mixed ester system of the present invention has a total degree of substitution chosen from one of the following ranges: 2.75 to 2.84, 2.76 to 2.84, 2.77 to 2.84, 2.78 to 2.84, 2.79 to 2.84, 2.80 to 2.84, 2.81 to 2.84, 2.82 to 2.84, 2.83 to 2.84, 2.75 to 2.83, 2.76 to 2.83, 2.77 to 2.83, 2.78 to 2.83, 2.79 to 2.83, 2.80 to 2.83, 2.81 to 2.83, 2.82 to 2.83, 2.75 to 2.82, 2.76 to 2.82, 2.77 to 2.82, 2.78 to 2.82, 2.79 to 2.82, 2.80 to 2.82, 2.81 to 2.82, 2.75 to 2.81, 2.76 to 2.81, 2.77 to 2.81, 2.78 to 2.81, 2.79 to 2.81, 2.80 to 2.81, 2.75 to 2.80, 2.76 to 2.80, 2.77 to 2.80, 2.78 to 2.80, 2.79 to 2.80, 2.75 to 2.79, 2.76 to 2.79, 2.77 to 2.79, 2.78 to 2.79, 2.75 to 2.78, 2.76 to 2.78, 2.77 to 2.78, 2.75 to 2.77, 2.76 to 2.77, and 2.75 to 2.76.

In another embodiment, the ratio of the non-acetyl ester degree of substitution to the hydroxyl degree of substitution in the mixed ester of the present invention is chosen from among one of the following ranges: 10 to 200, greater than 10, greater than 10 to 200, 15 to 200, 20 to 200, 25 to 200, to 200, 35 to 200, 40 to 200, 45 to 200, 50 to 200, 55 to 200, 60 to 200, 65 to 200, 70 to 200, 75 to 200, 80 to 200, 85 to 200, 90 to 200, 95 to 200, 100 to 200, 105 to 200, 110 to 200, 115 to 200, 120 to 200, 125 to 200, 130 to 200, 135 to 200, 140 to 200, 145 to 200, 150 to 200, 155 to 200, 160 to 200, 165 to 200, 170 to 200, 175 to 200, 180 to 200, 185 to 200, 190 to 200, 195 to 200, greater than 15, greater than 15 to 200, greater than 15 to 195, greater than 15 to 190, greater than 15 to 185, greater than 15 to 180, greater than 15 to 175, greater than 15 to 170, greater than 15 to 165, greater than 15 to 160, greater than 15 to 155, greater than 15 to 150, greater than 15 to 145, greater than 15 to 140, greater than 15 to 135, greater than 15 to 130, greater than 15 to 125, greater than 15 to 120, greater than 15 to 115, greater than 15 to 110, greater than 15 to 105, greater than 15 to 100, greater than 15 to 95, greater than 15 to 90, greater than 15 to 85, greater than 15 to 80, greater than 15 to 75, greater than 15 to 70, greater than 15 to 65, greater than 15 to 60, greater than 15 to 55, greater than 15 to 50, greater than 15 to 45, greater than 15 to 40, greater than 15 to 35, greater than 15 to 30, greater than 15 to 25, greater than 15 to 20.

In another embodiment, the ratio of the non-acetyl ester degree of substitution to the hydroxyl degree of substitution in the mixed ester of the present invention is chosen from among one of the following ranges: 10 to 195, greater than 10 to 195, 15 to 195, 20 to 195, 25 to 195, 30 to 195, 35 to 195, 40 to 195, 45 to 195, 50 to 195, 55 to 195, 60 to 195, 65 to 195, 70 to 195, 75 to 195, 80 to 195, 85 to 195, 90 to 195, 95 to 195, 100 to 195, 105 to 195, 110 to 195, 115 to 195, 120 to 195, 125 to 195, 130 to 195, 135 to 195, 140 to 195, 145 to 195, 150 to 195, 155 to 195, 160 to 195, 165 to 195, 170 to 195, 175 to 195, 180 to 195, 185 to 195, 190 to 195, 10 to 190, greater than 10 to 190, 15 to 190, 20 to 190, 25 to 190, 30 to 190, 35 to 190, 40 to 190, 45 to 190, 50 to 190, 55 to 190, 60 to 190, 65 to 190, 70 to 190, 75 to 190, 80 to 190, 85 to 190, 90 to 190, 95 to 190, 100 to 190, 105 to 190, 110 to 190, 115 to 190, 120 to 190, 125 to 190, 130 to 190, 135 to 190, 140 to 190, 145 to 190, 150 to 190, 155 to 190, 160 to 190, 165 to 190, 170 to 190, 175 to 190, 180 to 190, 185 to 190, 10 to 185, greater than 10 to 185, 15 to 185, 20 to 185, 25 to 185, 30 to 185, 35 to 185, 40 to 185, 45 to 185, 50 to 185, 55 to 185, 60 to 185, 65 to 185, 70 to 185, 75 to 185, 80 to 185, 85 to 185, 90 to 185, 95 to 185, 100 to 185, 105 to 185, 110 to 185, 115 to 185, 120 to 185, 125 to 185, 130 to 185, 135 to 185, 140 to 185, 145 to 185, 150 to 185, 155 to 185, 160 to 185, 165 to 185, 170 to 185, 175 to 185, and 180 to 185.

In another embodiment, the ratio of the non-acetyl ester degree of substitution to the hydroxyl degree of substitution in the mixed ester of the present invention is chosen from among one of the following ranges: 10 to 180, greater than 10 to 180, 15 to 180, 20 to 180, 25 to 180, 30 to 180, 35 to 180, 40 to 180, 45 to 180, 50 to 180, 55 to 180, 60 to 180, 65 to 180, 70 to 180, 75 to 180, 80 to 180, 85 to 180, 90 to 180, 95 to 180, 100 to 180, 105 to 180, 110 to 180, 115 to 180, 120 to 180, 125 to 180, 130 to 180, 135 to 180, 140 to 180, 145 to 180, 150 to 180, 155 to 180, 160 to 180, 165 to 180, 170 to 180, 175 to 180, 10 to 175, greater than 10 to 175, 15 to 175, 20 to 175, 25 to 175, 30 to 175, 35 to 175, 40 to 175, 45 to 175, 50 to 175, 55 to 175, 60 to 175, 65 to 175, 70 to 175, 75 to 175, 80 to 175, 85 to 175, 90 to 175, 95 to 175, 100 to 175, 105 to 175, 110 to 175, 115 to 175, 120 to 175, 125 to 175, 130 to 175, 135 to 175, 140 to 175, 145 to 175, 150 to 175, 155 to 175, 160 to 175, 165 to 175, 170 to 175, 10 to 170, greater than 10 to 170, 15 to 170, 20 to 170, 25 to 170, 30 to 170, 35 to 170, 40 to 170, 45 to 170, 50 to 170, 55 to 170, 60 to 170, 65 to 170, 70 to 170, 75 to 170, 80 to 170, 85 to 170, 90 to 170, 95 to 170, 100 to 170, 105 to 170, 110 to 170, 115 to 170, 120 to 170, 125 to 170, 130 to 170, 135 to 170, 140 to 170, 145 to 170, 150 to 170, 155 to 170, 160 to 170, 165 to 170, 10 to 165, greater than 10 to 165, 15 to 165, 20 to 165, 25 to 165, 30 to 165, 35 to 165, 40 to 165, 45 to 165, 50 to 165, 55 to 165, 60 to 165, 65 to 165, 70 to 165, 75 to 165, 80 to 165, 85 to 165, 90 to 165, 95 to 165, 100 to 165, 105 to 165, 110 to 165, 115 to 165, 120 to 165, 125 to 165, 130 to 165, 135 to 165, 140 to 165, 145 to 165, 150 to 165, 155 to 165, and 160 to 165.

In another embodiment, the ratio of the non-acetyl ester degree of substitution to the hydroxyl degree of substitution in the mixed ester of the present invention is chosen from among one of the following ranges: 10 to 160, greater than 10 to 160, 15 to 160, 20 to 160, 25 to 160, 30 to 160, 35 to 160, 40 to 160, 45 to 160, 50 to 160, 55 to 160, 60 to 160, 65 to 160, 70 to 160, 75 to 160, 80 to 160, 85 to 160, 90 to 160, 95 to 160, 100 to 160, 105 to 160, 110 to 160, 115 to 160, 120 to 160, 125 to 160, 130 to 160, 135 to 160, 140 to 160, 145 to 160, 150 to 160, 155 to 160, 10 to 155, greater than 10 to 155, 15 to 155, 20 to 155, 25 to 155, 30 to 155, 35 to 155, 40 to 155, 45 to 155, 50 to 155, 55 to 155, 60 to 155, 65 to 155, 70 to 155, 75 to 155, 80 to 155, 85 to 155, 90 to 155, 95 to 155, 100 to 155, 105 to 155, 110 to 155, 115 to 155, 120 to 155, 125 to 155, 130 to 155, 135 to 155, 140 to 155, 145 to 155, 150 to 155, 10 to 150, greater than 10 to 150, 15 to 150, 20 to 150, 25 to 150, 30 to 150, 35 to 150, 40 to 150, 45 to 150, 50 to 150, 55 to 150, 60 to 150, 65 to 150, 70 to 150, 75 to 150, 80 to 150, 85 to 150, 90 to 150, 95 to 150, 100 to 150, 105 to 150, 110 to 150, 115 to 150, 120 to 150, 125 to 150, 130 to 150, 135 to 150, 140 to 150, 145 to 150, 10 to 145, greater than 10 to 145, 15 to 145, 20 to 145, 25 to 145, 30 to 145, 35 to 145, 40 to 145, 45 to 145, 50 to 145, 55 to 145, 60 to 145, 65 to 145, 70 to 145, 75 to 145, 80 to 145, 85 to 145, 90 to 145, 95 to 145, 100 to 145, 105 to 145, 110 to 145, 115 to 145, 120 to 145, 125 to 145, 130 to 145, 135 to 145, 140 to 145, 10 to 140, greater than 10 to 140, 15 to 140, 20 to 140, 25 to 140, 30 to 140, 35 to 140, 40 to 140, 45 to 140, 50 to 140, 55 to 140, 60 to 140, 65 to 140, 70 to 140, 75 to 140, 80 to 140, 85 to 140, 90 to 140, 95 to 140, 100 to 140, 105 to 140, 110 to 140, 115 to 140, 120 to 140, 125 to 140, 130 to 140, 135 to 140, 10 to 135, greater than 10 to 135, 15 to 135, 20 to 135, 25 to 135, 30 to 135, 35 to 135, 40 to 135, 45 to 135, 50 to 135, 55 to 135, 60 to 135, 65 to 135, 70 to 135, 75 to 135, 80 to 135, 85 to 135, 90 to 135, 95 to 135, 100 to 135, 105 to 135, 110 to 135, 115 to 135, 120 to 135, 125 to 135, 130 to 135, 10 to 130, greater than 10 to 130, 15 to 130, 20 to 130, 25 to 130, 30 to 130, 35 to 130, 40 to 130, 45 to 130, 50 to 130, 55 to 130, 60 to 130, 65 to 130, 70 to 130, 75 to 130, 80 to 130, 85 to 130, 90 to 130, 95 to 130, 100 to 130, 105 to 130, 110 to 130, 115 to 130, 120 to 130, and 125 to 130.

In another embodiment, the ratio of the non-acetyl ester degree of substitution to the hydroxyl degree of substitution in the mixed ester of the present invention is chosen from among one of the following ranges: 10 to 125, greater than 10 to 125, 15 to 125, 20 to 125, 25 to 125, 30 to 125, 35 to 125, 40 to 125, 45 to 125, 50 to 125, 55 to 125, 60 to 125, 65 to 125, 70 to 125, 75 to 125, 80 to 125, 85 to 125, 90 to 125, 95 to 125, 100 to 125, 105 to 125, 110 to 125, 115 to 125, 120 to 125, 10 to 120, greater than 10 to 120, 15 to 120, 20 to 120, 25 to 120, 30 to 120, 35 to 120, 40 to 120, 45 to 120, 50 to 120, 55 to 120, 60 to 120, 65 to 120, 70 to 120, 75 to 120, 80 to 120, 85 to 120, 90 to 120, 95 to 120, 100 to 120, 105 to 120, 110 to 120, 115 to 120, 10 to 115, greater than 10 to 115, 15 to 115, 20 to 115, 25 to 115, 30 to 115, 35 to 115, 40 to 115, 45 to 115, 50 to 115, 55 to 115, 60 to 115, 65 to 115, 70 to 115, 75 to 115, 80 to 115, 85 to 115, 90 to 115, 95 to 115, 100 to 115, 105 to 115, 110 to 115, 10 to 110, greater than 10 to 110, 15 to 110, 20 to 110, 25 to 110, 30 to 110, 35 to 110, 40 to 110, 45 to 110, 50 to 110, 55 to 110, 60 to 110, 65 to 110, 70 to 110, 75 to 110, 80 to 110, 85 to 110, 90 to 110, 95 to 110, 100 to 110, 105 to 110, 10 to 105, greater than 10 to 105, 15 to 105, 20 to 105, 25 to 105, 30 to 105, 35 to 105, 40 to 105, 45 to 105, 50 to 105, 55 to 105, 60 to 105, 65 to 105, 70 to 105, 75 to 105, 80 to 105, 85 to 105, 90 to 105, 95 to 105, 100 to 105, 10 to 100, greater than 10 to 100, 15 to 100, 20 to 100, 25 to 100, 30 to 100, 35 to 100, 40 to 100, 45 to 100, 50 to 100, 55 to 100, 60 to 100, 65 to 100, 70 to 100, 75 to 100, 80 to 100, 85 to 100, 90 to 100, 95 to 100, 10 to 95, greater than 10 to 95, 15 to 95, 20 to 95, 25 to 95, 30 to 95, 35 to 95, 40 to 95, 45 to 95, 50 to 95, 55 to 95, 60 to 95, 65 to 95, 70 to 95, 75 to 95, 80 to 95, 85 to 95, 90 to 95, 10 to 90, greater than 10 to 90, 15 to 90, 20 to 90, 25 to 90, 30 to 90, 35 to 90, 40 to 90, 45 to 90, 50 to 90, 55 to 90, 60 to 90, 65 to 90, 70 to 90, 75 to 90, 80 to 90, and 85 to 90.

In another embodiment, the ratio of the non-acetyl ester degree of substitution to the hydroxyl degree of substitution in the mixed ester of the present invention is chosen from among one of the following ranges: 10 to 85, greater than 10 to 85, 15 to 85, 20 to 85, 25 to 85, 30 to 85, 35 to 85, 40 to 85, 45 to 85, 50 to 85, 55 to 85, 60 to 85, 65 to 85, 70 to 85, 75 to 85, 80 to 85, 10 to 80, greater than 10 to 80, 15 to 80, 20 to 80, 25 to 80, 30 to 80, 35 to 80, 40 to 80, 45 to 80, 50 to 80, 55 to 80, 60 to 80, 65 to 80, 70 to 80, 75 to 80, 10 to 75, greater than 10 to 75, 15 to 75, 20 to 75, 25 to 75, 30 to 75, 35 to 75, 40 to 75, 45 to 75, 50 to 75, 55 to 75, 60 to 75, 65 to 75, 70 to 75, 10 to 70, greater than 10 to 70, 15 to 70, 20 to 70, 25 to 70, 30 to 70, 35 to 70, 40 to 70, 45 to 70, 50 to 70, 55 to 70, 60 to 70, 65 to 70, 10 to 65, greater than 10 to 65, 15 to 65, 20 to 65, 25 to 65, 30 to 65, 35 to 65, 40 to 65, 45 to 65, 50 to 65, 55 to 65, 60 to 65, 10 to 60, greater than 10 to 60, 15 to 60, 20 to 60, 25 to 60, 30 to 60, 35 to 60, 40 to 60, 45 to 60, 50 to 60, 55 to 60, 10 to 55, greater than 10 to 55, 15 to 55, 20 to 55, 25 to 55, 30 to 55, 35 to 55, 40 to 55, 45 to 55, 50 to 55, 10 to 50, greater than 10 to 50, 15 to 50, 20 to 50, 25 to 50, 30 to 50, 35 to 50, 40 to 50, 45 to 50, 10 to 45, greater than 10 to 45, 15 to 45, 20 to 45, 25 to 45, 30 to 45, 35 to 45, 40 to 45, 10 to 40, greater than 10 to 40, 15 to 40, 20 to 40, 25 to 40, 30 to 40, 35 to 40, 10 to 35, greater than 10 to 35, 15 to 35, 20 to 35, 25 to 35, 30 to 35, 10 to 30, greater than 10 to 30, 15 to 30, 20 to 30, 25 to 30, 10 to 25, greater than 10 to 25, 15 to 25, 20 to 25, 10 to 20, greater than 10 to 20, 15 to 20, 10 to 15, and greater than 10 to 15.

In another embodiment, the degree of non-acetyl substitution in the mixed ester of the present invention is chosen from among one of the following ranges: greater than 0.5 to 0.55, greater than 0.5 to 0.6, greater than 0.5 to 0.65, greater than 0.5 to 0.7, greater than 0.5 to 0.75, greater than 0.5 to 0.8, greater than 0.5 to 0.85, greater than 0.5 to 0.9, greater than 0.5 to 0.95, greater than 0.5 to 1.0, greater than 0.5 to 1.05, greater than 0.5 to 1.1, greater than 0.5 to 1.15, greater than 0.5 to 1.2, greater than 0.5 to 1.25, greater than 0.5 to 1.3, greater than 0.5 to 1.35, greater than 0.5 to 1.4, greater than 0.5 to 1.45, greater than 0.5 to 1.5, greater than 0.5 to 1.55, greater than 0.5 to 1.6, greater than 0.5 to 1.65, greater than 0.5 to 1.7, greater than 0.5 to 1.75, greater than 0.5 to 1.8, greater than 0.5 to 1.85, 0.35 to 1.85, 0.4 to 1.85, 0.45 to 1.85, 0.5 to 1.85, 0.55 to 1.85, 0.6 to 1.85, 0.65 to 1.85, 0.7 to 1.85, 0.75 to 1.85, 0.8 to 1.85, 0.85 to 1.85, 0.9 to 1.85, 0.95 to 1.85, 1.0 to 1.85, 1.05 to 1.85, 1.1 to 1.85, 1.15 to 1.85, 1.2 to 1.85, 1.25 to 1.85, 1.3 to 1.85, 1.35 to 1.85, 1.4 to 1.85, 1.45 to 1.85, 1.5 to 1.85, 1.55 to 1.85, 1.6 to 1.85, 1.65 to 1.85, 1.7 to 1.85, 1.75 to 1.85, 1.8 to 1.85, 0.35 to 1.8, 0.4 to 1.8, 0.45 to 1.8, 0.5 to 1.8, 0.55 to 1.8, 0.6 to 1.8, 0.65 to 1.8, 0.7 to 1.8, 0.75 to 1.8, 0.8 to 1.8, 0.85 to 1.8, 0.9 to 1.8, 0.95 to 1.8, 1.0 to 1.8, 1.05 to 1.8, 1.1 to 1.8, 1.15 to 1.8, 1.2 to 1.8, 1.25 to 1.8, 1.3 to 1.8, 1.35 to 1.8, 1.4 to 1.8, 1.45 to 1.8, 1.5 to 1.8, 1.55 to 1.8, 1.6 to 1.8, 1.65 to 1.8, 1.7 to 1.8, 1.75 to 1.8, 0.35 to 1.75, 0.4 to 1.75, 0.45 to 1.75, 0.5 to 1.75, 0.55 to 1.75, 0.6 to 1.75, 0.65 to 1.75, 0.7 to 1.75, 0.75 to 1.75, 0.8 to 1.75, 0.85 to 1.75, 0.9 to 1.75, 0.95 to 1.75, 1.0 to 1.75, 1.05 to 1.75, 1.1 to 1.75, 1.15 to 1.75, 1.2 to 1.75, 1.25 to 1.75, 1.3 to 1.75, 1.35 to 1.75, 1.4 to 1.75, 1.45 to 1.75, 1.5 to 1.75, 1.55 to 1.75, 1.6 to 1.75, 1.65 to 1.75, 1.7 to 1.75, 0.35 to 1.7, 0.4 to 1.7, 0.45 to 1.7, 0.5 to 1.7, 0.55 to 1.7, 0.6 to 1.7, 0.65 to 1.7, 0.7 to 1.7, 0.75 to 1.7, 0.8 to 1.7, 0.85 to 1.7, 0.9 to 1.7, 0.95 to 1.7, 1.0 to 1.7, 1.05 to 1.7, 1.1 to 1.7, 1.15 to 1.7, 1.2 to 1.7, 1.25 to 1.7, 1.3 to 1.7, 1.35 to 1.7, 1.4 to 1.7, 1.45 to 1.7, 1.5 to 1.7, 1.55 to 1.7, 1.6 to 1.7, 1.65 to 1.7, 0.35 to 1.65, 0.4 to 1.65, 0.45 to 1.65, 0.5 to 1.65, 0.55 to 1.65, 0.6 to 1.65, 0.65 to 1.65, 0.7 to 1.65, 0.75 to 1.65, 0.8 to 1.65, 0.85 to 1.65, 0.9 to 1.65, 0.95 to 1.65, 1.0 to 1.65, 1.05 to 1.65, 1.1 to 1.65, 1.15 to 1.65, 1.2 to 1.65, 1.25 to 1.65, 1.3 to 1.65, 1.35 to 1.65, 1.4 to 1.65, 1.45 to 1.65, 1.5 to 1.65, 1.55 to 1.65, 1.6 to 1.65, 0.35 to 1.6, 0.4 to 1.6, 0.45 to 1.6, 0.5 to 1.6, 0.55 to 1.6, 0.6 to 1.6, 0.65 to 1.6, 0.7 to 1.6, 0.75 to 1.6, 0.8 to 1.6, 0.85 to 1.6, 0.9 to 1.6, 0.95 to 1.6, 1.0 to 1.6, 1.05 to 1.6, 1.1 to 1.6, 1.15 to 1.6, 1.2 to 1.6, 1.25 to 1.6, 1.3 to 1.6, 1.35 to 1.6, 1.4 to 1.6, 1.45 to 1.6, 1.5 to 1.6, 1.55 to 1.6, 0.35 to 1.55, 0.4 to 1.55, 0.45 to 1.55, 0.5 to 1.55, 0.55 to 1.55, 0.6 to 1.55, 0.65 to 1.55, 0.7 to 1.55, 0.75 to 1.55, 0.8 to 1.55, 0.85 to 1.55, 0.9 to 1.55, 0.95 to 1.55, 1.0 to 1.55, 1.05 to 1.55, 1.1 to 1.55, 1.15 to 1.55, 1.2 to 1.55, 1.25 to 1.55, 1.3 to 1.55, 1.35 to 1.55, 1.4 to 1.55, 1.45 to 1.55, and 1.5 to 1.55.

In another embodiment, the degree of non-acetyl substitution in the mixed ester of the present invention is chosen from among one of the following ranges: 0.35 to 1.5, 0.4 to 1.5, 0.45 to 1.5, 0.5 to 1.5, 0.55 to 1.5, 0.6 to 1.5, 0.65 to 1.5, 0.7 to 1.5, 0.75 to 1.5, 0.8 to 1.5, 0.85 to 1.5, 0.9 to 1.5, 0.95 to 1.5, 1.0 to 1.5, 1.05 to 1.5, 1.1 to 1.5, 1.15 to 1.5, 1.2 to 1.5, 1.25 to 1.5, 1.3 to 1.5, 1.35 to 1.5, 1.4 to 1.5, 1.45 to 1.5, 0.35 to 1.45, 0.4 to 1.45, 0.45 to 1.45, 0.5 to 1.45, 0.55 to 1.45, 0.6 to 1.45, 0.65 to 1.45, 0.7 to 1.45, 0.75 to 1.45, 0.8 to 1.45, 0.85 to 1.45, 0.9 to 1.45, 0.95 to 1.45, 1.0 to 1.45, 1.05 to 1.45, 1.1 to 1.45, 1.15 to 1.45, 1.2 to 1.45, 1.25 to 1.45, 1.3 to 1.45, 1.35 to 1.45, 1.4 to 1.45, 0.35 to 1.4, 0.4 to 1.4, 0.45 to 1.4, 0.5 to 1.4, 0.55 to 1.4, 0.6 to 1.4, 0.65 to 1.4, 0.7 to 1.4, 0.75 to 1.4, 0.8 to 1.4, 0.85 to 1.4, 0.9 to 1.4, 0.95 to 1.4, 1.0 to 1.4, 1.05 to 1.4, 1.1 to 1.4, 1.15 to 1.4, 1.2 to 1.4, 1.25 to 1.4, 1.3 to 1.4, 1.35 to 1.4, 0.35 to 1.35, 0.4 to 1.35, 0.45 to 1.35, 0.5 to 1.35, 0.55 to 1.35, 0.6 to 1.35, 0.65 to 1.35, 0.7 to 1.35, 0.75 to 1.35, 0.8 to 1.35, 0.85 to 1.35, 0.9 to 1.35, 0.95 to 1.35, 1.0 to 1.35, 1.05 to 1.35, 1.1 to 1.35, 1.15 to 1.35, 1.2 to 1.35, 1.25 to 1.35, 1.3 to 1.35, 0.35 to 1.3, 0.4 to 1.3, 0.45 to 1.3, 0.5 to 1.3, 0.55 to 1.3, 0.6 to 1.3, 0.65 to 1.3, 0.7 to 1.3, 0.75 to 1.3, 0.8 to 1.3, 0.85 to 1.3, 0.9 to 1.3, 0.95 to 1.3, 1.0 to 1.3, 1.05 to 1.3, 1.1 to 1.3, 1.15 to 1.3, 1.2 to 1.3, 1.25 to 1.3, 0.35 to 1.25, 0.4 to 1.25, 0.45 to 1.25, 0.5 to 1.25, 0.55 to 1.25, 0.6 to 1.25, 0.65 to 1.25, 0.7 to 1.25, 0.75 to 1.25, 0.8 to 1.25, 0.85 to 1.25, 0.9 to 1.25, 0.95 to 1.25, 1.0 to 1.25, 1.05 to 1.25, 1.1 to 1.25, 1.15 to 1.25, 1.2 to 1.25, 0.35 to 1.2, 0.4 to 1.2, 0.45 to 1.2, 0.5 to 1.2, 0.55 to 1.2, 0.6 to 1.2, 0.65 to 1.2, 0.7 to 1.2, 0.75 to 1.2, 0.8 to 1.2, 0.85 to 1.2, 0.9 to 1.2, 0.95 to 1.2, 1.0 to 1.2, 1.05 to 1.2, 1.1 to 1.2, 1.15 to 1.2, 0.35 to 1.15, 0.4 to 1.15, 0.45 to 1.15, 0.5 to 1.15, 0.55 to 1.15, 0.6 to 1.15, 0.65 to 1.15, 0.7 to 1.15, 0.75 to 1.15, 0.8 to 1.15, 0.85 to 1.15, 0.9 to 1.15, 0.95 to 1.15, 1.0 to 1.15, 1.05 to 1.15, 1.1 to 1.15, 0.35 to 1.1, 0.4 to 1.1, 0.45 to 1.1, 0.5 to 1.1, 0.55 to 1.1, 0.6 to 1.1, 0.65 to 1.1, 0.7 to 1.1, 0.75 to 1.1, 0.8 to 1.1, 0.85 to 1.1, 0.9 to 1.1, 0.95 to 1.1, 1.0 to 1.1, 1.05 to 1.1, 0.35 to 1.05, 0.4 to 1.05, 0.45 to 1.05, 0.5 to 1.05, 0.55 to 1.05, 0.6 to 1.05, 0.65 to 1.05, 0.7 to 1.05, 0.75 to 1.05, 0.8 to 1.05, 0.85 to 1.05, 0.9 to 1.05, 0.95 to 1.05, 1.0 to 1.05, 0.35 to 1.0, 0.4 to 1.0, 0.45 to 1.0, 0.5 to 1.0, 0.55 to 1.0, 0.6 to 1.0, 0.65 to 1.0, 0.7 to 1.0, 0.75 to 1.0, 0.8 to 1.0, 0.85 to 1.0, 0.9 to 1.0, and 0.95 to 1.0.

In another embodiment, the degree of non-acetyl substitution in the mixed ester of the present invention is chosen from among one of the following ranges: 0.35 to 0.95, 0.4 to 0.95, 0.45 to 0.95, 0.5 to 0.95, 0.55 to 0.95, 0.6 to 0.95, 0.65 to 0.95, 0.7 to 0.95, 0.75 to 0.95, 0.8 to 0.95, 0.85 to 0.95, 0.9 to 0.95, 0.35 to 0.9, 0.4 to 0.9, 0.45 to 0.9, 0.5 to 0.9, 0.55 to 0.9, 0.6 to 0.9, 0.65 to 0.9, 0.7 to 0.9, 0.75 to 0.9, 0.8 to 0.9, 0.85 to 0.9, 0.35 to 0.85, 0.4 to 0.85, 0.45 to 0.85, 0.5 to 0.85, 0.55 to 0.85, 0.6 to 0.85, 0.65 to 0.85, 0.7 to 0.85, 0.75 to 0.85, 0.8 to 0.85, 0.35 to 0.8, 0.4 to 0.8, 0.45 to 0.8, 0.5 to 0.8, 0.55 to 0.8, 0.6 to 0.8, 0.65 to 0.8, 0.7 to 0.8, 0.75 to 0.8, 0.35 to 0.75, 0.4 to 0.75, 0.45 to 0.75, 0.5 to 0.75, 0.55 to 0.75, 0.6 to 0.75, 0.65 to 0.75, 0.7 to 0.75, 0.35 to 0.7, 0.4 to 0.7, 0.45 to 0.7, 0.5 to 0.7, 0.55 to 0.7, 0.6 to 0.7, 0.65 to 0.7, 0.35 to 0.65, 0.4 to 0.65, 0.45 to 0.65, 0.5 to 0.65, 0.55 to 0.65, 0.6 to 0.65, 0.35 to 0.6, 0.4 to 0.6, 0.45 to 0.6, 0.5 to 0.6, 0.55 to 0.6, 0.35 to 0.55, 0.4 to 0.55, 0.45 to 0.55, 0.5 to 0.55, 0.35 to 0.5, 0.4 to 0.5, 0.45 to 0.5, 0.35 to 0.45, 0.4 to 0.45, and 0.35 to 0.4. In another embodiment, the degree of non-acetyl ester substitution in the mixed ester is equal to the sum of the propionyl groups plus butyryl groups.

In another embodiment, the mixed cellulose ester of the invention has an inherent viscosity chosen from among one of the following ranges: 0.8 to 1.9 dL/g, 0.85 to 1.9 dL/g, 0.9 to 1.9 dL/g, 0.95 to 1.9 dL/g, 1.0 to 1.9 dL/g, 1.05 to 1.9 dL/g, 1.1 to 1.9 dL/g, 1.15 to 1.9 dL/g, 1.2 to 1.9 dL/g, 1.25 to 1.9 dL/g, 1.3 to 1.9 dL/g, 1.35 to 1.9 dL/g, 1.4 to 1.9 dL/g, 1.45 to 1.9 dL/g, 1.5 to 1.9 dL/g, 1.55 to 1.9 dL/g, 1.6 to 1.9 dL/g, 1.65 to 1.9 dL/g, 1.7 to 1.9 dL/g, 1.75 to 1.9 dL/g, 1.8 to 1.9 dL/g, 0.8 to 1.85 dL/g, 0.85 to 1.85 dL/g, 0.9 to 1.85 dL/g, 0.95 to 1.85 dL/g, 1.0 to 1.85 dL/g, 1.05 to 1.85 dL/g, 1.1 to 1.85 dL/g, 1.15 to 1.85 dL/g, 1.2 to 1.85 dL/g, 1.25 to 1.85 dL/g, 1.3 to 1.85 dL/g, 1.35 to 1.85 dL/g, 1.4 to 1.85 dL/g, 1.45 to 1.85 dL/g, 1.5 to 1.85 dL/g, 1.55 to 1.85 dL/g, 1.6 to 1.85 dL/g, 1.65 to 1.85 dL/g, 1.7 to 1.85 dL/g, 1.75 to 1.85 dL/g, 1.8 to 1.85 dL/g, 0.8 to 1.8 dL/g, 0.85 to 1.8 dL/g, 0.9 to 1.8 dL/g, 0.95 to 1.8 dL/g, 1.0 to 1.8 dL/g, 1.05 to 1.8 dL/g, 1.1 to 1.8 dL/g, 1.15 to 1.8 dL/g, 1.2 to 1.8 dL/g, 1.25 to 1.8 dL/g, 1.3 to 1.8 dL/g, 1.35 to 1.8 dL/g, 1.4 to 1.8 dL/g, 1.45 to 1.8 dL/g, 1.5 to 1.8 dL/g, 1.55 to 1.8 dL/g, 1.6 to 1.8 dL/g, 1.65 to 1.8 dL/g, 1.7 to 1.8 dL/g, 1.75 to 1.8 dL/g, 0.8 to 1.75 dL/g, 0.85 to 1.75 dL/g, 0.9 to 1.75 dL/g, 0.95 to 1.75 dL/g, 1.0 to 1.75 dL/g, 1.05 to 1.75 dL/g, 1.1 to 1.75 dL/g, 1.15 to 1.75 dL/g, 1.2 to 1.75 dL/g, 1.25 to 1.75 dL/g, 1.3 to 1.75 dL/g, 1.35 to 1.75 dL/g, 1.4 to 1.75 dL/g, 1.45 to 1.75 dL/g, 1.5 to 1.75 dL/g, 1.55 to 1.75 dL/g, 1.6 to 1.75 dL/g, 1.65 to 1.75 dL/g, 1.7 to 1.75 dL/g, 0.8 to 1.7 dL/g, 0.85 to 1.7 dL/g, 0.9 to 1.7 dL/g, 0.95 to 1.7 dL/g, 1.0 to 1.7 dL/g, 1.05 to 1.7 dL/g, 1.1 to 1.7 dL/g, 1.15 to 1.7 dL/g, 1.2 to 1.7 dL/g, 1.25 to 1.7 dL/g, 1.3 to 1.7 dL/g, 1.35 to 1.7 dL/g, 1.4 to 1.7 dL/g, 1.45 to 1.7 dL/g, 1.5 to 1.7 dL/g, 1.55 to 1.7 dL/g, 1.6 to 1.7 dL/g, and 1.65 to 1.7 dL/g.

In another embodiment, the mixed cellulose ester of the invention has an inherent viscosity chosen from among one of the following ranges: 0.8 to 1.65 dL/g, 0.85 to 1.65 dL/g, 0.9 to 1.65 dL/g, 0.95 to 1.65 dL/g, 1.0 to 1.65 dL/g, 1.05 to 1.65 dL/g, 1.1 to 1.65 dL/g, 1.15 to 1.65 dL/g, 1.2 to 1.65 dL/g, 1.25 to 1.65 dL/g, 1.3 to 1.65 dL/g, 1.35 to 1.65 dL/g, 1.4 to 1.65 dL/g, 1.45 to 1.65 dL/g, 1.5 to 1.65 dL/g, 1.55 to 1.65 dL/g, 1.6 to 1.65 dL/g, 0.8 to 1.6 dL/g, 0.85 to 1.6 dL/g, 0.9 to 1.6 dL/g, 0.95 to 1.6 dL/g, 1.0 to 1.6 dL/g, 1.05 to 1.6 dL/g, 1.1 to 1.6 dL/g, 1.15 to 1.6 dL/g, 1.2 to 1.6 dL/g, 1.25 to 1.6 dL/g, 1.3 to 1.6 dL/g, 1.35 to 1.6 dL/g, 1.4 to 1.6 dL/g, 1.45 to 1.6 dL/g, 1.5 to 1.6 dL/g, 1.55 to 1.6 dL/g, 0.8 to 1.55 dL/g, 0.85 to 1.55 dL/g, 0.9 to 1.55 dL/g, 0.95 to 1.55 dL/g, 1.0 to 1.55 dL/g, 1.05 to 1.55 dL/g, 1.1 to 1.55 dL/g, 1.15 to 1.55 dL/g, 1.2 to 1.55 dL/g, 1.25 to 1.55 dL/g, 1.3 to 1.55 dL/g, 1.35 to 1.55 dL/g, 1.4 to 1.55 dL/g, 1.45 to 1.55 dL/g, 1.5 to 1.55 dL/g, 0.8 to 1.5 dL/g, 0.85 to 1.5 dL/g, 0.9 to 1.5 dL/g, 0.95 to 1.5 dL/g, 1.0 to 1.5 dL/g, 1.05 to 1.5 dL/g, 1.1 to 1.5 dL/g, 1.15 to 1.5 dL/g, 1.2 to 1.5 dL/g, 1.25 to 1.5 dL/g, 1.3 to 1.5 dL/g, 1.35 to 1.5 dL/g, 1.4 to 1.5 dL/g, 1.45 to 1.5 dL/g, 0.8 to 1.45 dL/g, 0.85 to 1.45 dL/g, 0.9 to 1.45 dL/g, 0.95 to 1.45 dL/g, 1.0 to 1.45 dL/g, 1.05 to 1.45 dL/g, 1.1 to 1.45 dL/g, 1.15 to 1.45 dL/g, 1.2 to 1.45 dL/g, 1.25 to 1.45 dL/g, 1.3 to 1.45 dL/g, 1.35 to 1.45 dL/g, 1.4 to 1.45 dL/g, 0.8 to 1.4 dL/g, 0.85 to 1.4 dL/g, 0.9 to 1.4 dL/g, 0.95 to 1.4 dL/g, 1.0 to 1.4 dL/g, 1.05 to 1.4 dL/g, 1.1 to 1.4 dL/g, 1.15 to 1.4 dL/g, 1.2 to 1.4 dL/g, 1.25 to 1.4 dL/g, 1.3 to 1.4 dL/g, and 1.35 to 1.4 dL/g.

In another embodiment, the mixed cellulose ester of the invention has an inherent viscosity chosen from among one of the following ranges: 0.8 to 1.35 dL/g, 0.85 to 1.35 dL/g, 0.9 to 1.35 dL/g, 0.95 to 1.35 dL/g, 1.0 to 1.35 dL/g, 1.05 to 1.35 dL/g, 1.1 to 1.35 dL/g, 1.15 to 1.35 dL/g, 1.2 to 1.35 dL/g, 1.25 to 1.35 dL/g, 1.3 to 1.35 dL/g, 0.8 to 1.3 dL/g, 0.85 to 1.3 dL/g, 0.9 to 1.3 dL/g, 0.95 to 1.3 dL/g, 1.0 to 1.3 dL/g, 1.05 to 1.3 dL/g, 1.1 to 1.3 dL/g, 1.15 to 1.3 dL/g, 1.2 to 1.3 dL/g, 1.25 to 1.3 dL/g, 0.8 to 1.25 dL/g, 0.85 to 1.25 dL/g, 0.9 to 1.25 dL/g, 0.95 to 1.25 dL/g, 1.0 to 1.25 dL/g, 1.05 to 1.25 dL/g, 1.1 to 1.25 dL/g, 1.15 to 1.25 dL/g, 1.2 to 1.25 dL/g, 0.8 to 1.2 dL/g, 0.85 to 1.2 dL/g, 0.9 to 1.2 dL/g, 0.95 to 1.2 dL/g, 1.0 to 1.2 dL/g, 1.05 to 1.2 dL/g, 1.1 to 1.2 dL/g, 1.15 to 1.2 dL/g, 0.8 to 1.15 dL/g, 0.85 to 1.15 dL/g, 0.9 to 1.15 dL/g, 0.95 to 1.15 dL/g, 1.0 to 1.15 dL/g, 1.05 to 1.15 dL/g, 1.1 to 1.15 dL/g, 0.8 to 1.1 dL/g, 0.85 to 1.1 dL/g, 0.9 to 1.1 dL/g, 0.95 to 1.1 dL/g, 1.0 to 1.1 dL/g, 1.05 to 1.1 dL/g, 0.8 to 1.05 dL/g, 0.85 to 1.05 dL/g, 0.9 to 1.05 dL/g, 0.95 to 1.05 dL/g, 1.0 to 1.05 dL/g, 0.8 to 1.0 dL/g, 0.85 to 1.0 dL/g, 0.9 to 1.0 dL/g, 0.95 to 1.0 dL/g, 0.8 to 0.95 dL/g, 0.85 to 0.95 dL/g, 0.9 to 0.95 dL/g, 0.8 to 0.9 dL/g, 0.85 to 0.9 dL/g, and 0.8 to 0.85 dL/g.

In another embodiment, the Tg of the mixed ester of the invention has at least one of the following ranges: 90° C. to 210° C., 90° C. to 205° C., 90° C. to 200° C., 90° C. to 195° C., 90° C. to 190° C., 90° C. to 185° C., 90° C. to 180° C., 90° C. to 175° C., 90° C. to 170° C., 90° C. to 165° C., 90° C. to 160° C., 90° C. to 155° C., 90° C. to 150° C., 90° C. to 145° C., 90° C. to 140° C., 90° C. to 135° C., 90° C. to 130° C., 90° C. to 125° C., 90° C. to 120° C., 90° C. to 115° C., 90° C. to 110° C., 90° C. to 105° C., 90° C. to 100° C., 90° C. to 95° C., 95° C. to 210° C., 95° C. to 205° C., 95° C. to 200° C., 95° C. to 195° C., 95° C. to 195° C., 95° C. to 185° C., 95° C. to 180° C., 95° C. to 175° C., 95° C. to 170° C., 95° C. to 165° C., 95° C. to 160° C., 95° C. to 155° C., 95° C. to 150° C., 95° C. to 145° C., 95° C. to 140° C., 95° C. to 135° C., 95° C. to 130° C., 95° C. to 125° C., 95° C. to 120° C., 95° C. to 115° C., 95° C. to 110° C., 95° C. to 105° C., 95° C. to 100° C., 100° C. to 210° C., 100° C. to 205° C., 100° C. to 200° C., 100° C. to 195° C., 100° C. to 190° C., 100° C. to 185° C., 100° C. to 180° C., 100° C. to 175° C., 100° C. to 170° C., 100° C. to 165° C., 100° C. to 160° C., 100° C. to 155° C., 100° C. to 150° C., 100° C. to 145° C., 100° C. to 140° C., 100° C. to 135° C., 100° C. to 130° C., 100° C. to 125° C., 100° C. to 120° C., 100° C. to 115° C., 100° C. to 110° C., 100° C. to 105° C., 105° C. to 210° C., 105° C. to 205° C., 105° C. to 200° C., 105° C. to 195° C., 105° C. to 195° C., 105° C. to 185° C., 105° C. to 180° C., 105° C. to 175° C., 105° C. to 170° C., 105° C. to 165° C., 105° C. to 160° C., 105° C. to 155° C., 105° C. to 150° C., 105° C. to 145° C., 105° C. to 140° C., 105° C. to 135° C., 105° C. to 130° C., 105° C. to 125° C., 105° C. to 120° C., 105° C. to 115° C., 105° C. to 110° C., 110° C. to 210° C., 110° C. to 205° C., 110° C. to 200° C., 110° C. to 195° C., 110° C. to 190° C., 110° C. to 185° C., 110° C. to 180° C., 110° C. to 175° C., 110° C. to 170° C., 110° C. to 165° C., 110° C. to 160° C., 110° C. to 155° C., 110° C. to 150° C., 110° C. to 145° C., 110° C. to 140° C., 110° C. to 135° C., 110° C. to 130° C., 110° C. to 125° C., 110° C. to 120° C., and 110° C. to 115° C.

In another embodiment, the Tg of the mixed ester of the invention has at least one of the following ranges: 115° C. to 210° C., 115° C. to 205° C., 115° C. to 200° C., 115° C. to 195° C., 115° C. to 190° C., 115° C. to 185° C., 115° C. to 180° C., 115° C. to 175° C., 115° C. to 170° C., 115° C. to 165° C., 115° C. to 160° C., 115° C. to 155° C., 115° C. to 150° C., 115° C. to 145° C., 115° C. to 140° C., 115° C. to 135° C., 115° C. to 130° C., 115° C. to 125° C., 115° C. to 120° C., 120° C. to 210° C., 120° C. to 205° C., 120° C. to 200° C., 120° C. to 195° C., 120° C. to 190° C., 120° C. to 185° C., 120° C. to 180° C., 120° C. to 175° C., 120° C. to 170° C., 120° C. to 165° C., 120° C. to 160° C., 120° C. to 155° C., 120° C. to 150° C., 120° C. to 145° C., 120° C. to 140° C., 120° C. to 135° C., 120° C. to 130° C., 120° C. to 125° C., 125° C. to 210° C., 125° C. to 205° C., 125° C. to 200° C., 125° C. to 195° C., 125° C. to 190° C., 125° C. to 185° C., 125° C. to 180° C., 125° C. to 175° C., 125° C. to 170° C., 125° C. to 165° C., 125° C. to 160° C., 125° C. to 155° C., 125° C. to 150° C., 125° C. to 145° C., 125° C. to 140° C., 125° C. to 135° C., 125° C. to 130° C., 130° C. to 210° C., 130° C. to 205° C., 130° C. to 200° C., 130° C. to 195° C., 130° C. to 190° C., 130° C. to 185° C., 130° C. to 180° C., 130° C. to 175° C., 130° C. to 170° C., 130° C. to 165° C., 130° C. to 160° C., 130° C. to 155° C., 130° C. to 150° C., 130° C. to 145° C., 130° C. to 140° C., 130° C. to 135° C., 135° C. to 210° C., 135° C. to 205° C., 135° C. to 200° C., 135° C. to 195° C., 135° C. to 190° C., 135° C. to 185° C., 135° C. to 180° C., 135° C. to 175° C., 135° C. to 170° C., 135° C. to 165° C., 135° C. to 160° C., 135° C. to 155° C., 135° C. to 150° C., 135° C. to 145° C., and 135° C. to 140° C.

In another embodiment, the Tg of the mixed ester of the invention has at least one of the following ranges: 140° C. to 210° C., 140° C. to 205° C., 140° C. to 200° C., 140° C. to 195° C., 140° C. to 190° C., 140° C. to 185° C., 140° C. to 180° C., 140° C. to 175° C., 140° C. to 170° C., 140° C. to 165° C., 140° C. to 160° C., 140° C. to 155° C., 140° C. to 150° C., 140° C. to 145° C., 145° C. to 210° C., 145° C. to 205° C., 145° C. to 200° C., 145° C. to 195° C., 145° C. to 190° C., 145° C. to 185° C., 145° C. to 180° C., 145° C. to 175° C., 145° C. to 170° C., 145° C. to 165° C., 145° C. to 160° C., 145° C. to 155° C., 145° C. to 150° C., 150° C. to 210° C., 150° C. to 205° C., 150° C. to 200° C., 150° C. to 195° C., 150° C. to 190° C., 150° C. to 185° C., 150° C. to 180° C., 150° C. to 175° C., 150° C. to 170° C., 150° C. to 165° C., 150° C. to 160° C., 150° C. to 155° C., 155° C. to 210° C., 155° C. to 205° C., 155° C. to 200° C., 155° C. to 195° C., 155° C. to 190° C., 155° C. to 185° C., 155° C. to 180° C., 155° C. to 175° C., 155° C. to 170° C., 155° C. to 165° C., 155° C. to 160° C., 160° C. to 210° C., 160° C. to 205° C., 160° C. to 200° C., 160° C. to 195° C., 160° C. to 190° C., 160° C. to 185° C., 160° C. to 180° C., 160° C. to 175° C., 160° C. to 170° C., 160° C. to 165° C., 165° C. to 210° C., 165° C. to 205° C., 165° C. to 200° C., 165° C. to 195° C., 165° C. to 190° C., 165° C. to 185° C., 165° C. to 180° C., 165° C. to 175° C., 165° C. to 170° C., 170° C. to 210° C., 170° C. to 205° C., 170° C. to 200° C., 170° C. to 195° C., 170° C. to 190° C., 170° C. to 185° C., 170° C. to 180° C., 170° C. to 175° C., 175° C. to 210° C., 175° C. to 205° C., 175° C. to 200° C., 175° C. to 195° C., 175° C. to 190° C., 175° C. to 185° C., and 175° C. to 180° C.

In another embodiment, the Tg of the mixed ester of the invention has at least one of the following ranges: 180° C. to 210° C., 180° C. to 205° C., 180° C. to 200° C., 180° C. to 195° C., 180° C. to 190° C., 180° C. to 185° C., 185° C. to 210° C., 185° C. to 205° C., 185° C. to 200° C., 185° C. to 195° C., 185° C. to 190° C., 190° C. to 210° C., 190° C. to 205° C., 190° C. to 200° C., 190° C. to 195° C., 195° C. to 210° C., 195° C. to 205° C., 195° C. to 200° C., 200° C. to 210° C., 200° C. to 205° C., and 205° C. to 210° C.

In another embodiment, the mixed cellulose ester of the invention has a melting point chosen from among one of the following ranges: 180° C. to 285° C., 180° C. to 280° C., 180° C. to 275° C., 180° C. to 270° C., 180° C. to 265° C., 180° C. to 260° C., 180° C. to 255° C., 180° C. to 250° C., 180° C. to 245° C., 180° C. to 240° C., 180° C. to 235° C., 180° C. to 230° C., 180° C. to 225° C., 180° C. to 220° C., 180° C. to 215° C., 180° C. to 210° C., 180° C. to 205° C., 180° C. to 200° C., 180° C. to 195° C., 180° C. to 190° C., 180° C. to 185° C., 185° C. to 285° C., 185° C. to 280° C., 185° C. to 275° C., 185° C. to 270° C., 185° C. to 265° C., 185° C. to 260° C., 185° C. to 255° C., 185° C. to 250° C., 185° C. to 245° C., 185° C. to 240° C., 185° C. to 235° C., 185° C. to 230° C., 185° C. to 225° C., 185° C. to 220° C., 185° C. to 215° C., 185° C. to 210° C., 185° C. to 205° C., 185° C. to 200° C., 185° C. to 195° C., 185° C. to 190° C., 190° C. to 285° C., 190° C. to 280° C., 190° C. to 275° C., 190° C. to 270° C., 190° C. to 265° C., 190° C. to 260° C., 190° C. to 255° C., 190° C. to 250° C., 190° C. to 245° C., 190° C. to 240° C., 190° C. to 235° C., 190° C. to 230° C., 190° C. to 225° C., 190° C. to 220° C., 190° C. to 215° C., 190° C. to 210° C., 190° C. to 205° C., 190° C. to 200° C., 190° C. to 195° C., 195° C. to 285° C., 195° C. to 280° C., 195° C. to 275° C., 195° C. to 270° C., 195° C. to 265° C., 195° C. to 260° C., 195° C. to 255° C., 195° C. to 250° C., 195° C. to 245° C., 195° C. to 240° C., 195° C. to 235° C., 195° C. to 230° C., 195° C. to 225° C., 195° C. to 220° C., 195° C. to 215° C., 195° C. to 210° C., 195° C. to 205° C., 200° C. to 285° C., 200° C. to 280° C., 200° C. to 275° C., 200° C. to 270° C., 200° C. to 265° C., 200° C. to 260° C., 200° C. to 255° C., 200° C. to 250° C., 200° C. to 245° C., 200° C. to 240° C., 200° C. to 235° C., 200° C. to 230° C., 200° C. to 225° C., 200° C. to 220° C., 200° C. to 215° C., 200° C. to 210° C., 200° C. to 205° C., 205° C. to 285° C., 205° C. to 280° C., 205° C. to 275° C., 205° C. to 270° C., 205° C. to 265° C., 205° C. to 260° C., 205° C. to 255° C., 205° C. to 250° C., 205° C. to 245° C., 205° C. to 240° C., 205° C. to 235° C., 205° C. to 230° C., 205° C. to 225° C., 205° C. to 220° C., 205° C. to 215° C., 205° C. to 210° C., 210° C. to 285° C., 210° C. to 280° C., 210° C. to 275° C., 210° C. to 270° C., 210° C. to 265° C., 210° C. to 260° C., 210° C. to 255° C., 210° C. to 250° C., 210° C. to 245° C., 210° C. to 240° C., 210° C. to 235° C., 210° C. to 230° C., 210° C. to 225° C., 210° C. to 220° C., and 210° C. to 215° C.

In another embodiment, the mixed cellulose ester of the invention has a melting point chosen from among one of the following ranges: 215° C. to 285° C., 215° C. to 280° C., 215° C. to 275° C., 215° C. to 270° C., 215° C. to 265° C., 215° C. to 260° C., 215° C. to 255° C., 215° C. to 250° C., 215° C. to 245° C., 215° C. to 240° C., 215° C. to 235° C., 215° C. to 230° C., 215° C. to 225° C., 215° C. to 220° C., 220° C. to 285° C., 220° C. to 280° C., 220° C. to 275° C., 220° C. to 270° C., 220° C. to 265° C., 220° C. to 260° C., 220° C. to 255° C., 220° C. to 250° C., 220° C. to 245° C., 220° C. to 240° C., 220° C. to 235° C., 220° C. to 230° C., 220° C. to 225° C. 225° C. to 285° C., 225° C. to 280° C., 225° C. to 275° C., 225° C. to 270° C., 225° C. to 265° C., 225° C. to 260° C., 225° C. to 255° C., 225° C. to 250° C., 225° C. to 245° C., 225° C. to 240° C., 225° C. to 235° C., 225° C. to 230° C., 230° C. to 285° C., 230° C. to 280° C., 230° C. to 275° C., 230° C. to 270° C., 230° C. to 265° C., 230° C. to 260° C., 230° C. to 255° C., 230° C. to 250° C., 230° C. to 245° C., 230° C. to 240° C., 230° C. to 235° C., 235° C. to 285° C., 235° C. to 280° C., 235° C. to 275° C., 235° C. to 270° C., 235° C. to 265° C., 235° C. to 260° C., 235° C. to 255° C., 235° C. to 250° C., 235° C. to 245° C., 235° C. to 240° C., 240° C. to 285° C., 240° C. to 280° C., 240° C. to 275° C., 240° C. to 270° C., 240° C. to 265° C., 240° C. to 260° C., 240° C. to 255° C., 240° C. to 250° C., 240° C. to 245° C., 245° C. to 285° C., 245° C. to 280° C., 245° C. to 275° C., 245° C. to 270° C., 245° C. to 265° C., 245° C. to 260° C., 245° C. to 255° C., 245° C. to 250° C., 250° C. to 285° C., 250° C. to 280° C., 250° C. to 275° C., 250° C. to 270° C., 250° C. to 265° C., 250° C. to 260° C., 250° C. to 255° C., 255° C. to 285° C., 255° C. to 280° C., 255° C. to 275° C., 255° C. to 270° C., 255° C. to 265° C., 255° C. to 260° C., 260° C. to 285° C., 260° C. to 280° C., 260° C. to 275° C., 260° C. to 270° C., 260° C. to 265° C., 265° C. to 285° C., 265° C. to 280° C., 265° C. to 275° C., 265° C. to 270° C., 270° C. to 285° C., 270° C. to 280° C., 270° C. to 275° C., 275° C. to 285° C., 275° C. to 280° C., and 285° C. to 285° C.

In another embodiment, a film prepared from a mixed cellulose ester of the invention has an $R_e$ optical retardation value, normalized with respect to a film of thickness of 80 μm, chosen from among one of the following ranges: +5 nm or less, −100 nm to +5 nm, −100 nm to 0 nm, −100 nm to −5 nm, −100 nm to −10 nm, −100 nm to −15 nm, −100 nm to −20 nm, −100 nm to −25 nm, −100 nm to −30 nm, −100 nm to −35 nm, −100 nm to −40 nm, −100 nm to −45 nm, −100 nm to −50 nm, −100 nm to −55 nm, −100 nm to −60 nm, −100 nm to −65 nm, −100 nm to −70 nm, −100 nm to −75 nm, −100 nm to −80 nm, −100 nm to −85 nm, −100 nm to −90 nm, −100 nm to −95 nm, −95 nm to +5 nm, −95 nm to 0 nm, −95 nm to −5 nm, −95 nm to −10 nm, −95 nm to −15 nm, −95 nm to −20 nm, −95 nm to −25 nm, −95 nm to −30 nm, −95 nm to −35 nm, −95 nm to −40 nm, −95 nm to −45 nm, −95 nm to −50 nm, −95 nm to −55 nm, −95 nm to −60 nm, −95 nm to −65 nm, −95 nm to −70 nm, −95 nm to −75 nm, −95 nm to −80 nm, −95 nm to −85 nm, −95 nm to −90 nm, −90 nm to +5 nm, −90 nm to 0 nm, −90 nm to −5 nm, −90 nm to −10 nm, −90 nm to −15 nm, −90 nm to −20 nm, −90 nm to −25 nm, −90 nm to −30 nm, −90 nm to −35 nm, −90 nm to −40 nm, −90 nm to −45 nm, −90 nm to −50 nm, −90 nm to −55 nm, −90 nm to −60 nm, −90 nm to −65 nm, −90 nm to −70 nm, −90 nm to −75 nm, −90 nm to −80 nm, −90 nm to −85 nm, −85 nm to +5 nm, −85 nm to 0 nm, −85 nm to −5 nm, −85 nm to −10 nm, −85 nm to −15 nm, −85 nm to −20 nm, −85 nm to −25 nm, −85 nm to −30 nm, −85 nm to −35 nm, −85 nm to −40 nm, −85 nm to −45 nm, −85 nm to −50 nm, −85 nm to −55 nm, −85 nm to −60 nm, −85 nm to −65 nm, −85 nm to −70 nm, −85 nm to −75 nm, −85 nm to −80 nm, −80 nm to +5 nm, −80 nm to 0 nm, −80 nm to −5 nm, −80 nm to −10 nm, −80 nm to −15 nm, −80 nm to −20 nm, −80 nm to −25 nm, −80 nm to −30 nm, −80 nm to −35 nm, −80 nm to −40 nm, −80 nm to −45 nm, −80 nm to −50 nm, −80 nm to −55 nm, −80 nm to −60 nm, −80 nm to −65 nm, −80 nm to −70 nm, and −80 nm to −75 nm.

In another embodiment, a film prepared from a mixed cellulose ester of the invention has an $R_e$ optical retardation value, normalized with respect to a film of thickness of 80 μm, chosen from among one of the following ranges: −75 nm to +5 nm, −75 nm to 0 nm, −75 nm to −5 nm, −75 nm to −10 nm, −75 nm to −15 nm, −75 nm to −20 nm, −75 nm to −25 nm, −75 nm to −30 nm, −75 nm to −35 nm, −75 nm to −40 nm, −75 nm to −45 nm, −75 nm to −50 nm, −75 nm to −55 nm, −75 nm to −60 nm, −75 nm to −65 nm, −75 nm to −70 nm, −70 nm to +5 nm, −70 nm to 0 nm, −70 nm to −5 nm, −70 nm to −10 nm, −70 nm to −15 nm, −70 nm to −20 nm, −70 nm to −25 nm, −70 nm to −30 nm, −70 nm to −35 nm, −70 nm to −40 nm, −70 nm to −45 nm, −70 nm to −50 nm, −70 nm to −55 nm, −70 nm to −60 nm, −70 nm to −65 nm, −65 nm to +5 nm, −65 nm to 0 nm, −65 nm to −5 nm, −65 nm to −10 nm, −65 nm to −15 nm, −65 nm to −20 nm, −65 nm to −25 nm, −65 nm to −30 nm, −65 nm to −35 nm, −65 nm to −40 nm, −65 nm to −45 nm, −65 nm to −50 nm, −65 nm to −55 nm, −65 nm to −60 nm, −60 nm to +5 nm, −60 nm to 0 nm, −60 nm to −5 nm, −60 nm to −10 nm, −60 nm to −15 nm, −60 nm to −20 nm, −60 nm to −25 nm, −60 nm to −30 nm, −60 nm to −35 nm, −60 nm to −40 nm, −60 nm to −45 nm, −60 nm to −50 nm, −60 nm to −55 nm, −55 nm to +5 nm, −55 nm to 0 nm, −55 nm to −5 nm, −55 nm to −10 nm, −55 nm to −15 nm, −55 nm to −20 nm, −55 nm to −25 nm, −55 nm to −30 nm, −55 nm to −35 nm, −55 nm to −40 nm, −55 nm to −45 nm, −55 nm to −50 nm, −50 nm to +5 nm, −50 nm to 0 nm, −50 nm to −5 nm, −50 nm to −10 nm, −50 nm to −15 nm, −50 nm to −20 nm, −50 nm to −25 nm, −50 nm to −30 nm, −50 nm to −35 nm, −50 nm to −40 nm, and −50 nm to −45 nm.

In another embodiment, a film prepared from a mixed cellulose ester of the invention has an $R_e$ optical retardation value, normalized with respect to a film of thickness of 80 μm, chosen from among one of the following ranges: −45 nm to +5 nm, −45 nm to 0 nm, −45 nm to −5 nm, −45 nm to −10 nm, −45 nm to −15 nm, −45 nm to −20 nm, −45 nm to −25 nm, −45 nm to −30 nm, −45 nm to −35 nm, −45 nm to −40 nm, −40 nm to +5 nm, −40 nm to 0 nm, −40 nm to −5 nm, −40 nm to −10 nm, −40 nm to −15 nm, −40 nm to −20 nm, −40 nm to −25 nm, −40 nm to −30 nm, −40 nm to −35 nm, −35 nm to +5 nm, −35 nm to 0 nm, −35 nm to −5 nm, −35 nm to −10 nm, −35 nm to −15 nm, −35 nm to −20 nm, −35 nm to −25 nm, −35 nm to −30 nm, −30 nm to +5 nm, −30 nm to 0 nm, −30 nm to −5 nm, −30 nm to −10 nm, −30 nm to −15 nm, −30 nm to −20 nm, −30 nm to −25 nm, −25 nm to +5 nm, −25 nm to 0 nm, −25 nm to −5 nm, −25 nm to −10 nm, −25 nm to −15 nm, −25 nm to −20 nm, −20 nm to +5 nm, −20 nm to 0 nm, −20 nm to −5 nm, −20 nm to −10 nm, −20 nm to −15 nm, −15 nm to +5 nm, −15 nm to 0 nm, −15 nm to −5 nm, −15 nm to −10 nm, −10 nm to +5 nm, −10 nm to 0 nm, −10 nm to −5 nm, −5 nm to +5 nm, −5 nm to 0 nm, and 0 nm to +5 nm.

In another embodiment, a film prepared from a mixed cellulose ester of the invention has an $R_e$ optical retardation value, normalized with respect to a film of thickness of 80 μm, chosen from among one of the following ranges: −5 nm to +5 nm, −5 nm to +4 nm, −5 nm to +3 nm, −5 nm to +2 nm, −5 nm to +1 nm, −5 nm to 0 nm, −5 nm to −1 nm, −5 nm to −2 nm, −5 nm to −3 nm, −5 nm to −4 nm, −4 nm to +5 nm, −4 nm to +4 nm, −4 nm to +3 nm, −4 nm to +2 nm, −4 nm to +1 nm, −4 nm to 0 nm, −4 nm to −1 nm, −4 nm to −2 nm, −4 nm to −3 nm, −3 nm to +5 nm, −3 nm to +4 nm, −3 nm to +3 nm, −3 nm to +2 nm, −3 nm to +1 nm, −3 nm to 0 nm, −3 nm to −1 nm, −3 nm to −2 nm, −2 nm to +5 nm, −2 nm to +4 nm, −2 nm to +3 nm, −2 nm to +2 nm, −2 nm to +1 nm, −2 nm to 0 nm, −2 nm to −1 nm, −1 nm to +5 nm, −1 nm to +4 nm, −1 nm to +3 nm, −1 nm to +2 nm, −1 nm to +1 nm, −1 nm to 0 nm, 0 nm to +5 nm, 0 nm to +4 nm, 0 nm to +3 nm, 0 nm to +2 nm, 0 nm to +1 nm, +1 nm to +5 nm, +1 nm to +4 nm, +1 nm to +3 nm, +1 nm to +2 nm, +2 nm to +5 nm, +2 nm to +4 nm, +2 nm to +3 nm, +3 nm to +5 nm, +3 nm to +4 nm, and +4 nm to +5 nm.

In another embodiment, a film prepared from a mixed cellulose ester of the invention has an $R_{th}$ optical retardation value, normalized with respect to a film of thickness of 80 μm, chosen from among one of the following ranges: −10 nm or greater, −10 nm to +100 nm, −10 nm to +95 nm, −10 nm to +90 nm, −10 nm to +85 nm, −10 nm to +80 nm, −10 nm to +75 nm, −10 nm to +70 nm, −10 nm to +65 nm, −10 nm to +60 nm, −10 nm to +55 nm, −10 nm to +50 nm, −10 nm to +45 nm, −10 nm to +40 nm, −10 nm to +35 nm, −10 nm to +30 nm, −10 nm to +25 nm, −10 nm to +20 nm, −10 nm to +15 nm, −10 nm to +10 nm, −10 nm to +5 nm, −10 nm to 0 nm, −10 nm to −5 nm, −5 nm to +100 nm, −5 nm to +95 nm, −5 nm to +90 nm, −5 nm to +85 nm, −5 nm to +80 nm, −5 nm to +75 nm, −5 nm to +70 nm, −5 nm to +65 nm, −5 nm to +60 nm, −5 nm to +55 nm, −5 nm to +50 nm, −5 nm to +45 nm, −5 nm to +40 nm, −5 nm to +35 nm, −5 nm to +30 nm, −5 nm to +25 nm, −5 nm to +20 nm, −5 nm to +15 nm, −5 nm to +10 nm, −5 nm to +5 nm, −5 nm to 0 nm, 0 nm to +100 nm, 0 nm to +95 nm, 0 nm to +90 nm, 0 nm to +85 nm, 0 nm to +80 nm, 0 nm to +75 nm, 0 nm to +70 nm, 0 nm to +65 nm, 0 nm to +60 nm, 0 nm to +55 nm, 0 nm to +50 nm, 0 nm to +45 nm, 0 nm to +40 nm, 0 nm to +35 nm, 0 nm to +30 nm, 0 nm to +25 nm, 0 nm to +20 nm, 0 nm to +15 nm, 0 nm to +10 nm, 0 nm to +5 nm, +5 nm to +100 nm, +5 nm to +95 nm, +5 nm to +90 nm, +5 nm to +85 nm, +5 nm to +80 nm, +5 nm to +75 nm, +5 nm to +70 nm, +5 nm to +65 nm, +5 nm to +60 nm, +5 nm to +55 nm, +5 nm to +50 nm, +5 nm to +45 nm, +5 nm to +40 nm, +5 nm to +35 nm, +5 nm to +30 nm, +5 nm to +25 nm, +5 nm to +20 nm, +5 nm to +15 nm, and +5 nm to +10 nm.

In another embodiment, a film prepared from a mixed cellulose ester of the invention has an $R_{th}$ optical retardation value, normalized with respect to a film of thickness of 80 µm, chosen from among one of the following ranges: +10 nm to +100 nm, +10 nm to +95 nm, +10 nm to +90 nm, +10 nm to +85 nm, +10 nm to +80 nm, +10 nm to +75 nm, +10 nm to +70 nm, +10 nm to +65 nm, +10 nm to +60 nm, +10 nm to +55 nm, +10 nm to +50 nm, +10 nm to +45 nm, +10 nm to +40 nm, +10 nm to +35 nm, +10 nm to +30 nm, +10 nm to +25 nm, +10 nm to +20 nm, +10 nm to +15 nm, +15 nm to +100 nm, +15 nm to +95 nm, +15 nm to +90 nm, +15 nm to +85 nm, +15 nm to +80 nm, +15 nm to +75 nm, +15 nm to +70 nm, +15 nm to +65 nm, +15 nm to +60 nm, +15 nm to +55 nm, +15 nm to +50 nm, +15 nm to +45 nm, +15 nm to +40 nm, +15 nm to +35 nm, +15 nm to +30 nm, +15 nm to +25 nm, +15 nm to +20 nm, +20 nm to +100 nm, +20 nm to +95 nm, +20 nm to +90 nm, +20 nm to +85 nm, +20 nm to +80 nm, +20 nm to +75 nm, +20 nm to +70 nm, +20 nm to +65 nm, +20 nm to +60 nm, +20 nm to +55 nm, +20 nm to +50 nm, +20 nm to +45 nm, +20 nm to +40 nm, +20 nm to +35 nm, +20 nm to +30 nm, +20 nm to +25 nm, +25 nm to +100 nm, +25 nm to +95 nm, +25 nm to +90 nm, +25 nm to +85 nm, +25 nm to +80 nm, +25 nm to +75 nm, +25 nm to +70 nm, +25 nm to +65 nm, +25 nm to +60 nm, +25 nm to +55 nm, +25 nm to +50 nm, +25 nm to +45 nm, +25 nm to +40 nm, +25 nm to +35 nm, +25 nm to +30 nm, +30 nm to +100 nm, +30 nm to +95 nm, +30 nm to +90 nm, +30 nm to +85 nm, +30 nm to +80 nm, +30 nm to +75 nm, +30 nm to +70 nm, +30 nm to +65 nm, +30 nm to +60 nm, +30 nm to +55 nm, +30 nm to +50 nm, +30 nm to +45 nm, +30 nm to +40 nm, +30 nm to +35 nm, +35 nm to +100 nm, +35 nm to +95 nm, +35 nm to +90 nm, +35 nm to +85 nm, +35 nm to +80 nm, +35 nm to +75 nm, +35 nm to +70 nm, +35 nm to +65 nm, +35 nm to +60 nm, +35 nm to +55 nm, +35 nm to +50 nm, +35 nm to +45 nm, and +35 nm to +40 nm.

In another embodiment, a film prepared from a mixed cellulose ester of the invention has an $R_{th}$ optical retardation value, normalized with respect to a film of thickness of 80 µm, chosen from among one of the following ranges: +40 nm to +100 nm, +40 nm to +95 nm, +40 nm to +90 nm, +40 nm to +85 nm, +40 nm to +80 nm, +40 nm to +75 nm, +40 nm to +70 nm, +40 nm to +65 nm, +40 nm to +60 nm, +40 nm to +55 nm, +40 nm to +50 nm, +40 nm to +45 nm, +45 nm to +100 nm, +45 nm to +95 nm, +45 nm to +90 nm, +45 nm to +85 nm, +45 nm to +80 nm, +45 nm to +75 nm, +45 nm to +70 nm, +45 nm to +65 nm, +45 nm to +60 nm, +45 nm to +55 nm, +45 nm to +50 nm, +50 nm to +100 nm, +50 nm to +95 nm, +50 nm to +90 nm, +50 nm to +85 nm, +50 nm to +80 nm, +50 nm to +75 nm, +50 nm to +70 nm, +50 nm to +65 nm, +50 nm to +60 nm, +50 nm to +55 nm, +55 nm to +100 nm, +55 nm to +95 nm, +55 nm to +90 nm, +55 nm to +85 nm, +55 nm to +80 nm, +55 nm to +75 nm, +55 nm to +70 nm, +55 nm to +65 nm, +55 nm to +60 nm, +60 nm to +100 nm, +60 nm to +95 nm, +60 nm to +90 nm, +60 nm to +85 nm, +60 nm to +80 nm, +60 nm to +75 nm, +60 nm to +70 nm, +60 nm to +65 nm, +65 nm to +100 nm, +65 nm to +95 nm, +65 nm to +90 nm, +65 nm to +85 nm, +65 nm to +80 nm, +65 nm to +75 nm, +65 nm to +70 nm, +70 nm to +100 nm, +70 nm to +95 nm, +70 nm to +90 nm, +70 nm to +85 nm, +70 nm to +80 nm, +70 nm to +75 nm, +75 nm to +100 nm, +75 nm to +95 nm, +75 nm to +90 nm, +75 nm to +85 nm, +75 nm to +80 nm, +80 nm to +100 nm, +80 nm to +95 nm, +80 nm to +90 nm, +80 nm to +85 nm, +85 nm to +100 nm, +85 nm to +95 nm, +85 nm to +90 nm, +90 nm to +100 nm, +90 nm to +95 nm, and +95 nm to +100 nm.

In another embodiment, a film prepared from a mixed cellulose ester of the invention has an $R_{th}$ optical retardation value, normalized with respect to a film of thickness of 80 µm, chosen from among one of the following ranges: −5 nm to +5 nm, −5 nm to +4 nm, −5 nm to +3 nm, −5 nm to +2 nm, −5 nm to +1 nm, −5 nm to 0 nm, −5 nm to −1 nm, −5 nm to −2 nm, −5 nm to −3 nm, −5 nm to −4 nm, −4 nm to +5 nm, −4 nm to +4 nm, −4 nm to +3 nm, −4 nm to +2 nm, −4 nm to +1 nm, −4 nm to 0 nm, −4 nm to −1 nm, −4 nm to −2 nm, −4 nm to −3 nm, −3 nm to +5 nm, −3 nm to +4 nm, −3 nm to +3 nm, −3 nm to +2 nm, −3 nm to +1 nm, −3 nm to 0 nm, −3 nm to −1 nm, −3 nm to −2 nm, −2 nm to +5 nm, −2 nm to +4 nm, −2 nm to +3 nm, −2 nm to +2 nm, −2 nm to +1 nm, −2 nm to 0 nm, −2 nm to −1 nm, −1 nm to +5 nm, −1 nm to +4 nm, −1 nm to +3 nm, −1 nm to +2 nm, −1 nm to +1 nm, −1 nm to 0 nm, 0 nm to +5 nm, 0 nm to +4 nm, 0 nm to +3 nm, 0 nm to +2 nm, 0 nm to +1 nm, +1 nm to +5 nm, +1 nm to +4 nm, +1 nm to +3 nm, +1 nm to +2 nm, +2 nm to +5 nm, +2 nm to +4 nm, +2 nm to +3 nm, +3 nm to +5 nm, +3 nm to +4 nm, and +4 nm to +5 nm.

It is contemplated that the mixed esters of the invention can possess at least one of the ratios of non-acetyl ester degree of substitution to hydroxyl degree of substitution described herein and at least one of the degrees of non-acetyl ester substitution described herein unless otherwise stated. It is also contemplated that the mixed esters of the invention can possess at least one of the ratios of non-acetyl ester degree of substitution to hydroxyl degree of substitution described herein and at least one of the Tg ranges described herein unless otherwise stated. It is also contemplated that the mixed esters of the invention can possess at least one of the ratios of non-acetyl ester degree of substitution to hydroxyl degree of substitution described herein and at least one of the melting point ranges described herein unless otherwise stated. It is also contemplated that the mixed esters of the invention can possess at least one of the Tg ranges described herein and at least one of the degrees of non-acetyl ester substitution ($DS_{NAC}$) described herein unless otherwise stated. It is also contemplated that the mixed esters of the invention can possess any combination of at least 2 of the following variable ranges: a) ratio of non-acetyl ester degree of substitution to hydroxyl degree of substitution described herein; b) non-acetyl ester substitution described herein; c) Tg ranges described herein; d) melting point ranges described herein.

It is also contemplated that films prepared from the mixed esters of the invention can possess at least one of the $R_e$ optical retardation values described herein and at least one of the $R_{th}$ optical retardation values described herein.

One embodiment of the invention is drawn to a solvent cast film, wherein an 80 micron film solvent cast (or a film of a different thickness whose Re values have been normalized to a thickness of 80 µm) has an |Re|<5 and an Rth greater than −10 nm (note that Re used in this embodiment has "absolute value" brackets). In another embodiment, Rth is greater than or equal to 0 nm.

Another embodiment of the invention is drawn to a solvent cast film, wherein the thickness is between about 30 and 130 microns and the film birefringence is such that |Δe|<0.0000625 and Δth>−0.000125. In another embodiment, Δth>0.

Another embodiment of the invention is drawn to a melt-extruded film, wherein an 80 micron film (or a film of a different thickness whose Re values have been normalized to a thickness of 80 µm) has an |Re|<10 nm and Rth>−10. In another embodiment, Rth is greater than or equal to 0 nm.

In another embodiment, a film made from a mixed acetate ester of the invention has a $\Delta_e$ corresponding to the Re values described above divided by a film thickness of 80 µm. In another embodiment, a film made from a mixed acetate ester of the invention has a $\Delta_{th}$ corresponding to the Rth values described above divided by a film thickness of 80 µm.

In one embodiment of the invention, mixed cellulose esters having simultaneously an acetyl degree of substitution of 1.9 and a propionyl degree of substitution of 1.0 are excluded from the invention. In another embodiment, mixed cellulose esters having simultaneously an acetyl degree of substitution from 1.85 to 1.95 and a propionyl degree of substitution from 0.95 to 1.05 are excluded from the invention. In another embodiment, mixed cellulose esters having simultaneously an acetyl degree of substitution from 1.8 to 2.0 and a propionyl degree of substitution from 0.9 to 1.1 are excluded from the invention. In another embodiment, mixed cellulose esters having simultaneously an acetyl degree of substitution from 1.8 to 2.0 and a propionyl degree of substitution from 0.9 to 1.1 are excluded from the invention.

In another embodiment, films prepared from the mixed cellulose esters described in the previous paragraph having simultaneously an Rth value of 10 and Re of +1 are excluded from the invention. In another embodiment, mixed cellulose esters described in the previous paragraph having simultaneously an Rth value from 8 to 12 and Re of from 0 to +2 are excluded from the invention. In another embodiment, mixed cellulose esters described in the previous paragraph having simultaneously an Rth value from 5 to 15 and Re of from −5 to +5 are excluded from the invention.

In another embodiment, only solvent cast films described in the previous paragraph are excluded from the invention, but films prepared by any other method different from solvent casting remains part of the invention.

In another embodiment of the invention, mixed cellulose esters having simultaneously an acetyl degree of substitution of 1.9 and a propionyl degree of substitution of 1.08 are excluded from the invention. In another embodiment, mixed cellulose esters having simultaneously an acetyl degree of substitution from 1.85 to 1.95 and a propionyl degree of substitution from 1.0 to 1.15 are excluded from the invention. In another embodiment, mixed cellulose esters having simultaneously an acetyl degree of substitution from 1.8 to 2.0 and a propionyl degree of substitution from 0.95 to 1.2 are excluded from the invention.

In another embodiment, films prepared from the mixed cellulose esters described in the previous paragraph having simultaneously an Rth value of 7 and Re of +1 are excluded from the invention. In another embodiment, mixed cellulose esters described in the previous paragraph having simultaneously an Rth value from 5 to 9 and Re of from 0 to +2 are excluded from the invention. In another embodiment, mixed cellulose esters described in the previous paragraph having simultaneously an Rth value from 0 to 15 and Re of from −5 to +5 are excluded from the invention.

In another embodiment, only solvent cast films described in the previous paragraph are excluded from the invention, but films prepared by any other method different from solvent casting remains part of the invention.

On embodiment of the invention is directed to a film or sheet comprising at least one mixed cellulose ester comprising at least one acetyl group wherein the ratio of the degree of substitution of non-acetyl groups (DSNAC) to the degree of substitution of hydroxyl groups (DSOH) is 10 or greater and the non-acetyl degree of substitution is from 1.1 to 1.75.

Another embodiment of the invention is directed to a liquid crystal display film comprising the mixed cellulose ester comprising at least one acetyl group wherein the ratio of the degree of substitution of non-acetyl groups ($DS_{NAC}$) to degree of substitution of hydroxyl groups ($DS_{OH}$) is 10 or greater and the non-acetyl degree of substitution is from 1.1 to 1.75. In another embodiment, the liquid crystal display film comprises a mixed cellulose ester comprising at least one acetyl group wherein the ratio of the degree of substitution of non-acetyl groups ($DS_{NAC}$) to degree of substitution of hydroxyl groups ($DS_{OH}$) is 10 or greater and the non-acetyl degree of substitution is from 1.1 to 1.6. In another embodiment, the liquid crystal display film comprises a mixed cellulose ester comprising at least one acetyl group wherein the glass transition temperature of said mixed cellulose ester is from 100° to 200° C.; and wherein the ratio of the degree of substitution of non-acetyl groups ($DS_{NAC}$) to degree of substitution of hydroxyl groups ($DS_{OH}$) is 10 or greater and the non-acetyl degree of substitution is from 1.1 to 1.6.

Another embodiment of the invention is directed to a liquid crystal display film comprising at least one film having an Re optical retardation value of from −100 to +5 nm; and which comprises a mixed cellulose ester comprising at least one acetyl group wherein the ratio of the degree of substitution of non-acetyl groups (DSNAC) to degree of substitution of hydroxyl groups (DSOH) is 10 or greater and the non-acetyl degree of substitution is from 1.1 to 1.75.

Another embodiment of the invention is directed to a liquid crystal display film as described in any of the three preceding paragraphs comprising at least one film having an Rth optical retardation value of from −10 to +100 nm.

Another embodiment of the invention is directed to a liquid crystal display film as described in any of the four preceding paragraphs wherein the ratio of the degree of substitution of non-acetyl groups (DSNAC) to degree of substitution of hydroxyl groups (DSOH) is from 10 to 200.

Another embodiment of the invention is directed to a liquid crystal display film as described in any of the five preceding paragraphs wherein the ratio of the degree of substitution of non-acetyl groups (DSNAC) to degree of substitution of hydroxyl groups (DSOH) is from 10 to 100.

Another embodiment of the invention is directed to a liquid crystal display film as described in any of the six preceding paragraphs having an Re optical retardation value of from −100 to +5 nm and an Rth optical retardation value of from 0 to +100 nm.

Another embodiment of the invention is directed to a liquid crystal display film as described in any of the seven preceding paragraphs, wherein the film is a polarizer, protective, and/or compensator film. Another embodiment of the invention is directed to a molded optical part, such as a lens.

Figure 2:
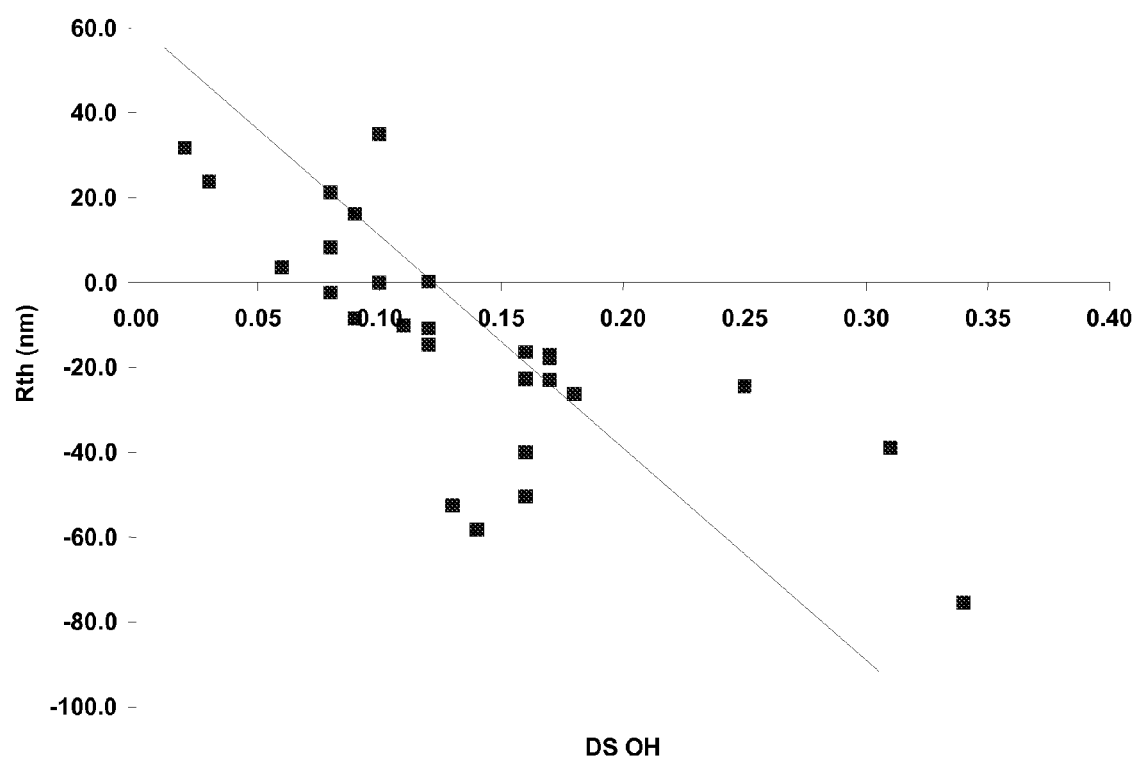
FIG. 2. The effect of hydroxyl degree of substitution (DS) on the normalized Rth for the cellulose acetate propionate (CAP) and cellulose acetate butyrate (CAB) mixed esters produced in the examples.
Figure 3:
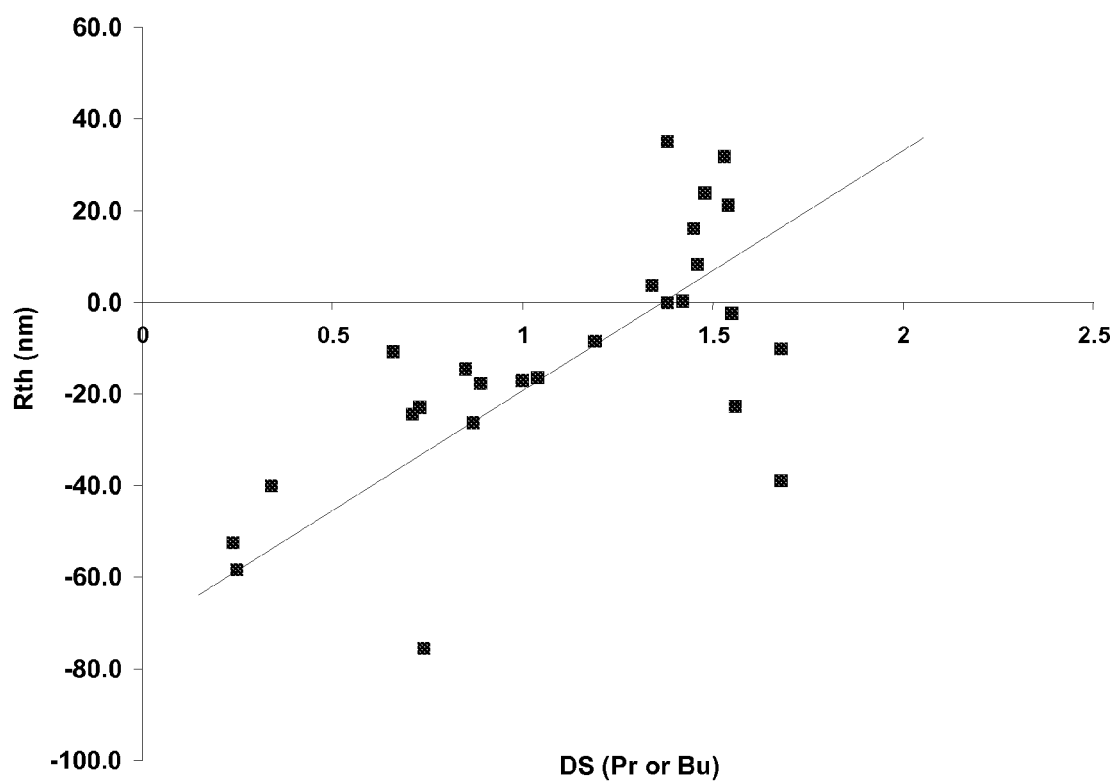
FIG. 3. The effect of non-acetyl ester (e.g., propyl or butyl) content on the normalized Rth for the cellulosics produced in the examples.
Figure 4:
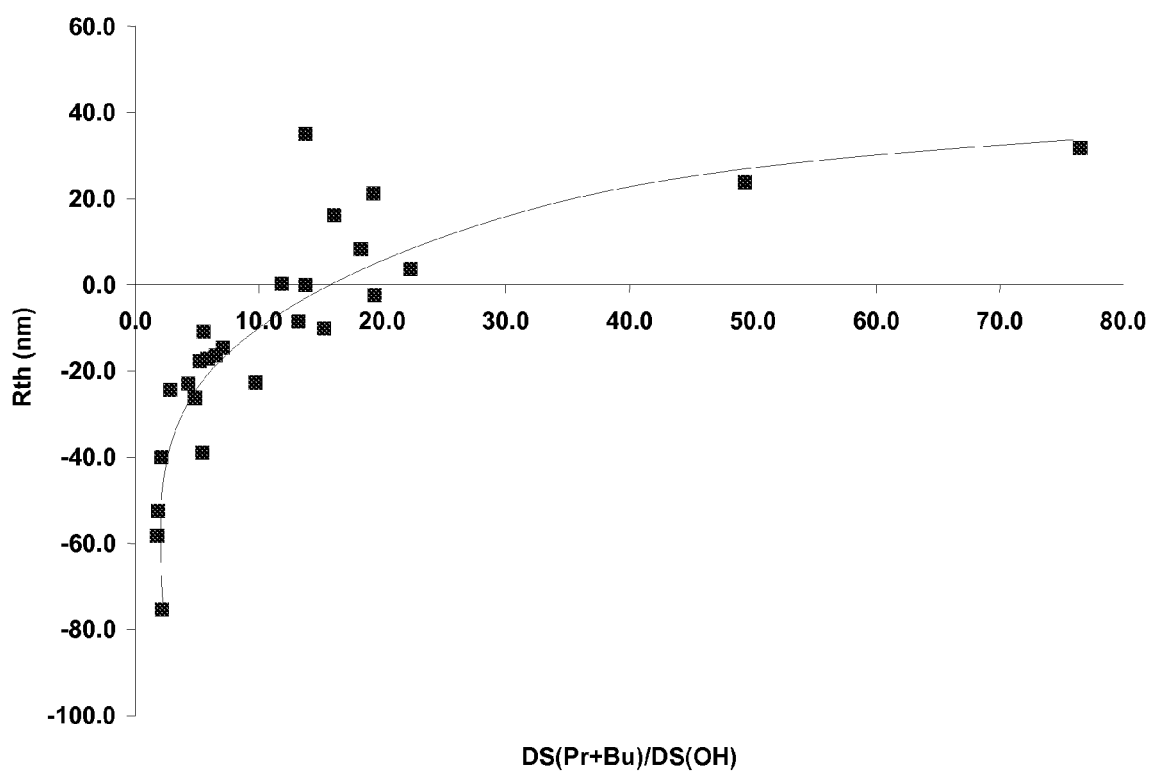
FIG. 4. The normalized Rth as a function of "hydroxyl ratio".

It was initially unexpected that the non-acetyl ester content also played role in reducing the intrinsic birefringence of cellulose esters. Our own experimentation with mixed esters showed that hydroxyl level was not the only relevant variable as it did not fully explain the data. For example, the Rth values of films made in the course of this invention (and normalized to 80 microns thickness) are shown in FIG. 2. The line drawn on the graph is simply to illustrate a general trend. As observed, there is a strong decrease of $R_{th}$ with increasing DS(OH), however there is still considerable scatter in the data. Some of this scatter is due to standard test error but part of it is indicative of another, hitherto unidentified variable that is also affecting $R_{th}$. It was not until $R_{th}$ was plotted versus the DS of non-acetyl esters (e.g., DS(Pr+Bu), that we surprisingly observed that the retardation is also a strong function of this non-acetyl ester content (see FIG. 3). Further analysis showed that a new parameter termed the "hydroxyl ratio" and defined as $DS_{NAC}/DS_{OH}$, gave a better prediction of the birefringence behavior as shown in FIG. 4. Note that the data follows a much more well defined pattern (i.e. less data scatter) when plotted against the dimensionless hydroxyl ratio, as compared with either the DS(OH) or DS (Pr+Bu) alone.

In one embodiment of the invention, an 80 micron film is solvent cast with about 10% of triphenyl phosphate as plasticizer.

In one embodiment, when the resins of the present invention are solvent cast into an 80 micron film—with 8 wt % of triphenyl phosphate (TPP) plasticizer using a 90/10 methylene chloride/methanol solution (a small amount of butanol can optionally be added to reduce blushing) the $R_{th}$ value of the film is between −25 nm and +100 nm at 633 nm. Other embodiments of the solvent cast film have an $R_{th}$ of between −5 nm and +5 nm for Zero-TAO applications, and in yet other embodiments, the films have an $R_{th}$ of 0 to +100 nm for negative birefringent applications. In one embodiment, the Re value can be between −5 nm and +5 nm for the as-cast film, although this value can later be modified for specific applications by, for example, stretching the film.

For melt extrusion applications, the films made with the present invention will have very low or positive $R_{th}$ values as with solvent casting for Zero-TAC and negative birefringent applications respectively. With extrusion processing of traditional positively birefringent cellulosics, the goal is usually to reduce orientation as much as possible to keep retardations within "tolerable" levels. This often means very large gap spacings between die and casting roll which can lead to low process stability and/or low line speeds. With the films made from low hydroxyl resins targeted for zero birefringent Zero-TAC applications, it is possible to make films at higher line speeds without any "special precautions" as the film will be less optically sensitive to any variations in film stress. These low hydroxyl resins have lower stress optical coefficients making them more robust for processing.

In another embodiment, low hydroxyl cellulose acetates, e.g. cellulose triacetates with degree of substitution (DS) of greater than about 2.9 that lack the suitable solubility, manufacturability, and melt processability, are excluded from the invention.

In one embodiment of the invention, the total sulfur level in the final material is less than 75 ppm. In another embodiment, the total sulfur level in the final material is less than 50 ppm, and in another embodiment, less than 30 ppm. In one embodiment, the material is stabilized with a metal salt. In one embodiment, the material is stabilized with magnesium carbonate, for example, at 1.5-2.25 Mg/S (molar). In another embodiment, the material can also be stabilized with calcium propionate, for example, at a ratio of 1.25-2.00. If not properly stabilized, the polymer could exhibit excessive color generation and/or molecular weight breakdown, rendering it inappropriate for display film applications.

"Inherent viscosity" or "IV" is determined in 60/40 (wt/wt) phenol/tetrachloroethane at a concentration of 0.5 g/100 ml at 25° C. The inherent viscosity of the mixed cellulose esters of the invention is typically between about 0.8 and 1.9 dl/g. In one embodiment of the invention, the IV of the mixed cellulose ester is between 1.1 and 1.9 dl/g.

There is no limitation on melting point although typical ranges are between about 180-275° C. Therefore, in one embodiment of the invention the mixed ester of the invention have a melting point from 180 to 275° C. In another embodiment, the range is 200-260° C. Furthermore, the polymer should be melt processable—in other words capable of melt extruding into a useful film or injection molding into a part—with a plasticizer level of 10 wt % or less. Higher levels of plasticizer can be used to make any cellulosic, even cellulose triacetate, melt processable although these levels could result in unacceptable deterioration of other properties (e.g. modulus). In one embodiment, a minimum of 10 wt % of propionate or butyrate esters is used. This embodiment would produce a melt processable nominally high DS cellulosic. Below this level, the processing temperature required could be too high and the polymer could degrade excessively. The resins having a DS(Pr+Bu) greater than 0.5, or greater than 1.1, as defined above are easily melt processed.

Similarly, the glass transition temperature Tg is not necessarily limited. In one embodiment of the invention, unplasticized values are greater than 100° C., and in another, Tg values are greater than about 130° C. In another embodiment, Tg of the mixed ester is from 100° C. to 200° C., in another one from 130° C. to 185° C. In another embodiment, Tg is from 150° C. to 175° C. In another embodiment, Tg is from 150° C. to 160° C. Most plasticizers reduce the Tg of the polymer by 1 to 2 degrees Celsius per weight percent.

In certain embodiments of the invention, there are no restrictions on the "DS spread" of the polymer of the invention. It has been found that the mixed esters of the present invention do not require any special precautions and/or a narrow spread to be soluble and processable. Furthermore, with the mixed esters of the present invention, there will be a broad range of DS distributions for both the acetyl and non-acetyl units. For example, in the case of a CAP, the DS of propionyl and acetyl will vary widely from repeat unit to repeat unit (e.g. some repeat units might have an effective DS of acetyl equal to 2 and a DS propionyl of 1, whereas a neighboring unit might be just the opposite). This effectively creates a broader range of solubility behavior for each repeat unit thereby rendering the concept of DS spread somewhat meaningless. DS spread might become important for high DS cellulose acetate where solubility at very high DS is an issue.

The materials can be in the form of powders, flakes, pellets, liquids etc. and can optionally be predried as appropriate prior to compounding. Plasticizers, stabilizers, UV absorbers, are more common in the mix, but other additives such as antiblocks, slip agents, lubricants, pinning agents, dyes, pigments, retardation modifiers, matteing agents, etc. can also be added if so desired.

The polymers of the invention typically contain a plasticizer although it is not required. The presence of the plasticizer is useful to enhance flexibility and mechanical toughness of the film, sheet or molded part. The plasticizer also helps to lower the processing temperature and viscosity which thereby reduces the tendency for birefringence to form in melt extruded films. Actual choice of plasticizer is not limited as some plasticizers are better for melt extrusion whereas others might be more desirable for solvent casting. The plasticizers used in the invention include, but are not limited to, a phosphate plasticizer, a phthalate plasticizer, a glycolic acid ester, citric acid ester plasticizer or hydroxyl-functional plasticizer, but the invention is not limited thereto. Examples of the plasticizers include a phosphate plasticizer such as triphenyl phosphate, tricresyl phosphate, cresyldiphenyl phosphate, octyldiphenyl phosphate, diphenylbiphenyl phosphate, trioctyl phosphate, or tributyl phosphate; a phthalate plasticizer such as diethyl phthalate, dimethoxyethyl phthalate, dimethyl phthalate, dioctyl phthalate, dibutyl phthalate, di-2-ethylhexyl phthalate, butylbenzyl phthalate or dibenzyl phthalate; a glycolic acid ester such as butyl phthalyl butyl glycolate, ethyl phthalyl ethyl glycolate or methyl phthalyl ethyl glycolate; and a citric acid ester plasticizer such as triethyl citrate, tri-n-butyl citrate, acetyltriethyl citrate, acetyl-tri-n-butyl citrate, or acetyl-tri-n-(2-ethylhexyl) citrate. Further examples of plasticizers which may be used according to the invention are esters comprising: (i) acid residues comprising one or more residues of: phthalic acid, adipic acid, trimellitic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms. Further, non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, arylene-bis(diaryl phosphate), or isophthalates. In another example, the plasticizer comprises diethylene glycol dibenzoate, abbreviated herein as "DEGDB".

In one embodiment, the plasticizer comprises an aliphatic polyester comprising $C_{2-10}$ diacid residues and $C_{2-10}$ diol residues. Examples of diacids that provide $C_{2-10}$ diacid residues include malonic acid, succinic acid, glutaric acid, adipic acid, pimelic acid, suberic acid, azelaic acid, sebacic acid, etc. Examples of diols that provide $C_{2-10}$ diol residues include ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6-hexanediol, 1,5-pentylene glycol, triethylene glycol, tetraethylene glycol etc. In another embodiment, the plasticizer is a blend of at least two of the aliphatic polyesters described herein. In another embodiment, the plasticizer is Resoflex R296 (Broadview Technologies Inc.) In another embodiment the plasticizer is an aliphatic polyester comprising adipic acid residues and diethylene glycol residues. In another embodiment, the plasticizer is Resoflex R804 (Broadview Technologies Inc.) In another embodiment the plasticizer is an aliphatic polyester comprising succinic acid residues and diethylene glycol residues.

In another embodiment of this invention, the mixed cellulose ester compositions of the invention can comprise one or more plasticizers comprising one or more of: A) from about 5 to about 95 weight % of a $C_2$-$C_{12}$ carbohydrate organic ester, wherein the carbohydrate comprises from about 1 to about 3 monosaccharide units; and (ii) from about 5 to about 95 weight % of a $C_2$-$C_{12}$ polyol ester, wherein the polyol is derived from a $C_5$ or $C_6$ carbohydrate; and B) from about 5 to about 95 weight % of a $C_2$-$C_{10}$ ester of cellulose having a DS of from about 0.7 to about 3.0; wherein the percentages are based on the total weight of component (A) plus component (B).

In one embodiment, however, when B), the polyol ester does not comprise or contain a polyol acetate or polyol acetates.

In another embodiment of this invention, a plasticizer comprises the carbohydrate ester and the carbohydrate portion of the carbohydrate ester is derived from one or more of glucose, galactose, mannose, xylose, arabinose, lactose, fructose, sorbose, sucrose, cellobiose, cellotriose and raffinose. In another embodiment of this invention, a plasticizer comprises the carbohydrate ester and wherein the carbohydrate ester comprises one or more of α-glucose pentaacetate, β-glucose pentaacetate, α-glucose pentapropionate, β-glucose pentapropionate, α-glucose pentabutyrate and β-glucose pentabutyrate.

In another embodiment of this invention, the mixed cellulose ester compositions of the invention can comprise one or more plasticizers comprising a carbohydrate ester and wherein the carbohydrate ester comprises an α-anomer, a β-anomer or a mixture thereof. In another embodiment of this invention, a plasticizer comprises the carbohydrate ester and wherein the carbohydrate ester comprises at least about 60% of a β-anomer.

Any of the plasticizers useful in the invention may be present in the mixed cellulose ester composition of the invention in one of the following weight percentages based on the total weight percentage of the mixed cellulose ester composition: 5 to 95; 5 to 90; 5 to 85; 5 to 80; 5 to 75; 5 to 70; 5 to 65; 5 to 60; 5 to 55; 5 to 50; 5 to 45; 5 to 40; 5 to 35; 5 to 30; 5 to 25; 5 to 20; 5 to 15; 5 to 10; 10 to 95; 10 to 90; 10 to 85; 10 to 80; 10 to 75; 10 to 70; to 65; 10 to 60; 10 to 55; 10 to 50; 10 to 45; 10 to 40; 10 to 35; 10 to 30; 10 to 25; 10 to 20; 10 to 15; 15 to 95; 15 to 90; 15 to 85; 15 to 80; 15 to 75; 15 to 70; 15 to 65; 15 to 60; 15 to 55; 15 to 50; 15 to 45; 15 to 40; 15 to 35; 15 to 30; 15 to 25; 15 to 20; 20 to 95; 20 to 90; 20 to 85; 20 to 80; 20 to 75; 20 to 70; 20 to 65; 20 to 60; 20 to 55; 20 to 50; 20 to 45; 20 to 40; 20 to 35; 20 to 30; 20 to 25; 25 to 95; 25 to 90; 25 to 85; 25 to 80; 25 to 75; 25 to 70; 25 to 65; 25 to 60; 25 to 55; 25 to 50; 25 to 45; 25 to 40; 25 to 35; 25 to 95; 30 to 90; 30 to 85; 30 to 80; 30 to 75; 30 to 70; 30 to 65; 30 to 60; 30 to 55; 30 to 50; 30 to 45; 30 to 40; 30 to 35; 35 to 95; 35 to 90; 35 to 85; 35 to 80; 35 to 75; 35 to 70; 35 to 65; 35 to 60; 35 to 55; 35 to 50; 35 to 45; 35 to 40; 40 to 95; 40 to 90; 40 to 85; 40 to 80; 40 to 75; 40 to 70; 40 to 65; 40 to 60; 40 to 55; 40 to 50; 40 to 45; 45 to 95; 45 to 90; 45 to 85; 45 to 80; 45 to 75; 45 to 70; 45 to 65; 45 to 60; 45 to 55; 45 to 50; 50 to 95; 50 to 90; 50 to 85; 50 to 80; 50 to 75; 50 to 70; 50 to 65; 50 to 60; 50 to 55; 55 to 95; 55 to 90; 55 to 85; 55 to 80; 55 to 95; 55 to 90; 55 to 85; 55 to 80; 55 to 75; 55 to 70; 55 to 65; 55 to 60; 60 to 95; 60 to 90; 60 to 85; 60 to 80; 60 to 75; 60 to 70; 60 to 65; 65 to 95; 65 to 90; 65 to 85; 65 to 80; 65 to 75; 65 to 70; 70 to 95; 70 to 90; 70 to 85; 70 to 80; 70 to 75; 75 to 95; 75 to 90; 75 to 85; 75 to 80; 80 to 95; 80 to 90; 80 to 85; 80 to 95; 80 to 90; 80 to 85; 85 to 95; 85 to 90; 90 to 95.

One embodiment of the invention is directed to a liquid crystal display film that has been prepared using a mixed cellulose ester composition comprising at least one plasticizer as described in the previous paragraph and having a ratio of non-acetyl ester degree of substitution to the hydroxyl degree of substitution of 10 or greater and a degree of non-acetyl ester substitution greater than 0.5, for example greater than 1.1, for example 1.1 to 1.75. Another embodiment is directed to such liquid crystal display film having any combination of Re and Rth values described above. In another embodiment of the invention such liquid crystal display film is prepared by melt extrusion. In another embodiment of the invention such liquid crystal display film is prepared by solvent casting.

Plasticizers, stabilizers, UV absorbers, are more common in the mix, but other additives such as antiblocks, slip agents, lubricants, pinning agents, dyes, pigments, retardation modifiers, matteing agents, mold releases, etc. can also be added if so desired.

For melt processable applications, materials can be extruded using a single screw extruder, twin screw extruder, roll mill, or any other melt plasticating equipment. Furthermore, as is more common the materials can be precompounded together on one system such as a twin screw or roll mill, pelletized, and then processed on a second extruder in conjunction with the film line. For single and twin screw film extrusion a gear pump can be used in between the extruder and die to ensure uniform flowrate. There is no limitation to how the components can be combined and mixed as the important performance attributes relate more to the downstream extrusion and casting process.

Extruders can contain any variety of screws or mixing sections. In general, compression ratios in the range of 5 to 15 are considered large (where compression ratio is defined as channel depth in feed zoned divided by channel depth in metering zone.) In one embodiment, the compression ratios in the context of this invention can be in the range of 2 to 5 or 2 to 4. High compression ratios, in general, can limit feed and increase shear heating to the point of degradation. In one embodiment of our invention, we used dispersive mixing sections in conjunction with a traditional single flight or barrier screw (for single screw applications).

Stringent requirements on the purity, appearance, color and performance of optical films typically benefit from filtration in the production lines. Thus, in one embodiment, the films of the present invention are made using fine filtration. Typically, fine filtration of films for optical films is carried forward using candle filters or leaf disks. A properly designed filter system can provide production benefits such as reducing gel counts and minimizing line breaks and process disruptions.

Most manufacturers specify the efficiency of their filter media in terms of an "absolute" micron rating. This rating specifies the particle size, above which a minimum of 98% of all particles will be removed by the filter. For very fine applications, 5 μm and below, it is recommended that fiber metal felt media be used. The filter media are typically installed downstream of the extruder, but prior to the extrusion die. This filtration can be done in conjunction with any type of extrusion setup (i.e. single-screw, twin-screw, etc.), and typically the filtration immediately follow a gear pump system to maximize flow and minimize pressure fluctuations due to output variability. The filter media can be installed using any typical screen holder although systems that have automatic filter cleaning/changing capabilities are more common.

Extrusion can be performed using traditional flat film dies such as those of the coat hanger or T-type design. Others such as annular dies can be used in, for example, a blown film type of process although gauge control usually suffers with such an approach. The die gap can be adjusted using manual die bolts, and in one embodiment, using an "autotune" type of die lip where the die gaps are adjusted automatically via a feedback controller hooked in to thickness measuring equipment. Such controls can provide film with uniform gauge.

Casting equipment (solvent or melt) can consist of a casting roll or drum, a rollstack arrangement, or even a casting belt. Rolls and drums are more common. In a rollstack arrangement, the film is often polished or followed with a smaller nip roll to improve gauge control although care must be taken not to induce excessive stress into the film. The roll is typically a chrome plated roll with mirror-like finish but matte rolls or rolls with varied surface finishes/roughnesses can also be used if so desired. Roll casting whereby the roll is partially immersed in a cooling bath is also possible to increase cooling rates and speed up throughput. To ensure good contact between film and casting equipment, an air knife, vacuum box or electrostatic pinning wire can be used.

The film of the present invention can be a single layer or multiple layer film, produced by either coextrusion, coating or lamination. In the case of coextrusion, the layers can be brought together with a traditional feedblock, a multi-manifold die or multiple combinations thereof. Microlayer coextrusions involving multipliers and 10 or more layers can also be used. Coextrusion has the added benefit that layers with much shorter relaxation times (or lower viscosities) can be placed on the surface of the film, thereby acting as a pseudo-lubricating layer. The lower the viscosity of this cap layer relative to the inner layers, the more the inner layers will move in a "plug flow" arrangement. Plug flow is characterized as having little or no shear deformation present so the plug flow core will have very little birefringence. Thus, an otherwise very viscous, long relaxation time polymer can still be used in a display by placing it between cap layers of a lower viscosity fluid so that it moves in a plug flow manner. While the outer lower viscosity layers will see much more shear, they will also have much shorter relaxation times and therefore are more readily able to relax away any orientation. Similar behavior can also be obtained by adding lubricants such as fluoropolymers the melt although these do tend to cause more hazing of the film.

In another embodiment, the film of the present invention can also be produced using a polishing roll stack process or by calendering. The low birefringence of the material ensures that the high stresses induced into the film by the nip contact, will not translate into excessively high retardation values. Most traditional cellulosics cannot be polished or calendered for optical applications because the retardations are too high and/or they are not melt processable at low enough temperatures. Polishing and calendering provide the added benefit of better thickness control over traditional melt casting, If desired, the film can be consequently stretched in the MD direction by, for example, traditional drafting or combined compression/drawing type drafters. Stretching in the TD is typically performed by tentering. Likewise, a combination of MD and TD stretching can be used if desired. Stretching is usually applied to impart a specific birefringence to the film for use in, for example, compensator films. Actual stretching conditions and configurations are well known in the art. For example, film stretching in multiple directions can be simultaneous or sequential depending on the equipment available. Stretching of the film by a double-bubble type blown film process is also possible. Most stretching operations involve stretch ratios of 1.1 to 5× in one or more directions (although this can vary with material). Furthermore most stretching also involves a follow up annealing or "heatsetting" step to further condition the material.

The film can be post treated with methods well known in the art such as corona treatment, plasma treatment, flame treatment, etc. The film is also commonly saponified to ensure good adhesion with subsequent PVOH polarizing layers.

The material can also be used in other molding operations such as injection and coinjection molding, profile extrusion, fiber spinning, extrusion blow molding, thermoforming, etc. The low birefringence ensures that molded in stresses which are common with these processes, will not lead to excessive optical distortion.

For display applications, the film will ultimately be combined with other films and structures to form an overall liquid crystal device. Examples of processes used include lamination and/or coating. These structures are commonly known to those skilled in the art and it is understood that the films and resins of the present invention can be used in a variety of forms depending on the specifics of the particular manufacturer and liquid crystal cell type.

EXAMPLES

The degree of substitution of the cellulose esters reported in the examples below was determined by 1H NMR using a JEOL Model 600 NMR spectrometer operated at 600 MHz. The sample tube size was 5 mm and the sample temperature was 80° C. using dimethylsulfoxide-d6 with a couple of drops of deuterated trifluoroacetic acid as the solvent. The pulse delay was 5 seconds and 64 scans were acquired for each experiment.

"Inherent viscosity" or "IV" was determined in 60/40 (wt/wt) phenol/tetrachloroethane at a concentration of 0.5 g/100 ml at 25° C.

Unless otherwise specified, the glass transition temperature Tg, was determined using a TA DSC 2920 instrument from Thermal Analyst Instruments on non-plasticized samples using DSC with a ramp rate of 20° C./minute according to ASTM D3418. Tg values were extracted from 2nd heating cycle measurements to ensure a clearly denoted transition and the removal of any residual water. The melting point was also measured using DSC according to ASTM D3418. Falling ball viscosity was measured using ASTM Method D1343-91 in ASTM A solvent. Inherent Viscosity (IV) was determined using a concentration of 0.5 g/100 ml of resin in a 60/40 (wt/wt) phenol/tetrachlorethane solution at 25° C.

The weight percent acetyl and propionyl were determined by a hydrolysis GC method. In this method, about 1 g of ester is weighed into a weighing bottle and dried in a vacuum oven at 105° C. for at least 30 minutes. Then, 0.500±0.001 g of sample was weighed into a 250 mL Erlenmeyer flask. 50 mL of a solution of 9.16 g isovaleric acid, 99% in 2000 mL pyridine was then added to the flask. This mixture was heated to reflux for about 10 minutes, after which 30 mL of methanoic potassium hydroxide solution was added to the mixture. The mixture was then heated at reflux for about 10 minutes, and then allowed to cool with stirring for 20 minutes, after which, 3 mL concentrated hydrochloric acid were added. The mixture was stirred for 5 minutes and then allowed to settle for 5 minutes. An aliquot of about 3 mL of solution was transferred to a centrifuge tube and centrifuged for about 5 minutes. The solution was analyzed by GC (split injection and flame ionization detector) with a 25M×0.53 mm fused silica column with 1 micron FFAP phase. The weight percent acyl was calculated according to the formula:

$$Ci=((Fi*Ai)/Fs*As))*R(100)$$

where:
Ci=concentration of I (acyl group)
Fi=relative response factor for component I
Fs=relative response factor for isovaleric acid
Ai=area of component I
As=area of isovaleric acid
R=(grams of isovaleric acid)/(g of sample)

Solvent Casting

The resin was dried for 12 hours at 50° C. under vacuum to remove any excessive moisture. Next, 18 grams of dried resin were added to 180 grams of a 90/10 solvent mixture of methylene chloride and methanol. Afterwards, 2 grams of triphenyl phosphate (TPP) plasticizer were added to the mixture. The mixture was sealed, placed on a roller, and mixed for 24 hours to create a uniform dope of approximately 10 wt % solids. After mixing, the dope was cast onto a glass plate using a doctor blade adjusted to give an approximate 80 micron final thickness. Casting was performed in a fume hood with relative humidity control at 50% (+/−10%). After casting, the film and glass were allowed to dry for one hour under a cover pan to minimize rate of solvent evaporation. After this initial drying, the film was peeled from the glass and annealed in a forced air oven for 10 minutes at 100° C. followed by an annealing at 140° C. for 20 minutes. Annealing was performed with the film constrained so as to prevent any further shrinkage. In the case of some of the mixed esters, it was common for them to "blush" due to their different solubilities (relative to cellulose acetate). In these cases, 1 wt % of butanol was added to the solvent mixture to help slow down the drying and control the quality of the film casting.

Film Parameters

Optical retardations Re and Rth of the films were measured using a Woollam ellipsometer at a wavelength of 633 nm. For film thicknesses that were greater than or equal to 80 microns, the Rth values were also normalized to an 80 μm equivalent thickness based on the assumption that the birefringence is thickness independent. In reality, there is a slight thickness dependence in solvent casting with thicker films having lower retardation than thinner films due to the differences in stress formed during casting. This normalized Rth is denoted as "R80," to differentiate it from the measured Rth, and is calculated as $$R80=80*Rth/d \quad (6)$$

where d is the actual film thickness in microns. Birefringence values for the film are also included as another "thickness normalized" measure of optical an isotropy.

The rubbery stress-optical coefficient (SOC) was determined from films stretched on a Bruckner biaxial film stretcher. The films were stretched approximately 1.25× in a planer (constant width) stretch configuration at a temperature just above the softening point of the film. The true stresses at the end of stretching (i.e. the force divided by the actual film cross sectional area) were recorded in both the machine and transverse directions and the planar "stress difference" obtained by subtracting the transverse direction stress from the machine direction stress. Optical retardation Re of the stretched film was then measured using either a Woollam ellipsometer, at a wavelength of 633 nm and converted to birefringence by dividing by the film thickness. The SOC was then calculated as the birefringence divided by the true stress difference in the film.

Example 1

Preparation of Cellulose Ester Compounds

Cellulose (75 g) was fluffed in a metal lab blender in three batches. This fluffed cellulose was treated in one of the following three pretreatments.

Pretreatment A: The fluffed cellulose was soaked in mixtures of acetic acid and propionic acid (amounts listed in Table 1 below). Then the reaction was carried out as shown below.

Pretreatment B: The fluffed cellulose was soaked in 1 liter of water for about 1 hour. The wet pulp was filtered and washed four times with acetic acid to yield acetic acid wet pulp (weight shown in Table 1 below) and the reaction carried out as shown below.

Pretreatment C: The fluffed cellulose was soaked in about 1 liter of water for about 1 hour. The wet pulp was filtered and washed four times with propionic acid to yield propionic acid wet pulp (weight shown in Table 1 below) and the reaction carried out as shown below.

Pretreatment D: The fluffed cellulose was soaked in about 1 liter of water for about 1 hour. The wet pulp was filtered and washed three times with acetic acid and three times with propionic acid to yield propionic wet pulp (weight shown in Table 1 below) and the reaction carried out as shown below.

Reaction: The acid wet pulp from one of the treatments above was then placed in a 2-liter reaction kettle and acetic or propionic acid was added as noted in Table 1 below. The reaction mass was cooled to 15° C. and a 10° C. solution of acetic anhydride propionic anhydride (amounts of anhydride shown in Table 1 below), and 2.59 g of sulfuric acid was added. After the initial exotherm, the reaction mixture was held at about 25° C. for 30 minutes and then the reaction mixture was heated to 60° C. When the mixture has doped out and the proper viscosity of the dope was obtained, a 50-60° C. solution of 296 mL of acetic acid and 121 mL of water was added. This mixture was allowed to stir for 30 minutes and then a solution of 4.73 g of magnesium acetate tetrahydrate in 385 ml of acetic acid and 142 ml of water was added. This reaction mixture was then precipitated by one of the methods shown below.

Precipitation Method A: The reaction mixture was precipitated by the addition of 8 L of water. The resulting slurry was filtered and washed with water for about four hours and then dried in a 60° C. forced air oven to yield the amount of cellulose acetate propionate shown in Table 1.

Precipitation Method B: The reaction mixture was precipitated by the addition of 4 L of 10% acetic acid and then hardened by addition of 4 L of water. The resulting slurry was filtered and washed with water for about four hours and then dried in a 60° C. forced air oven to yield the amount of cellulose acetate propionate shown in Table 1.

The analytical data for these cellulose acetate propionates is shown in Table 2 and the retardation data from films cast from these esters is shown in Table 3. The retardation of these esters was not dependent on the method of preparation but only on the actual composition of the cellulose acetate propionate.

TABLE 1

Reactor Charge Amounts

| Run # | Pretreat Method | Amount of Acetic Acid in Pretreat, ml | Amount of Proponic Acid in Pretreat, ml | Weight of Acid Wet Pulp, g | Acid Added after Pretreat | Amount of Acid Added after Pretreat, ml | Amount of Acetic Anhydride Added, ml | Amount of Propionic Anhydride Added, ml | Precipitation Method |
|---|---|---|---|---|---|---|---|---|---|
| 1 | A | 215 | 0 | 301 | Propionic | 151 | 0 | 249 | A |
| 2 | A | 119 | 277 | 475 | None | 0 | 77 | 147 | A |
| 3 | A | 191 | 201 | 475 | None | 0 | 0 | 249 | A |
| 4 | A | 167 | 227 | 475 | None | 0 | 0 | 249 | A |
| 5 | B | 0 | 0 | 438 | Propionic | 151 | 0 | 249 | A |
| 6 | C | 0 | 0 | 299 | Acetic | 73 | 75 | 146 | B |
| 7 | D | 0 | 0 | 343 | Acetic | 67 | 76 | 147 | A |

TABLE 2

Analytical Data

| Run # | Weight of CAP Produced | Weight % Acetyl | Weight % Propionyl | DS Acetyl, NMR | DS Propionyl, NMR | Mg, ppm, ICP | S, ppm ICP | Wt % OH | IV |
|---|---|---|---|---|---|---|---|---|---|
| 1 | 113 | 21.1 | 27.4 | 1.46 | 1.5 | 17.6 | 54 | 0.69 | 0.99 |
| 2 | 109 | 25.3 | 22.6 | 1.76 | 1.22 | 3.4 | 42 | 0.56 | 1.06 |
| 3 | 127 | 18.9 | 29.6 | 1.33 | 1.62 | 2.8 | 57 | 0.55 | 0.93 |
| 4 | 96 | 17.3 | 30.9 | 1.22 | 1.74 | 3.2 | 33 | 0.54 | 0.88 |
| 5 | 116 | 22.4 | 25.7 | 1.57 | 1.41 | 1.3 | 12 | 0.46 | 1.2 |
| 6 | 106 | 21.3 | 26.6 | 1.53 | 1.46 | 2.4 | 47 | 0.56 | 1.19 |
| 7 | 94 | 20.4 | 26.8 | 1.49 | 1.49 | 2.3 | 17 | 0.46 | 1.14 |

Examples 8 Through 21

Solvent Casting of Cellulose Acetate Propionates

Additional CAPs were made following procedures similar to Example 1, with the exception that different DS ranges of acetyl, propionyl and hydroxyl were produced. The different ranges of acetyl and propionyl were produced by changing the ratio of acetyl and propionyl species in the reaction mixture. The DS range of hydroxyl was changed by varying the time between the addition of the acetic acid water mixture and the addition of the magnesium acetate solution. Resin IV values for all of the samples ranged between about 0.8 and about 1.2. Films were cast from these materials and retardation values are shown in Table 3. It was observed that when the ratio of the propionyl DS to the hydroxyl DS (i.e. the "hydroxyl ratio") was below 5, the Rth value became negative as the resin has high positive birefringence. Similarly, for values of the hydroxyl ratio between about 10 and 20, the film showed closer to zero retardation performance. Above a ratio of about 20, the material began to show significant negative birefringence and large positive Rth values.

DS value increases the Tg, but this also makes the retardation values more negative. Nevertheless, it was possible to choose a balance between propionyl level and hydroxyl level that will yield zero retardation while still maintaining higher Tg values. For example, resins 11 and 12 have high Tg (155 to 157° C.) yet still show negative birefringence (i.e. positive Rth values).

Examples 22-34

Solvent Casting of Cellulose Acetate Butyrates (CABs)

A series of CABs were produced following the synthesis described in Example 1, but using butyric acid or anhydride in place of the propionic acid or propionic anhydride. Various DS ranges for acetyl, butyryl and hydroxyl were made and the retardation and DS data is listed in Table I. The trends in

TABLE 3

Solvent Casting Compositions and Retardation Data

| Run # | DS Ac | DS Pr | DS Bu | DS OH | HydrRatio | Tg (C) | d (um) | $R_e$ (nm) | $R_{th}$ (nm) | R80 (nm) | $\Delta n_{th}$ |
|---|---|---|---|---|---|---|---|---|---|---|---|
| 1 | 1.48 | 1.5 | 0 | 0.12 | 12.5 | 153 | 104 | 0.6 | 16.5 | 12.7 | 1.6E−04 |
| 2 | 1.76 | 1.22 | 0 | 0.1 | 12.2 | 118 | 76 | 0.3 | −0.8 | −0.8 | −1.1E−05 |
| 3 | 1.33 | 1.62 | 0 | 0.1 | 16.2 | 129 | 106 | 0.7 | 41.2 | 31.0 | 3.9E−04 |
| 4 | 1.22 | 1.74 | 0 | 0.1 | 17.4 | 111 | 79 | 0.2 | 27.0 | 27.3 | 3.4E−04 |
| 5 | 1.57 | 1.41 | 0 | 0.08 | 17.6 | 141 | 69 | 0.2 | 10.9 | 12.6 | 1.6E−04 |
| 6 | 1.53 | 1.38 | 0 | 0.10 | 13.8 | 157 | 129 | 0.6 | −0.1 | 0.0 | −5.4E−07 |
| 7 | 1.49 | 1.49 | 0 | 0.08 | 18.8 | 134 | 99 | 0.5 | 19.5 | 15.8 | 2.0E−04 |
| 8 | 1.72 | 1.19 | 0 | 0.09 | 13.2 | 135 | 111 | 0.1 | −11.8 | −8.5 | −1.1E−04 |
| 9 | 1.37 | 1.55 | 0 | 0.08 | 19.4 | 140 | 117 | 0.4 | −3.5 | −2.4 | −2.9E−05 |
| CE10 | 2.63 | 0.24 | 0 | 0.13 | 1.8 | 171 | 85 | 0.3 | −55.8 | −52.5 | −6.6E−04 |
| 11 | 1.53 | 1.38 | 0 | 0.10 | 13.8 | 157 | 71 | 1.7 | 31.1 | 35.0 | 4.4E−04 |
| 12 | 1.46 | 1.45 | 0 | 0.09 | 16.1 | 157 | 70 | 0.5 | 14.1 | 16.2 | 2.0E−04 |
| 13 | 1.46 | 1.42 | 0 | 0.12 | 11.8 | 155 | 75 | 0.2 | 0.3 | 0.3 | 3.5E−06 |
| 14 | 1.46 | 1.46 | 0 | 0.08 | 18.3 | 157 | 81 | 0.6 | 8.4 | 8.3 | 1.0E−04 |
| 15 | 1.48 | 1.48 | 0 | 0.03 | 49.3 | 141 | 98 | 0.7 | 29.2 | 23.8 | 3.0E−04 |
| 16 | 1.46 | 1.53 | 0 | 0.02 | 76.5 | 138 | 66 | 1.8 | 26.2 | 31.8 | 4.0E−04 |
| 17 | 1.37 | 1.54 | 0 | 0.08 | 19.3 | 147 | 105 | 0.5 | 27.8 | 21.2 | 2.6E−04 |
| 18 | 1.6 | 1.34 | 0 | 0.06 | 22.3 | 156 | 105 | 0.9 | 4.8 | 3.7 | 4.6E−05 |
| CE19 | 1.92 | 0.74 | 0 | 0.34 | 2.2 | 166 | 89 | 0.6 | −84.0 | −75.5 | −9.4E−04 |
| CE20 | 1.28 | 1.28 | 0 | 0.44 | 2.9 | 167 | 70 | 11.8 | −60 | −68.6 | −8.6E−04 |
| CE21 | 0.18 | 2.5 | 0 | 0.32 | 7.8 | 138 | 90 | 0.6 | −86.7 | −77.1 | −9.6E−04 |
| CE22 | 1.94 | 0 | 0.89 | 0.17 | 5.2 | 115 | 99 | 0.1 | −22.0 | −17.8 | −2.2E−04 |
| CE23 | 1.83 | 0 | 1 | 0.17 | 5.9 | 112 | 100 | 0.1 | −21.4 | −17.1 | −2.1E−04 |
| CE24 | 1.29 | 0 | 1.56 | 0.16 | 9.8 | 140 | 102 | 0.0 | −29.0 | −22.7 | −2.8E−04 |
| CE25 | 1.95 | 0 | 0.87 | 0.18 | 4.8 | 135 | 98 | 0.4 | −32.2 | −26.3 | −3.3E−04 |
| CE26 | 1.8 | 0 | 1.04 | 0.16 | 6.5 | 139 | 106 | 0.3 | −21.8 | −16.5 | −2.1E−04 |
| CE27 | 2.1 | 0 | 0.73 | 0.17 | 4.3 | 130 | 107 | 0.6 | −30.7 | −23.0 | −2.9E−04 |
| CE28 | 2.61 | 0 | 0.25 | 0.14 | 1.8 | 120 | 96 | 1.0 | −70.0 | −58.3 | −7.3E−04 |
| CE29 | 2.5 | 0 | 0.34 | 0.16 | 2.1 | 109 | 110 | 0.7 | −55.0 | −40.0 | −5.0E−04 |
| CE30 | 2.03 | 0 | 0.85 | 0.12 | 7.1 | 112 | 118 | 0.7 | −21.5 | −14.6 | −1.8E−04 |
| CE31 | 2.22 | 0 | 0.66 | 0.12 | 5.5 | 129 | 118 | 1.1 | −16.0 | −10.8 | −1.4E−04 |
| CE32 | 2.04 | 0 | 0.71 | 0.25 | 2.8 | 155 | 100 | 0.9 | −30.6 | −24.5 | −3.1E−04 |
| CE33 | 1.01 | 0 | 1.68 | 0.31 | 5.4 | 134 | 94 | 0.6 | −45.7 | −38.9 | −4.9E−04 |
| 34 | 1.21 | 0 | 1.68 | 0.11 | 15.3 | 129 | 79 | 0.3 | −10.0 | −10.1 | −1.3E−04 |
| CE35 | 2.84 | 0 | 0 | 0.16 | 0.0 | 182 | 89 | 0.5 | −56.0 | −50.3 | −6.3E−04 |

This trend is also illustrated in FIG. 4, where the R80 value is plotted as a function of the hydroxyl ratio for both the CAP and CAB series (see, e.g., next example). It was observed that retardation tracks closely the hydroxyl ratio, with the crossover to low intrinsic birefringence beginning at a hydroxyl ratio of about 5.

Values of the glass transition temperature Tg, are also compiled in Table 4. It can be seen that raising the hydroxyl retardation are approximately the same with CAB as with CAP Tg's tend to be lower for CAB. As with the CAP samples, it was observed that when the ratio of the butyryl DS to the hydroxyl DS (i.e. the "hydroxyl ratio") is below about 5, the Rth value becomes very large and negative. Similarly for Example 34 which had a hydroxyl ratio greater than 10, the retardation values begin to approach zero as the birefringence is decreasing.

Comparative Example 35

Solvent Casting of Cellulose Triacetate

For comparative purposes, a commercial cellulose triacetate (Eastman Cellulose Triacetate CA-436-80S) was tested in a similar manner to Examples 1 through 7 (minus the propionic acid). The triacetate had a DS of 2.84 with a DS(OH) of 0.16 and represents a typical commercial triacetate used as TAO film base. The film had a hydroxyl ratio of zero (given the lack of non-acetyl esters attached), and also had a very high negative retardation. The resin of this example is not melt processable.

Creation of an −A Plate from Solvent Cast CAP

The solvent cast film produced in Example 14 was cut into a one-half inch wide (1.25 cm) strip and stretched uniaxially 1.75× using a tensile tester. The gauge length of the stretched area was approximately 2 inches (5.5 cm) and the film was heated to above its Tg prior to stretching using a hot air gun. Initial film thickness was 100 microns, and thickness after stretching was 75 microns. The retardation Re of the film after stretching was −80 nm (i.e. the higher refractive index was aligned perpendicular to the stretch direction) confirming that the material is suitable for use in making −A type compensator films.

Determination of Acetyl Spread for CAP Samples

Effective acetyl spread was determined on Samples 13 and 14, along with the commercial cellulose triacetate in Comparative Example 29. Analysis was performed using a Hamilton PRP-1 column (75×4.6, 10 um, P/N 070-500) equipped with a Sedex evaporative light scattering detector. The flow rate of the column was 0.8 mL/min and testing was performed at 30° C. using a 10 µL injection volume. Sample preparation consisted of diluting 0.1 g of the cellulosic in 35 mL of n-methylpyrrolidone. The mobile phase at time zero was a solution of 12.5% methanol, 50% acetone and 37.5% water; and this was linearly varied to a pure acetone solution over a 15 minute time interval. The half-width of the distribution of the sample is reported in units of minutes and is a measure of the "effective" spread in the acetyl distribution because propionyl groups present in the sample also influence the elution times.

Results of the testing showed that the cellulose triacetate of CE35 had an effective acetyl spread of 0.47 minutes whereas the CAP samples 13 and 14 had acetyl spreads of 0.42 and 0.43 minutes respectively. These results indicate that there is very little difference in effective acetyl spread between the CAP samples and the commercial CTA sample.

Resin Compounding and Extrusion Processing

Prior to melt extrusion, the cellulose powders were compounded on a 30 mm Werner Pfleider co-rotating twin screw extruder in order to add plasticizer and 0.5 wt % of Eastman 15304 stabilizer. Plasticizer levels were nominally 5 or 10% and consisted of either diethyl phthalate (DEP) or Resoflex R296 plasticizer acquired from Broadview Technologies Inc. A "medium shear" screw configuration was used along with barrel zone temperatures between 230 to 240° C. and screw speeds between 250 and 300 rpm. Extrusion rates were nominally 30 to 40 lbs per hour (14 to 19 kg/hr). The plasticizer was fed in using a liquid feeder attached approximately ⅓ down the barrel from the feed throat. The extrudate from the twin screw was forced through a pelletizing rod type and chopped into pellets suitable for use during subsequent single screw extrusion. Base resins used in the extrusion examples are compiled in Table 4.

TABLE 4

Compositions for Extrusion Casting

| Resin | DS Ac | DS Pr | DS Bu | Pr + Bu | DS OH | Tg | Hydroxyl Ratio | Falling Ball Viscosity | IV | SOC × $10^{-10}$ $Pa^{-1}$ |
|---|---|---|---|---|---|---|---|---|---|---|
| CE101 | 0.18 | 2.5 | 0 | 2.5 | 0.32 | 138 | 7.8 | 18.6 | 1.40 | 4.0 |
| CE102 | 1.01 | 0 | 1.68 | 1.68 | 0.31 | 136 | 5.4 | 17 | 1.44 | 2.4 |
| 103 | 1.46 | 1.42 | 0 | 1.42 | 0.12 | 155 | 11.8 | 17 | 1.42 | 1.1 |
| 104 | 1.46 | 1.45 | 0 | 1.45 | 0.09 | 157 | 16.1 | 17.4 | 1.43 | 1.0 |
| 105 | 1.46 | 1.46 | 0 | 1.46 | 0.08 | 157 | 18.3 | 16.7 | 1.43 | 1.1 |
| CE106 | 0.79 | 2 | 0 | 2.00 | 0.22 | 152 | 9.1 | 9.5 | 1.29 | 3.0 |
| CE107 | 1.28 | 1.28 | 0 | 1.28 | 0.44 | 167 | 2.9 | 13.1 | 1.35 | 3.8 |

Next, the pellets compounded above were dried at 70° C., for 12 hrs in a desiccant drying system. After drying, the materials were cast into film using a 1 inch (2.54 cm) Killion single screw extruder having an L/D of 24:1 and a Maddock mixing screw. The extruder was set with an initial zone profile of 240° C. and run at a rate of 50 RPM, although this was varied for some of the later runs between a range of about 40 to 80 RPM. The material was extruded through a 6" coat hanger die (15.2 cm) with a nominal 10 mil die gap (unless otherwise noted). The RPM was set between 40 and 80 RPM giving mass flow rates ranging from 9 to 15 lbs/hr (4 to 6.8 kg/hr). Spacing between the die lip and roll was maintained at approximately 1 inch (2.54 cm) to minimize neck-in of the web (attempts to run with larger spacings between die and roll led to unstable webs that tended to oscillate and cause thickness fluctuations). Except where otherwise noted, film was cast to a nominal thickness of 80 micron and thickness was controlled via the casting roll speed. After extrusion, the film was evaluated for optical retardation and general quality.

Comparative Examples 101 and 102

Effect of Extrusion Variables on Re and Rth

A designed experiment was performed to determine the effects of melt temperature, roll temperature, die gap, and RPM on Re and Rth. Film thickness was held constant at approximately 80 microns by way of varying the winding speed. Data for these samples under various run conditions is compiled in Table 5, with each run condition being designated by lower-case alphanumeric characters. All samples in Table 5 contained 5% DEP plasticizer.

TABLE 5

Effect of Processing Variables on Retardation

| Resin | Run # | T Melt (C) | T Roll (C) | die gap (cm) | RPM | Re (nm) | Rth (nm) |
|---|---|---|---|---|---|---|---|
| CE101 | a | 240 | 124 | 0.025 | 80 | 0.8 | −7.2 |
|  | b | 240 | 124 | 0.025 | 40 | 1.8 | −11.0 |
|  | c | 200 | 124 | 0.025 | 80 | 22.0 | −25.0 |
|  | d | 200 | 124 | 0.025 | 40 | 17.6 | −28.0 |
|  | e | 240 | 93 | 0.025 | 80 | 1.7 | −11.0 |
|  | f | 240 | 93 | 0.025 | 40 | −3.5 | −5.0 |
|  | g | 200 | 93 | 0.025 | 80 | 21.0 | −23.0 |
|  | h | 200 | 93 | 0.025 | 40 | 19.0 | −25.5 |
|  | i | 220 | 105 | 0.012 | 60 | 5.3 | −8.0 |
|  | j | 220 | 105 | 0.012 | 60 | 1.8 | −7.0 |
|  | k | 220 | 105 | 0.019 | 60 | 8.0 | −10.7 |
| CE102 | a | 240 | 124 | 0.012 | 40 | 31.6 | −36.8 |
|  | b | 240 | 124 | 0.012 | 80 | 26.4 | −30.0 |
|  | c | 200 | 124 | 0.012 | 80 | 0.0 | −0.5 |
|  | d | 200 | 124 | 0.012 | 40 | −5.3 | 0.6 |
|  | e | 240 | 93 | 0.012 | 80 | 26.4 | −34.0 |
|  | f | 240 | 93 | 0.012 | 40 | 37.0 | −37.0 |
|  | g | 200 | 93 | 0.012 | 80 | 5.3 | −15.0 |
|  | h | 200 | 93 | 0.012 | 80 | 1.5 | −6.0 |
|  | i | 220 | 105 | 0.012 | 40 | 3.5 | −11.0 |
|  | j | 240 | 124 | 0.025 | 80 | 28.0 | −12.0 |
|  | k | 240 | 124 | 0.025 | 40 | 25.0 | −34.0 |
|  | l | 200 | 124 | 0.025 | 80 | 0.0 | −6.0 |
|  | m | 200 | 124 | 0.025 | 40 | 0.0 | −4.4 |
|  | n | 240 | 124 | 0.025 | 80 | 32.0 | −45.0 |
|  | o | 240 | 93 | 0.025 | 60 | 45.0 | −42.5 |
|  | p | 200 | 93 | 0.025 | 60 | 7.0 | −8.6 |
|  | q | 200 | 93 | 0.025 | 80 | 0.8 | −7.2 |
|  | r | 220 | 105 | 0.019 | 40 | 1.8 | −11.0 |

Analysis of the results showed that roll temperature was the variable that least affected Re and Rth and that retardation depended primarily on the remaining processing variables. Larger die gaps, for example, resulted in the need for greater drawdown of the film and thus more extensional stretching. This, in turn, led to larger, more negative values of Re and Rth. Melt temperature also played a key role as the higher viscosity at lower processing temperatures decreased the level of molecular relaxation that could occur and also increased retardation. Nevertheless, the higher melt temperatures resulted in unacceptable yellowing of the film due to thermal degradation.

The results of this example clearly indicate that retardation is very sensitive to the processing conditions used. This makes it difficult to maintain a constant retardation profile as normal fluctuations that occur within any extrusion process (e.g. pressure/temperature fluctuations over time) will translate into variability in retardation. For a more robust process, a material is needed that is less sensitive to these variations in processing conditions, particularly at colder processing temperatures. It is this need that led to the development of the low hydroxyl resins of the invention, described in the following examples.

Examples 103-107

In these examples, films were extruded in similar manner as CE101 and CE102 with the following modifications. Because mass throughput rate (i.e. RPM) and roll temperature were not found to be significant influencers of retardation, they were held constant at 53 RPM and 110° C. respectively. The die gap was also fixed at 10 mils (0.025 cm). Since extensional stretching of the film was a major factor affecting retardation, the take-up speed of the winder was varied initially between 18 and 36 feet per minute (5.5 and 11 m/minute). As RPM was held constant, this did cause a reduction in the thickness of the film, but this thickness effect can be partially compensated for by normalizing to R80 values or by converting them directly to birefringence. Results are tabulated in Table 6 for samples 103 through 107.

TABLE 6

Extrusion Data

| Resin | Run # | PZ wt % | Roll Speed (fpm) | P (psi) | d (um) | Re (nm) | Rth (nm) | R80 (nm) |
|---|---|---|---|---|---|---|---|---|
| 103 | a | 5 | 18 | 1625 | 68 | 3.67 | −6.53 | −7.68 |
|  | b | 5 | 36 | 1595 | 30 | 3.57 | −6.52 | −17.39 |
|  | c | 10 | 18 | 1120 | 78 | 1.86 | −3.66 | −3.75 |
|  | d | 10 | 46 | 925 | 29 | 1.42 | −2.65 | −7.31 |
| 104 | a | 5 | 18 | 1575 | 82 | 2.18 | −5.02 | −4.90 |
|  | b | 5 | 36 | 1575 | 40 | 2.77 | −5.42 | −10.85 |
|  | c | 10 | 18 | 1215 | 77 | 1.17 | −2.14 | −2.23 |
|  | d | 10 | 36 | 1205 | 39 | 0.66 | −1.89 | −3.88 |
| 105 | a | 5 | 18 | 1545 | 64 | 2.19 | −4.31 | −5.38 |
|  | b | 5 | 36 | 1590 | 34 | 2.05 | −3.89 | −9.16 |
|  | c | 10 | 18 | 1185 | 63 | 0.62 | −1.80 | −2.28 |
|  | d | 10 | 36 | 1215 | 34 | 0.54 | −1.67 | −3.93 |
| CE106 | a | 5 | 18 | 1385 | 81 | 3.21 | −7.50 | −7.41 |
|  | b | 5 | 36 | 1400 | 39 | 4.58 | −7.20 | −14.76 |
|  | c | 10 | 18 | 1150 | 85 | 3.40 | −5.63 | −5.30 |
|  | d | 10 | 36 | 1050 | 44 | 3.03 | −4.79 | −8.71 |
| CE107 | a | 5 | 18 | 2530 | 72 | 22.14 | −31.94 | −35.49 |
|  | b | 5 | 36 | 2380 | 40 | 27.00 | −31.07 | −62.14 |
|  | c | 10 | 18 | 1910 | 75 | 13.49 | −23.06 | −24.59 |
|  | d | 10 | 36 | 1975 | 38 | 15.74 | −19.28 | −40.60 |

The plasticizer used in these examples was Resoflex R296, at either 5 or 10% loading. Resoflex R296 as found to be less volatile and exhibited less "boil out" than DEP. Because of the unacceptable yellowing at higher melt temperatures, the extruder was set at a constant 230° C. barrel temperature with a 220° C. die temperature. Nominal melt temperatures were between 210 and 215° C.

Inspection of the data in Table 6 shows that the lowest retardations (Re and Rth) were for samples 103 through 105. The retardations for these samples changed little when the drawdown rate was increased. Note that there was a slight increase in retardation with the lower plasticizer levels as the viscosity increased, but the retardation levels are still low enough to be useful as a zero retardation film. In contrast, CE107 showed very large values of Re for low and high PZ levels, as well as low and high drawdown ratios. In the case of CE107, the hydroxyl ratio is very low causing the equivalent retardation for a given amount of stress to be much higher. CE106, which has a borderline hydroxyl ratio of 9.1, has retardation values by extrusion casting that are acceptable for zero retardation extrusion cast films, although this resin did not work nearly as well in solvent casting.

Melt pressure data at the die was also measured provide an indication of extrudability and viscosity at processing temperature. From Table 6, it can be seen that the low hydroxyl samples (103, 104 and 105) have lower die pressures than, for example CE107, even though the falling ball viscosity number is much higher. The low hydroxyl resins are thus much easier to extrude into low retardation films, particularly at colder temperatures, and the higher molecular weight and high Tg ensures that the film will remain tough and dimensionally stable.

Stress Optical Coefficients

Values for the stress optical coefficients are listed in Table 4 for each of the resins used. Note that the film SOC's are based on DOP plasticizer for CE101 and CE102, and the Resoflex plasticizer for the remainder. The low hydroxyl resins were found to have stress optical coefficients very close to zero in contrast to the other resins that were much higher. It should be noted that the SOC will change depending on the plasticizer (and possibly the casting mode) as the solvent cast films based on TPP appeared to have more negative birefringent behavior.

Film Stretching

Film samples produced in Examples 103a, CE106a, and CE107a were stretched using a Bruckner laboratory film stretcher at a stretch temperature of 150° C. The films were plasticized and allowed to equilibrate at approximately 50% RH before stretching, which depressed their Tg relative to the unplasticized values in Table 4. Each material was stretched 1.5× and 1.75× in a planar (constant width) mode. Retardation was measured on each film after stretching and the results are compiled in Table 7. Note how the thicknesses of the film changes with stretching in relation to the stretch ratio.

As observed, the low hydroxyl 103a sample has very little change in retardation with stretching due to its low stress optical coefficient. In contrast, CE106 and CE107 both exhibit large changes in retardation with stretching. This example further illustrates how the low hydroxyl resins of the present invention are more robust with regards to producing a zero retardation film. The ability to stretch the film without changing its retardation could also be useful for dispersion control, and for making it insensitive to combination (e.g. lamination) with other layers.

TABLE 7

| Sample | Planar Stretch Ratio | Re (nm) | Rth (nm) |
|---|---|---|---|
| 103a | 0X | 0.69 | -2.7 |
|  | 1.5X | 0.33 | -4.2 |
|  | 1.75X | -1.3 | -9.3 |
| CE106a | 0X | 0.93 | -3.2 |
|  | 1.5X | 15.4 | -40.4 |
|  | 1.75X | 12.4 | -45.0 |
| CE107a | 0X | 4.0 | -14.4 |
|  | 1.5X | 52.2 | -78.9 |
|  | 1.75X | 42.6 | -75.1 |

Examples 108 Through 120

Solvent Casting of Cellulose Acetate Propionates with Various Plasticizers

Various plasticizers including xylitol pentapropionate (XPP), Resoflex 296 (R296), sorbitol hexapropionate (SHP), and arabitol pentapropionate (APP) were added to a CAP having a DS(Ac) of 1.46, DS(Pr) of 1.45, and a DS(OH) of 0.09. The plasticizers were added at loadings of 5 wt %, 10 wt % and 15 wt % and the resin dried for 12 hours at 50° C. under vacuum to remove any excessive moisture. To evaluate plasticizers at 5 weight %, 19 grams of dried resin was added to 180 grams of a 90/10 solvent mixture of methylene chloride and methanol. Afterwards, 1 gram of plasticizer were added to the mixture. The mixture was sealed, placed on a roller, and mixed for 24 hours to create a uniform dope of approximately 10 wt % solids. Similar procedures were used for the higher plasticizer loadings by adjusting the level of plasticizer accordingly. After mixing, the dope was cast onto a glass plate following procedures described previously. The results are show in Table 8.

TABLE 8

Solvent Casting Compositions and Retardation Data

| Run # | Plasticizer Type | Plasticizer Level (wt %) | d (μm) | $R_e$ (nm) | $R_{th}$ (nm) | R80 (nm) | $\Delta n_{th}$ |
|---|---|---|---|---|---|---|---|
| 108 | XPP | 5 | 92 | 1.03 | 14.03 | 12.20 | 1.52E−04 |
| 109 | XPP | 10 | 99 | 3.01 | 33.70 | 27.23 | 3.40E−04 |
| 110 | XPP | 15 | 101 | 0.13 | 52.33 | 41.45 | 5.18E−04 |
| 111 | R296 | 5 | 93 | 0.08 | 4.74 | 4.07 | 5.09E−05 |
| 112 | R296 | 10 | 100 | 0.72 | 15.07 | 12.06 | 1.51E−04 |
| 113 | R296 | 15 | 104 | 0.55 | 24.75 | 19.04 | 2.38E−04 |
| 114 | SHP | 5 | 95 | 0.23 | 5.10 | 4.29 | 5.36E−05 |
| 115 | SHP | 10 | 99 | 1.41 | 19.88 | 16.07 | 2.01E−04 |
| 116 | SHP | 15 | 102 | 0.29 | 27.26 | 21.38 | 2.67E−04 |
| 117 | APP | 5 | 98 | 0.61 | 8.09 | 6.60 | 8.25E−05 |
| 118 | APP | 10 | 100 | 1.07 | 23.01 | 18.41 | 2.30E−04 |
| 119 | APP | 15 | 103 | 0.40 | 57.83 | 44.91 | 5.61E−04 |
| 120 | TPP | 10 | 96 | 0.26 | −8.40 | −7.00 | −8.75E−05 |

Determination of Acetyl Spread for CAP Samples

Effective acetyl spread was determined on Samples 7 and 8, along with the commercial cellulose triacetate in Comparative Example 29. Analysis was performed using a Hamilton PRP-1 column (75×4.6, 10 um, P/N 070-500) equipped with a Sedex evaporative light scattering detector. The flow rate of the column was 0.8 mL/min and testing was performed at 30° C. using a 10 μL injection volume. Sample preparation consisted of diluting 0.1 g of the cellulosic in 35 mL of n-methylpyrrolidone. The mobile phase at time zero was a solution of 12.5% methanol, 50% acetone and 37.5% water; and this was linearly varied to a pure acetone solution over a 15 minute time interval. The half-width of the distribution of the sample is reported in units of minutes and is a measure of the "effective" spread in the acetyl distribution because propionyl groups present in the sample also influence the elution times.

Results of the testing showed that the cellulose triacetate of CE 29 had an effective acetyl spread of 0.47 minutes whereas the CAP samples 7 and 8 had acetyl spreads of 0.42 and 0.43 minutes respectively. These results indicate that there is very little difference in effective acetyl spread between the CAP samples and the commercial CTA sample.

Melt Extrusion Films

Resin Compounding and Extrusion Processing

Prior to melt extrusion, the cellulose powders were compounded on a 30 mm Werner Pfleider co-rotating twin screw extruder in order to add plasticizer and 0.5 wt % of Eastman 15304 stabilizer. Plasticizer levels were nominally 5 or 10% and consisted of either diethyl phthalate (DEP) or Resoflex R296 plasticizer acquired from Broadview Technologies Inc. A "medium shear" screw configuration was used along with barrel zone temperatures between 230 to 240° C. and screw speeds between 250 and 300 rpm. Extrusion rates were nominally 30 to 40 lbs per hour (14 to 19 kg/hr). The plasticizer was fed in using a liquid feeder attached approximately ⅓ down the barrel from the feed throat. The extrudate from the twin screw was forced through a pelletizing rod type and chopped into pellets suitable for use during subsequent single screw extrusion. Base resins used in the extrusion examples are compiled in Table II.

TABLE II

Compositions for Extrusion Casting

| Resin | DS Ac | DS Pr | DS Bu | Pr + Bu | DS OH | Tg | Hydroxyl Ratio | Falling Ball Viscosity | IV | SOC × $10^{-10}$ $Pa^{-1}$ |
|---|---|---|---|---|---|---|---|---|---|---|
| CE101 | 0.18 | 2.5 | 0 | 2.5 | 0.32 | 138 | 7.8 | 18.6 | 1.40 | 4.0 |
| CE102 | 1.01 | 0 | 1.68 | 1.68 | 0.31 | 136 | 5.4 | 17 | 1.44 | 2.4 |
| 103 | 1.46 | 1.42 | 0 | 1.42 | 0.12 | 155 | 11.8 | 17 | 1.42 | 1.1 |
| 104 | 1.46 | 1.45 | 0 | 1.45 | 0.09 | 157 | 16.1 | 17.4 | 1.43 | 1.0 |
| 105 | 1.46 | 1.46 | 0 | 1.46 | 0.08 | 157 | 18.3 | 16.7 | 1.43 | 1.1 |
| CE106 | 0.79 | 2 | 0 | 2.00 | 0.22 | 152 | 9.1 | 9.5 | 1.29 | 3.0 |
| CE107 | 1.28 | 1.28 | 0 | 1.28 | 0.44 | 167 | 2.9 | 13.1 | 1.35 | 3.8 |

Next, the pellets compounded above were dried at 70° C., for 12 hrs in a desiccant drying system. After drying, the materials were cast into film using a 1 inch (2.54 cm) Killion single screw extruder having an L/D of 24:1 and a Maddock mixing screw. The extruder was set with an initial zone profile of 240° C. and run at a rate of 50 RPM, although this was varied for some of the later runs between a range of about 40 to 80 RPM. The material was extruded through a 6" coat hanger die (15.2 cm) with a nominal 10 mil die gap (unless otherwise noted). The RPM was set between 40 and 80 RPM giving mass flow rates ranging from 9 to 15 lbs/hr (4 to 6.8 kg/hr). Spacing between the die lip and roll was maintained at approximately 1 inch (2.54 cm) to minimize neck-in of the web (attempts to run with larger spacings between die and roll led to unstable webs that tended to oscillate and cause thickness fluctuations). Except where otherwise noted, film was cast to a nominal thickness of 80 micron and thickness was controlled via the casting roll speed. After extrusion, the film was evaluated for optical retardation and general quality.

Comparative Examples 101 and 102

Effect of Extrusion Variables on Re and Rth

A designed experiment was performed to determine the effects of melt temperature, roll temperature, die gap, and RPM on Re and Rth. Film thickness was held constant at approximately 80 microns by way of varying the winding speed. Data for these samples under various run conditions is compiled in Table III, with each run condition being designated by lower-case alphanumeric characters. All samples in Table III contained 5% DEP plasticizer.

TABLE III

Effect of Processing Variables on Retardation

| Resin | Run # | T Melt (C) | T Roll (C) | die gap (cm) | RPM | Re (nm) | Rth (nm) |
|---|---|---|---|---|---|---|---|
| CE101 | a | 240 | 124 | 0.025 | 80 | 0.8 | −7.2 |
|  | b | 240 | 124 | 0.025 | 40 | 1.8 | −11.0 |
|  | c | 200 | 124 | 0.025 | 80 | 22.0 | −25.0 |
|  | d | 200 | 124 | 0.025 | 40 | 17.6 | −28.0 |
|  | e | 240 | 93 | 0.025 | 80 | 1.7 | −11.0 |
|  | f | 240 | 93 | 0.025 | 40 | −3.5 | −5.0 |
|  | g | 200 | 93 | 0.025 | 80 | 21.0 | −23.0 |
|  | h | 200 | 93 | 0.025 | 40 | 19.0 | −25.5 |
|  | i | 220 | 105 | 0.012 | 60 | 5.3 | −8.0 |
|  | j | 220 | 105 | 0.012 | 60 | 1.8 | −7.0 |
|  | k | 220 | 105 | 0.019 | 60 | 8.0 | −10.7 |
| CE102 | a | 240 | 124 | 0.012 | 40 | 31.6 | −36.8 |
|  | b | 240 | 124 | 0.012 | 80 | 26.4 | −30.0 |
|  | c | 200 | 124 | 0.012 | 80 | 0.0 | −0.5 |
|  | d | 200 | 124 | 0.012 | 40 | −5.3 | 0.6 |
|  | e | 240 | 93 | 0.012 | 80 | 26.4 | −34.0 |
|  | f | 240 | 93 | 0.012 | 40 | 37.0 | −37.0 |
|  | g | 200 | 93 | 0.012 | 80 | 5.3 | −15.0 |
|  | h | 200 | 93 | 0.012 | 80 | 1.5 | −6.0 |
|  | i | 220 | 105 | 0.012 | 40 | 3.5 | −11.0 |
|  | j | 240 | 124 | 0.025 | 80 | 28.0 | −12.0 |
|  | k | 240 | 124 | 0.025 | 40 | 25.0 | −34.0 |
|  | l | 200 | 124 | 0.025 | 80 | 0.0 | −6.0 |
|  | m | 200 | 124 | 0.025 | 40 | 0.0 | −4.4 |
|  | n | 240 | 124 | 0.025 | 80 | 32.0 | −45.0 |
|  | o | 240 | 93 | 0.025 | 60 | 45.0 | −42.5 |
|  | p | 200 | 93 | 0.025 | 60 | 7.0 | −8.6 |
|  | q | 200 | 93 | 0.025 | 80 | 0.8 | −7.2 |
|  | r | 220 | 105 | 0.019 | 40 | 1.8 | −11.0 |

Analysis of the results showed that roll temperature was the variable that least affected Re and Rth and that retardation depended primarily on the remaining processing variables. Larger die gaps, for example, resulted in the need for greater drawdown of the film and thus more extensional stretching. This, in turn, led to larger, more negative values of Re and Rth. Melt temperature also played a key role as the higher viscosity at lower processing temperatures decreased the level of molecular relaxation that could occur and also increased retardation. Nevertheless, the higher melt temperatures resulted in unacceptable yellowing of the film due to thermal degradation.

The results of this example clearly indicate that retardation is very sensitive to the processing conditions used. This makes it difficult to maintain a constant retardation profile as normal fluctuations that occur within any extrusion process (e.g. pressure/temperature fluctuations over time) will translate into variability in retardation. For a more robust process, a material is needed that is less sensitive to these variations in processing conditions, particularly at colder processing temperatures. It is this need that led to the development of the low hydroxyl resins of the invention, described in the following examples.

Examples 103-107

In these examples, films were extruded in similar manner as CE101 and CE102 with the following modifications. Because mass throughput rate (i.e. RPM) and roll temperature were not found to be significant influencers of retardation, they were held constant at 53 RPM and 110° C. respectively. The die gap was also fixed at 10 mils (0.025 cm). Since extensional stretching of the film was a major factor affecting retardation, the take-up speed of the winder was varied initially between 18 and 36 feet per minute (5.5 and 11 m/minute). As RPM was held constant, this did cause a reduction in the thickness of the film, but this thickness effect can be partially compensated for by normalizing to R80 values or by converting them directly to birefringence. Results are tabulated in Table IV for samples 103 through 107.

TABLE IV

Extrusion Data

| Resin | Run # | PZ wt % | Roll Speed (fpm) | P (psi) | d (um) | Re (nm) | Rth (nm) | R80 (nm) |
|---|---|---|---|---|---|---|---|---|
| 103 | a | 5 | 18 | 1625 | 68 | 3.67 | −6.53 | −7.68 |
|  | b | 5 | 36 | 1595 | 30 | 3.57 | −6.52 | −17.39 |
|  | c | 10 | 18 | 1120 | 78 | 1.86 | −3.66 | −3.75 |
|  | d | 10 | 46 | 925 | 29 | 1.42 | −2.65 | −7.31 |
| 104 | a | 5 | 18 | 1575 | 82 | 2.18 | −5.02 | −4.90 |
|  | b | 5 | 36 | 1575 | 40 | 2.77 | −5.42 | −10.85 |
|  | c | 10 | 18 | 1215 | 77 | 1.17 | −2.14 | −2.23 |
|  | d | 10 | 36 | 1205 | 39 | 0.66 | −1.89 | −3.88 |
| 105 | a | 5 | 18 | 1545 | 64 | 2.19 | −4.31 | −5.38 |
|  | b | 5 | 36 | 1590 | 34 | 2.05 | −3.89 | −9.16 |
|  | c | 10 | 18 | 1185 | 63 | 0.62 | −1.80 | −2.28 |
|  | d | 10 | 36 | 1215 | 34 | 0.54 | −1.67 | −3.93 |
| CE106 | a | 5 | 18 | 1385 | 81 | 3.21 | −7.50 | −7.41 |
|  | b | 5 | 36 | 1400 | 39 | 4.58 | −7.20 | −14.76 |
|  | c | 10 | 18 | 1150 | 85 | 3.40 | −5.63 | −5.30 |
|  | d | 10 | 36 | 1050 | 44 | 3.03 | −4.79 | −8.71 |
| CE107 | a | 5 | 18 | 2530 | 72 | 22.14 | −31.94 | −35.49 |
|  | b | 5 | 36 | 2380 | 40 | 27.00 | −31.07 | −62.14 |
|  | c | 10 | 18 | 1910 | 75 | 13.49 | −23.06 | −24.59 |
|  | d | 10 | 36 | 1975 | 38 | 15.74 | −19.28 | −40.60 |

The plasticizer used in these examples was Resoflex R296, at either 5 or 10% loading. Resoflex R296 as found to be less volatile and exhibited less "boil out" than DEP. Because of the unacceptable yellowing at higher melt temperatures, the extruder was set at a constant 230° C. barrel temperature with a 220° C. die temperature. Nominal melt temperatures were between 210 and 215° C.

Inspection of the data in Table IV shows that the lowest retardations (Re and Rth) were for samples 103 through 105. The retardations for these samples changed little when the drawdown rate was increased. Note that there was a slight increase in retardation with the lower plasticizer levels as the viscosity increased, but the retardation levels are still low enough to be useful as a zero retardation film. In contrast, CE107 showed very large values of Re for low and high PZ levels, as well as low and high drawdown ratios. In the case of CE107, the hydroxyl ratio is very low causing the equivalent retardation for a given amount of stress to be much higher. CE106, which has a borderline hydroxyl ratio of 9.1, has retardation values by extrusion casting that are acceptable for zero retardation extrusion cast films, although this resin did not work nearly as well in solvent casting.

Melt pressure data at the die was also measured provide an indication of extrudability and viscosity at processing temperature. From Table IV, it can be seen that the low hydroxyl samples (103, 104 and 105) have lower die pressures than, for example CE107, even though the falling ball viscosity number is much higher. The low hydroxyl resins are thus much easier to extrude into low retardation films, particularly at colder temperatures, and the higher molecular weight and high Tg ensures that the film will remain tough and dimensionally stable.

Stress Optical Coefficients

Values for the stress optical coefficients are listed in Table II for each of the resins used. Note that the film SOC's are based on DOP plasticizer for CE101 and CE102, and the Resoflex plasticizer for the remainder. The low hydroxyl resins were found to have stress optical coefficients very close to zero in contrast to the other resins that were much higher. It should be noted that the SOC will change depending on the plasticizer (and possibly the casting mode) as the solvent cast films based on TPP appeared to have more negative birefringent behavior.

Film Stretching

Film samples produced in Examples 103a, CE106a, and CE107a were stretched using a Bruckner laboratory film stretcher at a stretch temperature of 150° C. The films were plasticized and allowed to equilibrate at approximately 50% RH before stretching, which depressed their Tg relative to the unplasticized values in Table II. Each material was stretched 1.5× and 1.75× in a planar (constant width) mode. Retardation was measured on each film after stretching and the results are compiled in Table V. Note how the thicknesses of the film changes with stretching in relation to the stretch ratio.

As observed, the low hydroxyl 103a sample has very little change in retardation with stretching due to its low stress optical coefficient. In contrast, CE106 and CE107 both exhibit large changes in retardation with stretching. This example further illustrates how the low hydroxyl resins of the present invention are more robust with regards to producing a zero retardation film. The ability to stretch the film without changing its retardation could also be useful for dispersion control, and for making it insensitive to combination (e.g. lamination) with other layers.

TABLE V

| Sample | Planar Stretch Ratio | Re (nm) | Rth (nm) |
|---|---|---|---|
| 103a | 0X | 0.69 | −2.7 |
|  | 1.5X | 0.33 | −4.2 |
|  | 1.75X | −1.3 | −9.3 |
| CE106a | 0X | 0.93 | −3.2 |
|  | 1.5X | 15.4 | −40.4 |
|  | 1.75X | 12.4 | −45.0 |
| CE107a | 0X | 4.0 | −14.4 |
|  | 1.5X | 52.2 | −78.9 |
|  | 1.75X | 42.6 | −75.1 |

The invention has been described in detail with reference to the embodiments disclosed herein, but it will be understood that variations and modifications can be effected within the spirit and scope of the invention.

We claim:

1. A cellulose acetate propionate composition comprising (1) at least one acetyl group wherein the ratio of the degree of substitution of non-acetyl ester groups ($DS_{NAC}$) to degree of substitution of hydroxyl groups ($DS_{OH}$) is 15 to 200 and the non-acetyl ester groups degree of substitution is from 1.1 to 1.75, and, (2) a plasticizer, wherein the cellulose ester has an inherent viscosity of from 0.8 to 1.9 dL/g.

2. The cellulose acetate propionate composition of claim 1 wherein the plasticizer is selected from at least one of the following: a phosphate plasticizer, a phthalate plasticizer, a glycolic acid ester, a citric acid ester plasticizer and a hydroxyl-functional plasticizer.

3. The cellulose acetate propionate composition of claim 2 wherein the plasticizer is selected from at least one of the following: triphenyl phosphate, tricresyl phosphate, cresyldiphenyl phosphate, octyldiphenyl phosphate, diphenylbiphenyl phosphate, trioctyl phosphate, and tributyl phosphate; diethyl phthalate, dimethoxyethyl phthalate, dimethyl phthalate, dioctyl phthalate, dibutyl phthalate, di-2-ethylhexyl phthalate, butylbenzyl phthalate and dibenzyl phthalate; butyl phthalyl butyl glycolate, ethyl phthalyl ethyl glycolate or methyl phthalyl ethyl glycolate; and triethyl citrate, tri-n-butyl citrate, acetyltriethyl citrate, acetyl-tri-n-butyl citrate, and acetyl-tri-n-(2-ethylhexyl)citrate.

4. The cellulose acetate propionate composition of claim 2 wherein the plasticizer is selected from at least one of the following: esters comprising: (i) acid residues comprising one or more residues of: phthalic acid, adipic acid, trimellitic acid, succinic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms.

5. The cellulose acetate propionate composition of claim 4 wherein the plasticizer comprises alcohol residues selected from at least one of the following: methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

6. The cellulose acetate propionate composition of claim 2 wherein the plasticizer comprises one or more of the following: benzoates, phthalates, phosphates, arylene-bis(diaryl phosphate), and isophthalates.

7. The cellulose acetate propionate composition of claim 2 wherein the plasticizer comprises an aliphatic polyester comprising $C_{2-10}$ diacid residues and $C_{2-10}$ diol residues.

8. The cellulose acetate propionate composition of claim 7 wherein the diacid residues are residues of one of the following $C_{2-10}$ diacids: malonic acid, succinic acid, glutaric acid, adipic acid, pimelic acid, suberic acid, azelaic acid, and sebacic acid.

9. The cellulose acetate propionate composition of claim 7 wherein the diol residues are residues of one of the following $C_{2-10}$ diol: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

10. The cellulose acetate propionate composition of claim 2 wherein the plasticizer comprises at least one of the following: an aliphatic polyester comprising adipic acid residues and diethylene glycol residues; or an aliphatic polyester comprising succinic acid residues and diethylene glycol residues, sorbitol hexapropionate, xylitol pentapropionate, xylitol pentaacetate, glucose pentaacetate, glucose pentapropionate and arabitol pentapropionate.

11. The cellulose acetate propionate composition of claim 2 wherein the plasticizer comprises at least one of an aliphatic polyester comprising adipic acid residues and diethylene glycol residues; or an aliphatic polyester comprising succinic acid residues and diethylene glycol residues.

12. The cellulose acetate propionate composition of claim 2 wherein the plasticizer comprises an aliphatic polyester comprising adipic acid residues and diethylene glycol residues.

13. The cellulose acetate propionate composition of claim 2 wherein the plasticizer comprises an aliphatic polyester comprising succinic acid residues and diethylene glycol residues.

14. The cellulose acetate propionate composition of claim 1 wherein the plasticizer comprises: A) (i) from about 5 to about 95 weight % of a $C_2$-$C_{12}$ carbohydrate organic ester, wherein the carbohydrate comprises from about 1 to about 3 monosaccharide units; and (ii) from about 5 to about 95 weight % of a $C_2$-$C_{12}$ polyol ester, wherein the polyol is derived from a $C_5$ or $C_6$ carbohydrate; and B) from about 5 to about 95 weight % of a $C_2$-$C_{10}$ ester of cellulose having a DS of from about 0.7 to about 3.0; wherein the percentages are based on the total weight of component (A) plus component (B).

15. The cellulose acetate propionate composition of claim 14 wherein the polyol ester does not comprise or contain a polyol acetate or polyol acetates.

16. The cellulose acetate propionate composition of claim 14 wherein the plasticizer comprises at least one carbohydrate ester and the carbohydrate portion of the carbohydrate ester is derived from one or more of glucose, galactose, mannose, xylose, arabinose, lactose, fructose, sorbose, sucrose, cellobiose, cellotriose and raffinose.

17. The cellulose acetate propionate composition of claim 14 wherein the plasticizer comprises at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate and β-glucose pentabutyrate.

18. The cellulose acetate propionate composition of claim 14 wherein the plasticizer comprises at least one carbohydrate ester and the carbohydrate portion of the carbohydrate ester comprises an α-anomer, a β-anomer or a mixture thereof.

\* \* \* \* \*